(12) United States Patent
Koori et al.

(10) Patent No.: US 12,173,128 B2
(45) Date of Patent: Dec. 24, 2024

(54) METAL-FIBER REINFORCED PLASTIC COMPOSITE

(71) Applicant: NIPPON STEEL CORPORATION, Tokyo (JP)

(72) Inventors: Masumi Koori, Tokyo (JP); Kohei Ueda, Tokyo (JP); Atsuo Koga, Tokyo (JP); Masaharu Ibaragi, Tokyo (JP); Noriyuki Negi, Tokyo (JP); Masafumi Usui, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 555 days.

(21) Appl. No.: 17/601,230

(22) PCT Filed: Apr. 16, 2020

(86) PCT No.: PCT/JP2020/016790
§ 371 (c)(1),
(2) Date: Oct. 4, 2021

(87) PCT Pub. No.: WO2020/213698
PCT Pub. Date: Oct. 22, 2020

(65) Prior Publication Data
US 2022/0177657 A1  Jun. 9, 2022

(30) Foreign Application Priority Data

Apr. 16, 2019 (JP) .................................. 2019-077702
Apr. 17, 2019 (JP) .................................. 2019-078609

(51) Int. Cl.
C08J 5/04 (2006.01)
B32B 15/14 (2006.01)
(Continued)

(52) U.S. Cl.
CPC .............. C08J 5/041 (2013.01); B32B 15/14 (2013.01); B32B 15/18 (2013.01); B32B 15/20 (2013.01);
(Continued)

(58) Field of Classification Search
CPC ........ C08J 5/041; C08J 5/042; C08J 2363/00; C08J 2367/02; C08J 2375/04;
(Continued)

(56) References Cited

U.S. PATENT DOCUMENTS

2011/0274897 A1   11/2011  Dauner et al.
2013/0161062 A1*   6/2013  Yamaoka ................ C23C 30/00
                                                                   174/110 SR
(Continued)

FOREIGN PATENT DOCUMENTS

CN   103121316 A   5/2013
JP   1-171850 A    7/1989
(Continued)

OTHER PUBLICATIONS

Faucher, J. A., et al., Glass Transitions of Ethylene Oxide Polymers, Oct. 1966, Journal of Applied Physics, vol. 37, No. 11, pp. 3962-3964. (Year: 1966).*
(Continued)

*Primary Examiner* — Brian Handville
(74) *Attorney, Agent, or Firm* — Birch, Stewart, Kolasch & Birch, LLP

(57) ABSTRACT

The invention has as its object the provision of a metal-fiber reinforced plastic composite able to more reliably prevent occurrence of an electrolytic corrosion action when forming a composite of a metal member and a fiber reinforced plastic layer comprising reinforcing fiber (carbon fiber) and a matrix resin.

A metal-fiber reinforced plastic composite 1 according to the present invention comprises a metal member 10, an insu-
(Continued)

lating layer 30 arranged on at least part of a surface of the metal member 10 and comprising a first matrix resin 31 containing nonconductive fiber 32, and a CFRP layer 40 arranged on at least part of a surface of the insulating layer 30 and comprising a second matrix resin 41 containing carbon fiber 42, wherein, when viewing the surface of the metal member 10 from vertically above, the CFRP layer 40 is positioned at the inside of a region where the insulating layer 30 is present and an outer edge of the CFRP layer 40 and an outer edge of the insulating layer 30 are 0.2 mm or more apart. Due to this, it is possible to prevent electrolytic corrosion of the metal member.

19 Claims, 6 Drawing Sheets

(51) Int. Cl.
  B32B 15/18    (2006.01)
  B32B 15/20    (2006.01)
  C25D 1/00     (2006.01)
  B32B 15/08    (2006.01)
  B32B 37/04    (2006.01)

(52) U.S. Cl.
  CPC .............. C08J 5/042 (2013.01); C25D 1/00 (2013.01); B32B 15/08 (2013.01); B32B 37/04 (2013.01); B32B 2250/03 (2013.01); B32B 2255/06 (2013.01); B32B 2255/205 (2013.01); B32B 2255/26 (2013.01); B32B 2255/28 (2013.01); B32B 2260/021 (2013.01); B32B 2260/046 (2013.01); B32B 2262/106 (2013.01); B32B 2264/105 (2013.01); B32B 2307/202 (2013.01); B32B 2307/206 (2013.01); B32B 2307/308 (2013.01); B32B 2307/732 (2013.01); C08J 2363/00 (2013.01); C08J 2367/02 (2013.01); C08J 2375/04 (2013.01)

(58) Field of Classification Search
  CPC ......... B32B 15/14; B32B 15/18; B32B 15/20; B32B 15/08; B32B 37/04; B32B 2250/03; B32B 2255/06; B32B 2255/205; B32B 2255/26; B32B 2255/28; B32B 2260/021; B32B 2260/046; B32B 2262/106; B32B 2264/105; B32B 2307/202; B32B 2307/206; B32B 2307/308; B32B 2307/732; B32B 3/00; B32B 7/025; B32B 2250/44; B32B 2255/20; B32B 5/02; B32B 2260/023; B32B 2262/0269; B32B 5/024; B32B 5/26; B32B 2262/101; B32B 2307/714; B32B 2605/08; C25D 1/00; C25D 5/02; C25D 5/36; C23C 22/12; C23C 28/00; B29K 2995/0007; B29C 70/42; B29C 70/34; B29C 70/72

See application file for complete search history.

(56) References Cited

U.S. PATENT DOCUMENTS

| 2017/0234342 | A1  | 8/2017  | Ayuzawa et al.          |
|--------------|-----|---------|-------------------------|
| 2017/0298231 | A1* | 10/2017 | Yuasa ............ C09D 7/61 |
| 2018/0112084 | A1* | 4/2018  | Kawamura ........ C25D 13/22 |
| 2020/0070429 | A1  | 3/2020  | Matsui et al.           |
| 2021/0129488 | A1  | 5/2021  | Takahashi et al.        |

FOREIGN PATENT DOCUMENTS

| JP | 10-267195    | A |   | 10/1998 |
|----|--------------|---|---|---------|
| JP | 11-123765    | A |   | 5/1999  |
| JP | 2000212764   | A | * | 8/2000  |
| JP | 2010-89394   | A |   | 4/2010  |
| JP | 2012-111090  | A |   | 6/2012  |
| JP | 2012-515667  | A |   | 7/2012  |
| JP | 2014-162848  | A |   | 9/2014  |
| WO | WO 2016/021259 | A1 | | 2/2016  |
| WO | WO 2018/124215 | A1 | | 7/2018  |
| WO | WO 2018/199032 | A1 | | 11/2018 |

OTHER PUBLICATIONS

Julien Michels, et al., Composites Part B: Glass transition evaluation of commercially available epoxy resins used for civil engineering applications, Mar. 25, 2015, Elsevier Ltd., pp. 484-493. (Year: 2015).*

Netzsch Polymers, PUR: Polyurethane, 2024, obtained from https://polymers.netzsch.com/Materials/Details/64 (Year: 2024).*

Machine Translation of JP 2000-212764 A. (Year: 2000).*

* cited by examiner

METAL-FIBER REINFORCED PLASTIC COMPOSITE

FIELD

The present invention relates to a metal-fiber reinforced plastic composite.

BACKGROUND

Fiber reinforced plastic (FRP) comprising a reinforcing fiber (for example, glass fiber, carbon fiber, etc.) contained in a matrix resin to form a composite is light in weight and excellent in tensile strength, workability, etc. For this reason, it is being broadly used in everything from consumer goods to industrial applications. In the automobile industry as well, FRP has been taken note of for its light weight, tensile strength, workability, etc. since it satisfies the need for reducing the weight of car bodies which in turn leads to improvement of the fuel efficiency and other aspects of performance. Application of FRP to auto parts is being studied.

Among these, carbon fiber reinforced plastic (CFRP) using carbon fiber as reinforcing fiber is in particular light in weight and in particular excellent in tensile strength due to the strength of the carbon fiber, so is a promising material in automobile members and other various applications.

On the other hand, the matrix resin of CFRP is generally an epoxy resin or other thermosettable resin, so the material is brittle. Therefore, if deformed, there is a possible of brittle fracture. Further, CFRP using a thermosettable resin as the matrix resin does not plastically deform, so if once made to cure, cannot be bent. Further, CFRP is generally expensive and becomes a factor behind higher costs of automobile members and other various parts.

To maintain the above-mentioned such advantages of CFRP while solving these problems, recently a metal-CFRP composite comprised of a metal member (member made of metal) and CFRP laminated together (formed into a composite) has been studied. Metal has ductility, so by forming a composite with a metal member, a metal-CFRP composite is reduced in brittleness and becomes easy to deform or work. Furthermore, by forming a composite of an inexpensive metal member and CFRP, it is possible to decrease the amount of use of CFRP, so it is possible to lower the costs.

When forming a composite, it is preferable to suitably bond the CFRP to the metal member, so various studies have been conducted with the object of improvement of the bondability.

For example, in PTL 1, when bonding CFRP for reinforcing a structure, to secure good bondability, the resin containing the fiber is placed so as to be made to protrude from the outer edge of the CFRP when viewed in a plane from the direction vertical to the CFRP surface. Further, it is disclosed that by additionally injecting resin from the region where the resin protrudes (protruding part), improvement of the bonding strength can be expected.

For example, PTLs 4 and 5 disclose the method of interposing a binder (binder layer) comprised of a resin or elastomer between a metal member and CFRP for forming a composite (bonding them).

In this regard, carbon fiber is a good conductor. Therefore, it is known that in a composite of a metal member and CFRP, if the carbon fiber in the CFRP layer contacts or approaches the metal member, the carbon fiber and metal member become electrically connected and, due to the potential difference, dissimilar metal corrosion where the metal corrodes (also referred to as "electrolytic corrosion") occurs (for example, PTLs 6 to 8).

In particular, if the metal member is a ferrous material or ferrous alloy etc., since these are materials on the surfaces of which stable oxide films or passivation films are not formed and which are relatively easily corroded, dissimilar metal corrosion can occur more remarkably.

To prevent such dissimilar metal corrosion, it has been proposed to provide an insulating layer between the metal member and CFRP to prevent an electrolytic corrosion action.

For example, art has been disclosed of interposing glass fiber reinforced plastic (GFRP) exhibiting an insulating ability between the metal member and CFRP (PTL 2) or interposing ethylene tetrafluoride and GFRP (PTL 3) to secure an insulating ability.

CITATIONS LIST

Patent Literature

[PTL 1] WO2018/199032
[PTL 2] Japanese Unexamined Patent Publication No. 1-171850
[PTL 3] Japanese Unexamined Patent Publication No. 11-123765
[PTL 4] Japanese Unexamined Patent Publication No. 2010-89394
[PTL 5] Japanese Unexamined Patent Publication No. 2012-515667
[PTL 6] WO2016/021259
[PTL 7] Japanese Unexamined Patent Publication No. 2014-162848
[PTL 8] Japanese Unexamined Patent Publication No. 2012-111090

SUMMARY

Technical Problem

The metal-CFRP composites described in PTLs 4 and 5 have binder layers between the metal and CFRP layer, but the problem of dissimilar metal corrosion occurring due to contact or approach of the metal and CFRP layer is not recognized. Measures against this are not disclosed.

The metal-CFRP composites described in PTLs 6 and 7 use insulating layers to prevent contact or approach of the metal and carbon fiber in the CFRP layer and suppress dissimilar metal corrosion (electrolytic corrosion).

However, in the case of a metal-fiber reinforced plastic composite including CFRP or other fiber reinforced plastic using conductive fiber, sometimes electrolytic corrosion occurs even if providing an insulating layer between the metal member and the fiber reinforced plastic layer. In particular, it has become clear that there is the problem of the occurrence of electrolytic corrosion near an end part of the insulating layer.

The present invention was made in consideration of the above problem and has as its object the provision of a metal-fiber reinforced plastic composite comprised of CFRP or other plastic reinforced using conductive fiber wherein contact of the conductive fiber and metal member is suppressed to prevent electrolytic corrosion of the metal member.

Solution to Problem

The inventors engaged in in-depth studies for solving the above problem and obtained the following discoveries.

First, the inventors studied the causes of the electrolytic corrosion action occurring when forming a composite of a metal member and carbon fiber reinforced plastic (CFRP). Normally, if providing an insulating layer on a metal member and hot press bonding CFRP on it, usually the area of the insulating layer and the area of the CFRP are made to match. If hot press bonding a metal member and CFRP under such a condition, the matrix resin flows out from an end part of the CFRP. Carbon fiber also flows out riding the flow of the resin. The inventors clarified for the first time that electrolytic corrosion is caused by the outflowing carbon fiber contacting the metal member.

Further, the inventors clarified that electrolytic corrosion is also caused by some of the carbon fiber penetrating through the insulating layer and contacting the metal member.

Next, they observed that when performing electrodeposition coating, sometimes corrosion occurs near an end part of the insulating layer. It was learned that near an end part of the insulating layer on the metal member, that is, near a boundary of a part on the metal member where there is an insulating layer and a part where there is no insulating layer, the electrodeposition coating film is not sufficiently formed or even if the coating film is formed, the bondability becomes insufficient and a clearance is formed through which the metal member is exposed. The inventors clarified that the underlying metal member is made to corrode (below, referred to as "crevice corrosion") due to the entry of moisture etc. into the clearance.

The inventors engaged in further studies and as a result obtain the following discoveries.

First, the inventors discovered that it is possible to suppress electrolytic corrosion by making the area of the insulating layer broader than the fiber reinforced plastic layer so as to be able to prevent contact between the carbon fiber and metal member accompanying outflow of matrix resin from an end part in the width direction at the time of hot press bonding. They discovered that warpage and deflection of the metal member can be suppressed by this.

Further, they discovered that by including nonconductive fiber in the insulating layer, it is possible to secure an insulating ability while keeping the carbon fiber from penetrating through the insulating layer.

Furthermore, the inventors discovered that by providing a coating layer containing conductive particles and provided with conductivity on the metal member, forming an insulating layer on that coating layer, and coating this by electrodeposition, even if a clearance is formed between the insulating layer and the electrodeposition coating, moisture etc. will not contact the metal member and crevice corrosion can be suppressed.

Furthermore, the inventors discovered that by providing the above coating layer on a metal member, forming an insulating layer on the coating layer, and providing a fiber reinforced plastic layer (CFRP layer) smaller than the insulating layer on the insulating layer, electrodeposition coating becomes possible and both electrolytic corrosion (dissimilar metal corrosion) and crevice corrosion can be suppressed. By preventing contact or approach of the metal and carbon fiber by the insulating layer, dissimilar metal corrosion can be suppressed. Further, when performing electrodeposition coating, even if a clearance is formed near an end part of the insulating layer, due to the coating layer, moisture etc. will not contact the metal member and crevice corrosion can be suppressed.

The inventors completed the present invention based on the above discoveries. The gist of the present invention is as follows:

(1) A metal-fiber reinforced plastic composite comprising a metal member, an insulating layer arranged on at least part of a surface of the metal member and comprising a first matrix resin containing nonconductive fiber, and a fiber reinforced plastic layer arranged on at least part of a surface of the insulating layer and comprising a second matrix resin containing carbon fiber, where, when viewing the surface of the metal member from vertically above, the fiber reinforced plastic layer is positioned at the inside of a region where the insulating layer is present and an outer edge of the fiber reinforced plastic layer and an outer edge of the insulating layer are 0.2 mm or more apart.

(2) The metal-fiber reinforced plastic composite according to (1), further comprising a coating layer arranged at least at one side of the metal member between the metal member and the insulating layer and comprising a binder resin containing conductive particles, the conductive particles selected from metal particles including one or more elements selected from a group comprised of Zn, Si, Zr, V, Cr, Mo, Mn, and W, intermetallic compound particles, and conductive oxide particles or nonoxide ceramic particles.

(3) The metal-fiber reinforced plastic composite according to (2), wherein a glass transition temperature of the binder resin is 100° C. or less.

(4) The metal-fiber reinforced plastic composite according to (2) or (3), wherein the binder resin includes at least one resin selected from an epoxy resin, polyester resin, and urethane resin.

(5) The metal-fiber reinforced plastic composite according to any one of (2) to (4), wherein the conductive particles have a powder resistivity at 25° C. of $7.0 \times 10^7$ Ωcm or less.

(6) The metal-fiber reinforced plastic composite according to any one of (2) to (5), further comprising, between the coating layer and the metal member, a chemical conversion treated layer including at least one element selected from Cr, P, Si, and Zr.

(7) The metal-fiber reinforced plastic composite according to any one of (2) to (6), further comprising an electrodeposition coating film on a surface of the coating layer where the insulating layer is not arranged.

(8) The metal-fiber reinforced plastic composite according to (1), further comprising an electrodeposition coating film on a surface of the metal member where the insulating layer is not arranged.

(9) The metal-fiber reinforced plastic composite according to any one of (1) to (8), wherein a thickness of the insulating layer is 20 μm or more and 200 μm or less.

(10) The metal-fiber reinforced plastic composite according to any one of (1) to (9), wherein the nonconductive fiber is included in the insulating layer in 10 vol % or more and 60 vol % or less.

(11) The metal-fiber reinforced plastic composite according to any one of (1) to (10), wherein the nonconductive fiber includes at least one type of fiber selected from glass fiber and aramid fiber.

(12) The metal-fiber reinforced plastic composite according to any one of (1) to (11), wherein the first matrix resin includes a thermoplastic resin.

(13) The metal-fiber reinforced plastic composite according to (12), wherein the first matrix resin includes a phenoxy resin or polypropylene resin.

(14) The metal-fiber reinforced plastic composite according to any one of (1) to (13), wherein the second matrix resin includes a thermoplastic resin.
(15) The metal-fiber reinforced plastic composite according to (14), wherein the second matrix resin includes a phenoxy resin.
(16) The metal-fiber reinforced plastic composite according to any one of (1) to (15), wherein in a cross-section obtained by cutting the metal-fiber reinforced plastic composite in a thickness direction, there is an end region in the fiber reinforced plastic layer where the carbon fiber is present in an area ratio of 30% or less.
(17) The metal-fiber reinforced plastic composite according to any one of (1) to (16), wherein the carbon fiber is not present at an interface of the insulating layer at the metal member side.
(18) The metal-fiber reinforced plastic composite according to any one of (1) to (17), wherein the metal member is a steel material, plated steel material, ferrous alloy, aluminum, or aluminum alloy.

Advantageous Effects of Invention

According to the present invention, even in a metal-fiber reinforced plastic composite comprised of a metal member and fiber reinforced plastic containing carbon fiber (CFRP) bonded together, it becomes possible to reliably prevent the occurrence of electrolytic corrosion and crevice corrosion. In addition, warpage and deflection of the metal member can be suppressed.

BRIEF DESCRIPTION OF DRAWINGS

FIG. 1A is a conceptual view before hot press bonding the CFRP layer, while FIG. 1B is a conceptual view after hot press bonding the CFRP layer.

FIG. 2A is a conceptual view of a side surface of the metal-fiber reinforced plastic composite, while FIG. 2B is a conceptual view of a top side of the metal-fiber reinforced plastic composite (view from above in vertical direction).

FIG. 5A is a schematic view explaining an end part region in a fiber reinforced plastic layer by a cross-sectional view of a metal-fiber reinforced plastic composite.

FIG. 5B is a conceptual view for explaining an area ratio of carbon fiber in an end part region in a fiber reinforced plastic layer.

DESCRIPTION OF EMBODIMENTS

Below, preferred embodiments of the present invention will be explained in detail while referring to the attached drawings. Note that, in the Description and drawings, component elements having substantially the same functions and configurations are assigned the same notations and overlapping explanations are omitted.

Regarding Discoveries Obtained by Inventors

Figure 1:
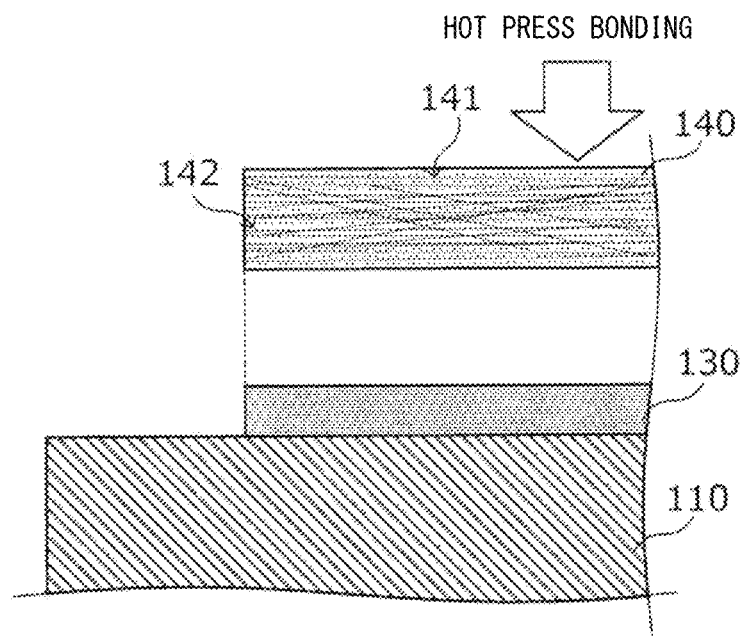
FIGS. 1A and 1B are conceptual views for explaining the prior art.
Figure 1:
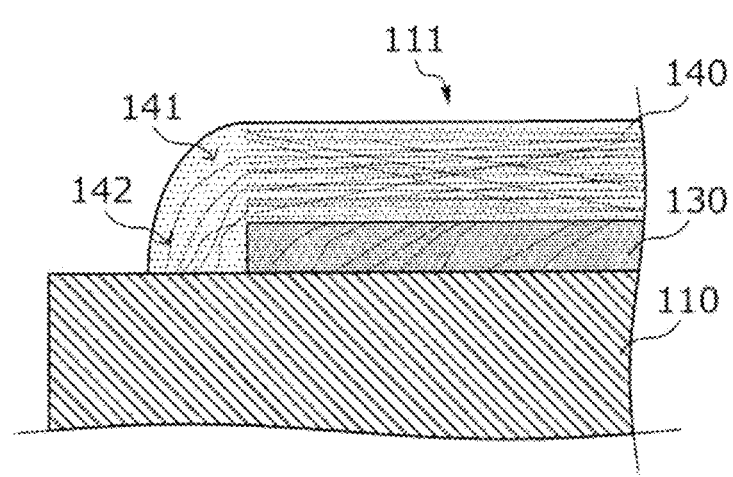

Before explaining the metal-fiber reinforced plastic composite according to embodiments of the present invention, the discoveries obtained by inventors which provided the impetus for perfecting the present invention will be simply explained while referring to FIGS. 1A and 1B.

The inventors changed the thickness of an insulating layer in a metal-CFRP composite having an insulating layer between the metal member and carbon fiber reinforced plastic (CFRP) layer such as disclosed in PTL 1 and PTL 2 and studied in detail whether an electrolytic corrosion action occurred. They used unidirectional CFRP using cold rolled steel sheet for the metal member, using a binder resin material for the insulating layer, and using a phenoxy resin exhibiting thermoplasticity for the matrix resin in the CFRP layer.

When joining the CFRP layer and metal member through the insulating layer, as schematically shown in FIG. 1A, they used an ordinary method to position them so that the position of an end of the CFRP layer 140 in a plan view and the position of an end of the insulating layer 130 matched, then joined the metal member 110, insulating layer 130, and CFRP layer 140 by hot press bonding. The inventors changed the thickness of the insulating layer 130 to prepare a plurality of samples whereupon they learned that even if the insulating layer 130 has a large thickness, corrosion ends up occurring.

The inventors examined in detail the cross-section of the joined composite 111 (composite metal member 110-insulating layer 130-CFRP layer 140 joined together) by an optical microscope so as to find the cause of the corrosion which occurred. As a result, as schematically shown in FIG. 1B, at an end part of the CFRP layer 140 in the cross-sectional width direction, the matrix resin 141 flowed out from the CFRP layer 140. Riding the flow of this matrix resin 141, the carbon fiber 142 also ended up flowing out from the CFRP layer 140 and the metal member 110 and carbon fiber 142 directly contacted each other. Further, as a result of observation, carbon fiber 142 flowed into the insulating layer 130 and part of the carbon fiber 142 penetrated through the insulating layer 130 and contacted the metal member 110. The fact that dissimilar metal corrosion (below, in the Description, sometimes simply called "electrolytic corrosion") occurs due to the electrolytic corrosion action due to such physical contact between the metal member 110 and carbon fiber 142 was confirmed for the first time by the inventors.

As a result, the inventors obtained the discovery that to reliably prevent the occurrence of an electrolytic corrosion action when joining the CFRP 140 including the thermoplastic matrix resin 141 and the metal member 110, it is important to deal with the outflow of matrix resin 141 near an end part of the CFRP layer 140 and keep the carbon fiber 142 from ending up penetrating through the insulating layer 130.

From these, the inventors thought that even if carbon fiber 142 flowed out from an end part of the CFRP layer 140 along with the matrix resin 141 at the time of hot press bonding, if there were a layer exhibiting an insulating ability at the part from which the carbon fiber 142 flowed out present with the metal member 110, it would be possible to prevent direct contact of the carbon fiber 142 and the metal member 110.

Further, they thought that by suitably selecting the insulating layer 130 so that the carbon fiber 142 did not penetrate through the insulating layer 130, it would be possible to prevent direct contact of the carbon fiber 142 and the metal member 110.

The metal-fiber reinforced plastic composite 1 according to a first embodiment of the present invention explained in detail below was completed based on this discovery.

Next, the inventors coated the surface of above prepared composite by electrodeposition coating 50 on to further try to suppress dissimilar metal corrosion and raise the corrosion resistance. Since this was electrodeposition coating 50, only naturally, no electrodeposition coating film 50 was formed on the insulating layer 30. As shown in FIG. 2C, an electrodeposition coating film 50 and insulating layer 30 were formed on the surface of the metal member 10 adjoining each other. As a result of a corrosion resistance test, it was confirmed that corrosion occurred at an end part of the insulating layer 30 (boundary parts of the insulating layer 30 and electrodeposition coating film 50). The inventors examined and analyzed the cross-section of the corrosion test piece, whereupon they confirmed that the electrodeposition coating film 50 was not sufficiently formed at the boundary part of the insulating layer 30 and the electrodeposition coating film 50 or the bondability between the electrodeposition coating film 50 and metal member 10 became insufficient and a clearance was formed where the metal member 10 was exposed. It was confirmed that moisture etc. entered through this clearance and the underlying metal member 10 was made to corrode (crevice corrosion).

Therefore, the inventors thought that if forming a coating film between the metal member and the insulating layer and electrodeposition coating film, even if a clearance is formed between the insulating layer and the electrodeposition coating film, moisture etc. would not contact the metal member and crevice corrosion could be suppressed.

Further, the inventors thought that by making this coating film conductive, electrodeposition coating similar to the past would become possible and manufacture would be possible without changing the manufacturing process.

The metal-fiber reinforced plastic composite according to a second embodiment of the present invention explained later was completed based on this discovery.

Note that, in the metal-fiber reinforced plastic composite according to the present invention, as explained above, the aim is to prevent electrolytic corrosion or other corrosion of the metal member while suppressing warpage and deflection and securing workability with no problem in practice (press formability).

Below, the present invention will be explained with reference to the example of a metal-fiber reinforced plastic composite provided with a fiber reinforced plastic layer having carbon fiber as the conductive reinforcing fiber and including carbon fiber in the matrix resin (below, sometimes abbreviated as a "metal-CFRP composite").

First Embodiment

Regarding Overall Configuration of Metal-Fiber Reinforced Plastic Composite 1

The overall configuration of the metal-fiber reinforced plastic composite 1 according to the first embodiment of the present invention will be explained. Note that, for convenience, the explanation will be given while suitably using the coordinate systems shown in FIGS. 2A to 2C and FIG. 4.

The metal-CFRP composite 1 according to the present embodiment, as shown in FIG. 2A, is provided with a metal member 10, an insulating layer 30 positioned on at least part of the surface of the metal member 10, and a CFRP layer 40 positioned on at least part of the surface of the insulating layer 30. The CFRP layer 40 comprises a second matrix resin 41 containing carbon fiber 42. The second matrix resin 41 may be a resin exhibiting thermosettability or may be a resin exhibiting thermoplasticity. In the case of a resin exhibiting thermoplasticity, outflow of the matrix resin such as shown in FIG. 1B or penetration of the carbon fiber more easily occur.

Here, "form a composite" means the metal member 10, insulating layer 30, and CFRP layer 40 being joined together (bonded) to form an integral whole. Further, "form an integral whole" means metal member 10, the insulating layer 30, and the CFRP layer 40 move as an integral whole when worked or deformed.

Figure 2:
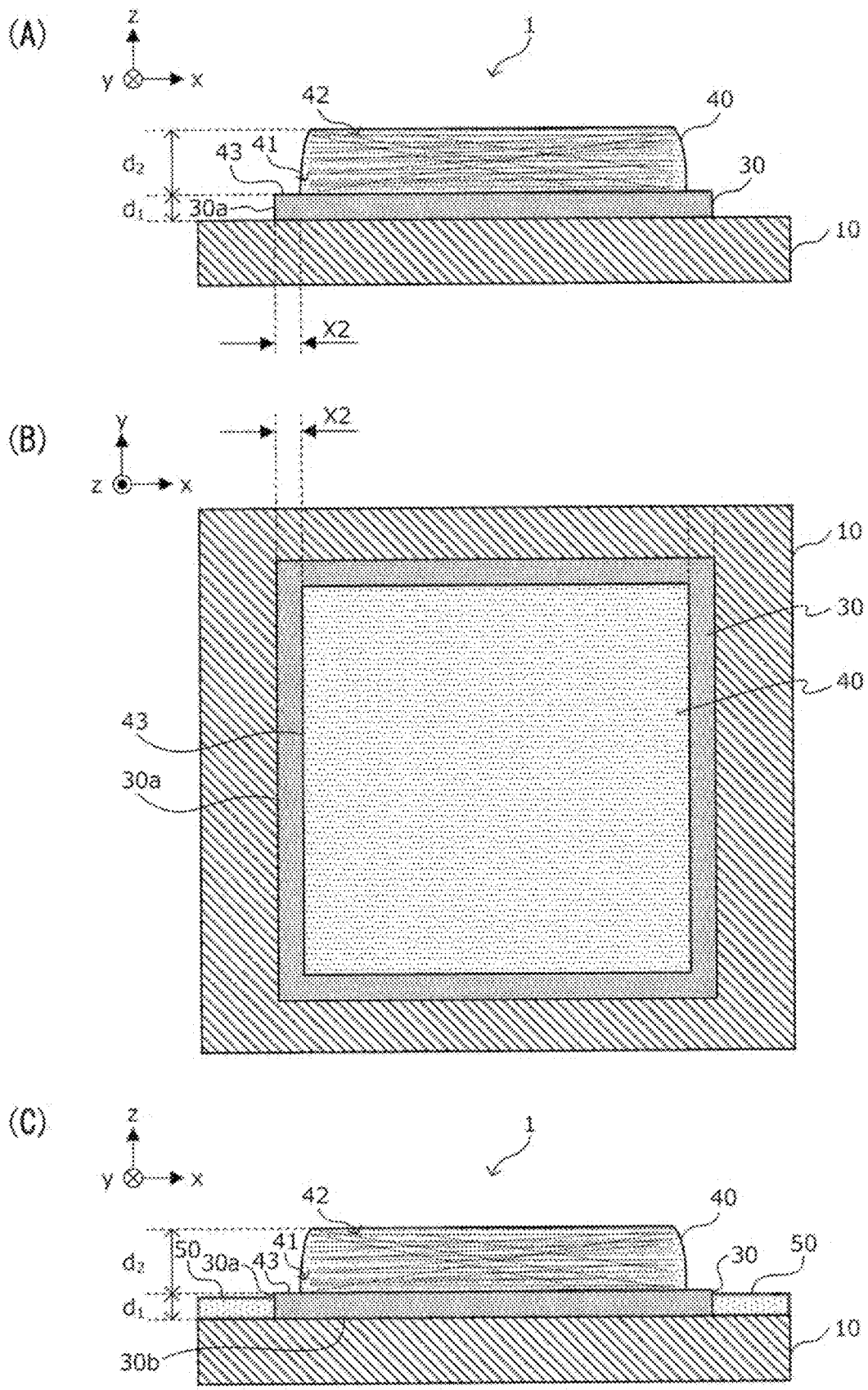
FIGS. 2A and 2B are conceptual views schematically showing one example of the configuration of a metal-fiber reinforced plastic composite according to a first embodiment of the present invention.
Figure 5:
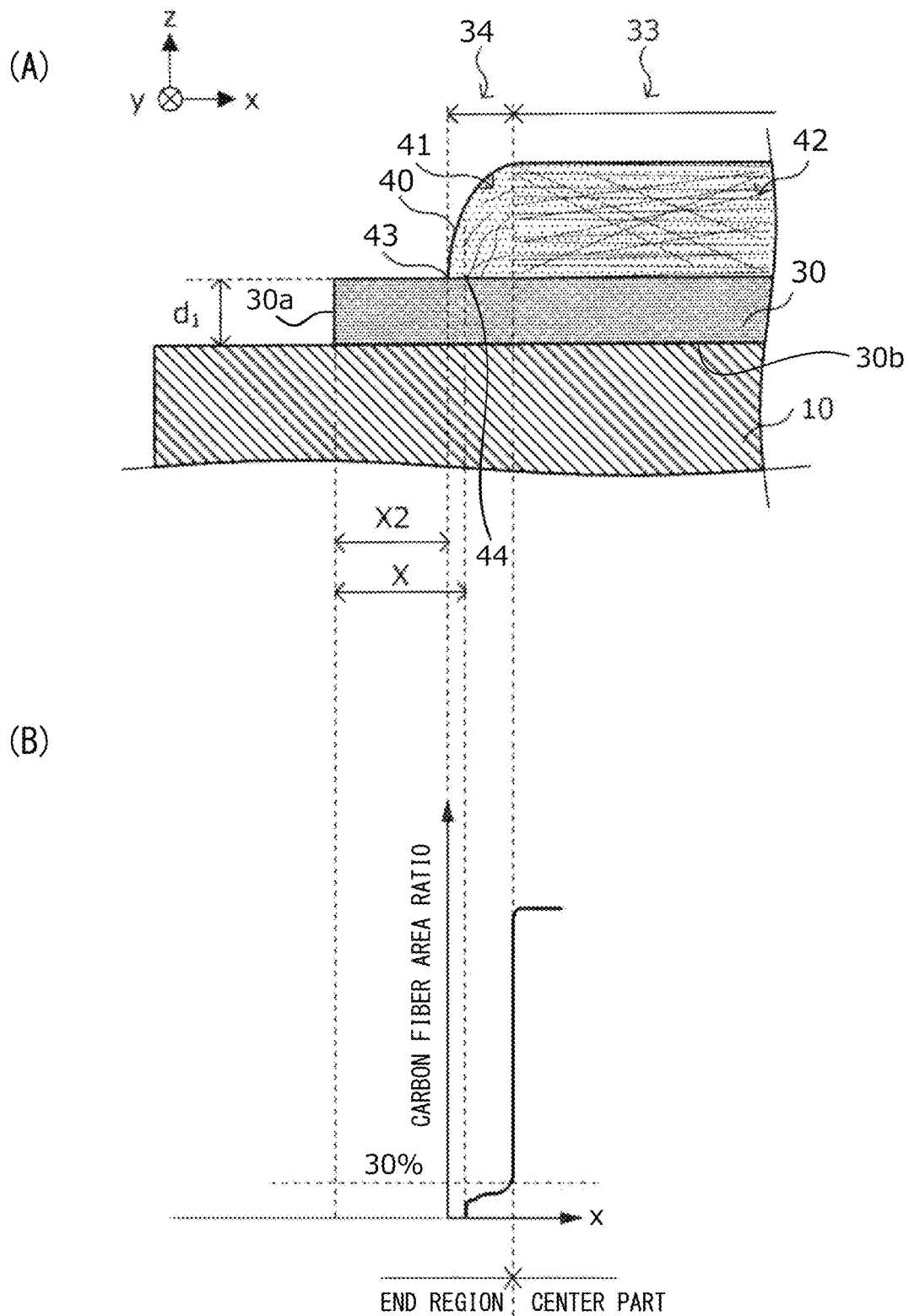
FIGS. 5A and 5B are conceptual views for explaining an end part region in a fiber reinforced plastic layer according to the first embodiment of the present invention.

In the present embodiment, the CFRP layer 40 and the insulating layer 30, as shown in FIG. 2B, are arranged so that when viewing the surface of the metal member 10 from vertically above (when viewing the surface of the metal member from vertically above that surface (Z-axis direction of FIG. 2)), the CFRP layer 40 is positioned at the inside of the region where the insulating layer 30 is present. Such a structure is also referred to as a "terrace structure". FIG. 5A shows a conceptual view enlarging the end parts of the CFRP layer and the insulating layer. As shown in FIG. 5A, the outer edge 43 of the CFRP layer 40 and the outer edge 30a of the insulating layer 30 should be separated.

By making the insulating layer 30 and the CFRP layer 40 a terrace structure, at the time of hot press bonding, even if the carbon fiber 42 flows out toward the outside along with the second matrix resin 41 flowing out from the CFRP layer 40, it is possible to more reliably prevent contact of the carbon fiber 42 and the metal member 10. More specifically, making the separation distance X2 between the outer edge of the insulating layer 30 and the outer edge of the CFRP layer 40 0.2 mm or more is preferable. Due to this, it is possible to more reliably prevent electrolytic corrosion between the carbon fiber 42 and the metal member 10.

Note that, the outer shapes of the insulating layer 30 and the CFRP layer 40 are not limited to the rectangular shapes such as shown in FIG. 2B and can have any shapes. At that time, the "separation distance X2 between the outer edges" means the distance between the outer edge 43 of the CFRP layer 40 and the outer edge 30a of the insulating layer in the direction vertical to the tangent of the outer edge 43 of the CRFP layer when viewing the surface of the metal member 10 from vertically above.

Further, when viewing the surface of the metal member 10 from vertically above, a part of the insulating layer 30 protruding from the outer edge 43 of the CFRP layer 40 will be referred to as a "protruding part" (part inside range of X2 in insulating layer 30 of FIG. 2 and FIG. 5A). That is, the distance separating the two outer edges X2 is the "width X2 of the protruding part".

Further, as shown in FIG. 2C, an electrodeposition coating film 50 may be arranged so as to cover the surface from which the metal member 10 is exposed (surface of metal member 110 where insulating layer 30 is not arranged). By the electrodeposition coating film 50 being arranged at the surface region where the metal member 10 is exposed, even if the second matrix resin 41 of the CFRP layer 40 flows out beyond the insulating layer 30 at the time of hot press bonding, contact between the metal member 10 and the carbon fiber 42 is reliably avoided. Note that, the material of the electrodeposition coating film 50 is not particularly limited. It may be an anionic electrodeposition coating film or a cationic electrodeposition coating film, but from the viewpoint of the corrosion resistance, making it a cationic electrodeposition coating film is preferable. The same is true for the electrodeposition coating film described in the second embodiment explained later as well.

Relationship of Insulating Layer and CFRP Layer

Next, while referring to FIG. 5A and FIG. 5B to FIG. 6, the sizes and positional relationship of the insulating layer 30 and the CFRP layer 40 will be explained.

As shown schematically in FIG. 5A, at an end part of the CFRP layer 40 in the width direction after hot press bonding (end part in x-axis direction of FIG. 5A), a region is formed where the second matrix resin 41 forming the CFRP layer 40 flows out and, further, carbon fiber 42 flowing out along with the outflow of the second matrix resin 41 is present. A region formed along with such outflow of the second matrix resin 41 will be referred to in the present embodiment as an "end part region 34".

At this end part region 34, the amount of outflow of the carbon fiber 42 is not large. According to studies by the inventors, it became clear that in the cross-section (FIG. 5A) cutting the metal member 10, insulating layer 30, and CFRP layer 40 in the thickness direction (z-axis direction), the area ratio of the carbon fiber occupied in the end part region 34 was 30% or less.

Here, the area ratio of the carbon fiber 42 is measured by cutting the metal member 10, insulating layer 30, and CFRP layer 40 in the thickness direction and polishing them to a mirror finish by 2000 grade emery paper, $Al_2O_3$, a $SiO_2$ suspension, etc. and examining the cross-section using a commercially available optical microscope (for example, optical microscope BX51 made by Olympus Corporation) at a power of 100× or so. If the obtained image is a Polaroid, it may be scanned by a scanner and processed by image analyzing software. In the case of an observation system where image data is directly obtained, it is possible to process the data as is by digitalizing software. The area ratio of the carbon fiber is defined as the ratio of the area of the carbon fiber 42 occupied in the overall area (cross-sectional area) of the end part region 34 when processing the cross-sectional image obtained using a predetermined threshold value so that the second matrix resin 41 and the carbon fiber 42 become different colors by, for example, the digitalizing image processing software IMG Processer (made by Optlynx CO., Ltd.) etc. The outflowing carbon fiber 42 occurs as a result of part of the fiber separating in the form of whiskers of carbon fiber generated from the end parts of the carbon fiber bundles flowing. For this reason, it is not possible confirm the presence of outflowing carbon fiber 42 at all locations. Due to such a reason, rather than calculating the area ratio of carbon fiber at only one cross-section, the cross-sections of several locations were examined and the average value of the same was obtained for evaluation. For example, the cross-sections of three or more freely selected locations may be examined.

A cross-section obtained by cutting the metal member 10, insulating layer 30, and CFRP layer 40 in the thickness direction (z-axis direction) was examined by an optical microscope. The distribution of the area ratio of the carbon fiber 42 was measured as shown in FIG. 5B. The boundary 43 (outer edge of CFRP layer) of the end part region 34 with the width direction end part side of the CFRP layer 40 (x-axis negative direction side in FIG. 5A) became a position in the cross-section where the second matrix resin 41 became fluid and reached the furthest point. On the other hand, the boundary at the opposite side from the width direction end part side of the end part region 34 (x-axis positive direction side in FIG. 5A), for example as shown in FIG. 5B, becomes a position where the area ratio of the carbon fiber 42 rapidly increases.

The part present at the inside from the end part region 34 (x-axis positive direction side in FIG. 5A) will be referred to as the "center part 33" in the present embodiment. The area ratio of the carbon fiber 42 at the center part 33 corresponds to the volume fraction of fiber Vf at the inside of the CFRP layer 40, so if a CFRP with a known Vf, it is possible to determine the center part 33 from the cross-section image. Further, the center part 33 can be considered a region with no change in the area ratio in the x-axis direction. Therefore, it is possible to determine the center part 33 even if examining a sample in the x-axial direction up to confirming no change in area ratio. Note that, the "region with no change in the area ratio" referred to here shall include, in addition to the case where the change in area ratio is zero, the case where the magnitude of the change in the area ratio is a predetermined threshold value of an extent enabling the change in area ratio to be deemed zero or less than that value (for example, 5% or less).

On the other hand, in the cross-section such as shown in FIG. 5A, the separation distance between the end position 30a of the insulating layer 30 in the direction perpendicular to the thickness direction (that is, the x-axis direction) and the position of the endmost part 44 where the carbon fiber 42 is present is made X [μm] and the separation distance of the end position 30a of the insulating layer 30 and the end part 43 of the CFRP layer 40 is made X2 [μm]. If this separation distance X is too short, at the time of hot press bonding, the possibility of the carbon fiber 42 flowing out over the region of the insulating layer 30 and ending up contacting the metal member 10 becomes higher. For this reason, this separation distance X is preferably larger than the range at which the second matrix resin 41 can flow out at the time of hot press bonding. Specifically, when the value of the melt volume flow rate (MVR) at 240° C. of the second matrix resin 41 which the CFRP layer 40 contains is made M [cc/10 min], the separation distance X preferably satisfies the relationship X≥20·M. Satisfying the relationship X≥50·M is more preferable. Further, to secure the insulating ability more reliably, the separation distance X2 between the end part 43 of the CFRP layer 40 containing the resin which flowed out and the end part of the insulating layer 30 more preferably satisfies the relationship X2≥20·M. "MVR" is a method for evaluating the fluidity of the resin. The evaluation is performed by the B method of JIS K7210-1, that is, the test method based on the measurement of the movement distance. With MVR, a constant load was applied to the resin in the molten state, then what extent of volume become fluid in 10 minutes when extruding the resin from a predetermined hole was evaluated. In the present embodiment, the MVR at 240° C. where polypropylene, polycarbonate, nylon 6, phenoxy resin, or other thermoplastic resin becomes a molten state was used as the criteria for evaluation.

The thickness of the insulating layer 30 is not particularly limited. However, if the thickness of the metal member 10 in the metal-CFRP composite 1 is 1 mm or less like an external sheet member of steel sheet for automobile use, the metal member 10 will warp or deflect due to the difference in the coefficient of linear expansion of the CFRP layer 40, the coefficient of linear expansion of the insulating layer 30, and the coefficient of linear expansion of the metal member 10. The coefficient of linear expansion of the metal member 10 is for example about $12\times10^{-6}$/K or so if using steel sheet as the metal member 10 so long as carbon steel with a content of C (carbon) of 0.1 mass % or so. On the other hand, the coefficient of linear expansion of a general resin is 3 to $5\times10^{-5}$ or so while the coefficient of linear expansion of GFRP or other glass reinforcing fiber resin is 3 to $4\times10^{-6}$ or so. Further, the coefficient of linear expansion of the CFRP layer is substantially 0, so stress accompanying the difference in coefficient of linear expansion concentrates at the end part of the insulating layer 30. From this viewpoint, if the thickness $d_1$ of the insulating layer 30 is 200 μm or less, warping or deflection of the metal member 10 is greatly reduced.

Specifically, if the separation distance X [μm] between the end part (outer edge) 30a of the insulating layer 30 and the position of the endmost part where the carbon fiber 42 is present is X≤10000 μm, warping and deflection at the metal member 10 are more remarkably suppressed. However, if the separation distance X>10000 μm, the warping of the metal member 10 becomes greater. This is believed to occur due to the correlation of the difference in coefficient of linear expansion between the nonconductive fiber 32 and resin and the metal member 10, thickness, modulus of elasticity, and bonded length.

Here, if the bonding length becomes longer, the stress occurring due to the difference in the coefficients of linear expansion concentrates at the end part 30a of the insulating layer 30 and warping more easily occurs. Further, if comparing the case of a material with the nonconductive fiber 32 oriented in one direction and the case of a cloth material, the effect of warping becomes smaller in the case of a cloth material, so this is more preferable. The above separation distance X more preferably satisfies X≤5000 μm.

Further, regarding the separation distance X2 between the end part (outer edge) 43 of the CFRP layer 40 and the end part (outer edge) 30a of the insulating layer 30 as well, if X2≤9800 μm, due to reasons similar to the above, warping of the metal member 10 is suppressed. On the other hand, regarding the separation distance X2, warping more easily occurs if X2>9800 μm. The separation distance X2 is more preferably made X≤25000 μm.

Note that, the separation distances X and X2 shown in FIG. 5A can be found by examining a cross-section cutting the metal member 10, insulating layer 30, and CFRP layer 40 in the thickness direction (z-axis direction) by an optical microscope and identifying the end position of the insulating layer 30 in a direction perpendicular to the thickness direction (that is, x-axis direction), the position of the endmost part 44 where the carbon fiber 42 is present (part where ratio of presence of carbon fiber in the examination of the cross-section becomes an area ratio of 1% or less), and the position of the endmost part (outer edge) 43 of the CFRP layer 40. The position of the end part 30a of the insulating layer 30 can be identified by measuring the part contiguous with the metal member 10. It is possible to measure the separation distance between the two locations based on the identified positions so as to calculate the above-mentioned separation distances X and X2.

Figure 6:
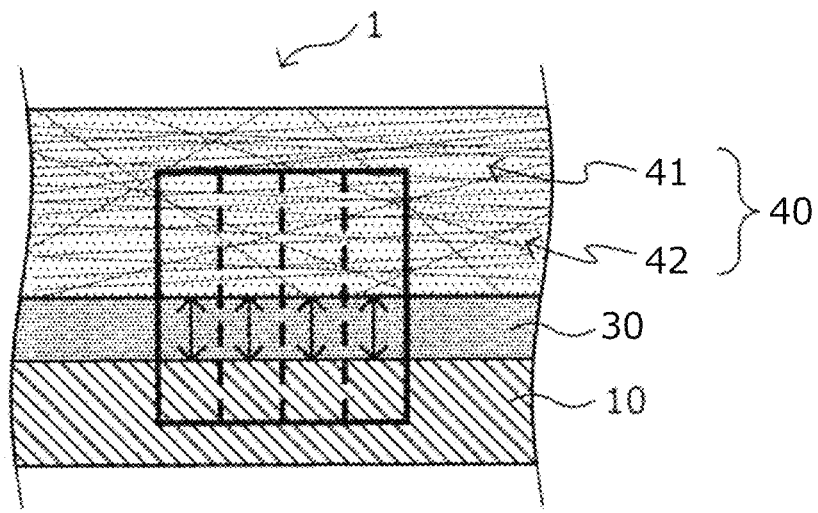
FIG. 6 is a conceptual view for explaining a method of measurement of thickness.

Further, the method of measurement of the metal member 10, insulating layer 30, and CFRP layer 40 in the metal-CFRP composite 1 according to the present embodiment will be explained while referring to FIG. 6.

The thicknesses of the metal member 10, insulating layer 30 and CFRP layer 40 may for example be measured in the following way based on the cross-section method of the optical methods of JIS K 5600-1-7, Section 5.4. That is, without having a detrimental effect on the sample, a sample is buried using an ordinary temperature curing resin packed without gap. For example, Low Viscosity Epomount 27-777 made by Refine Tec Ltd. is used as the main agent and 27-772 is used as the curing agent to bury the sample. The sample is cut by a cutting machine at the location to be observed so as to become parallel with the thickness direction to expose a cross-section and is polished using abrasive paper of a count prescribed by JIS R 6252 or 6253: 2006 (for example, #280, #400, or #600) to prepare an observed surface. When using an abrasive, a suitable grade of diamond paste or similar paste is used for polishing to prepare the observed surface. Further, in accordance with need, buffing may be performed to smooth the surface of the sample to a state able to withstand observation.

A microscope provided with a suitable lighting system for giving the optimum image contrast and enabling measurement with 1 μm precision (for example, BX51 made by Olympus Corporation) was used. The size of the field was selected to become 300 μm. Note that, the size of the field may be changed so that the respective thicknesses can be confirmed. For example, when measuring the thickness of the insulating layer 30, the field of observation is divided into four equal parts such as in FIG. 6, the thickness of the insulating layer 30 is measured at the center part in the width direction at each fraction, and the average thickness is made the thickness at the field. For the fields of observation, five different locations are selected. Each field of observation is divided into four equal parts. The thicknesses of the fractions are measured and the average value is calculated. The adjoining fields of observation should be separated by 3 cm or more. The average values of the five locations may be further averaged and the value made the thickness of the insulating layer 30. Further, the thicknesses of the metal member 10 and CFRP layer 40 as well may be measured in the same way as measurement of the thickness of the above insulating layer 30.

Note that, in FIG. 2 etc., in the metal-CFRP composite 1 according to the present embodiment, the case where the end part region 34 is present at an end part in the width direction of the CFRP layer 40 is illustrated, but it is possible to remove the part corresponding to the end part region 34 by cutting etc. and utilize only the remaining part corresponding to the center part 33 as the metal-CFRP composite 1. However, in this method of use, the cost ends up increasing by exactly the size of the removed end part region 34. Further, depending on the degree of outflow of the second matrix resin 41 at the time of hot press bonding, even if removing the end part region 34, there is a possibility of it being possible to estimate the presence of treatment for removing the end part region 34 from the state of the distribution of the area ratio of carbon fiber in the width direction of the CFRP layer 40 such as for example shown in FIG. 5A.

Insulating Layer

The insulating layer 30 is a layer electrically insulating the metal member 10 and the CFRP layer 40. Further, it also functions as a bonding layer strongly bonding the metal member 10 and the CFRP layer 40.

Figure 4:
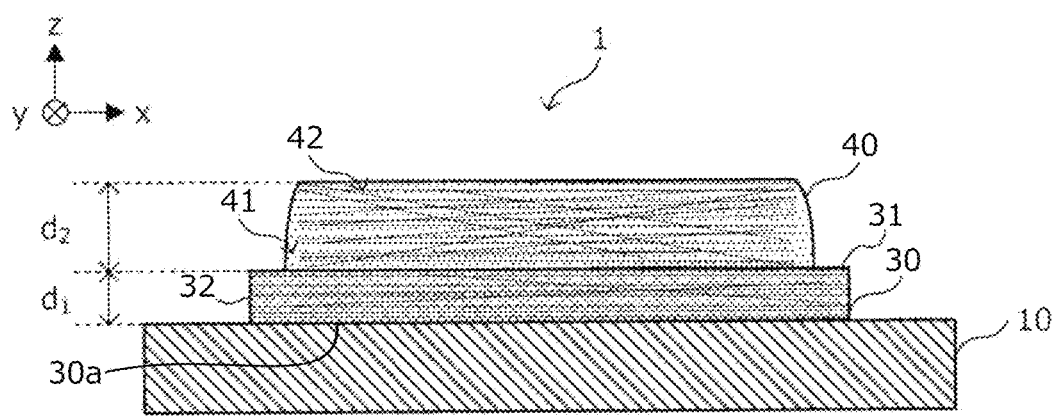
FIG. 4 is a conceptual view schematically showing another example of the configuration of a metal-fiber reinforced plastic composite according to the first embodiment of the present invention.

The insulating layer 30, as shown in FIG. 4, may comprise the first matrix resin 31 containing nonconductive fiber 32. For example, the insulating layer 30 may also be glass fiber reinforced plastic (GFRP) having glass reinforcing fiber as the nonconductive fiber 32. Glass reinforcing fiber exhibits an excellent insulating ability, so by using GFRP as the insulating layer 30, it becomes possible to more reliably secure the insulating ability between the metal member 10 and the CFRP layer 40 (in particular, the insulating ability of a region other than an end part of the CFRP layer 40 in the width direction). Glass fiber has flexibility, so the ability of the metal-CFRP composite 1 to follow deformation is excellent and the heat resistance to hot press bonding is also high.

Furthermore, at the time of hot press bonding, since the insulating layer 30 has a nonconductive fiber 32, the nonconductive fiber 32 blocks movement of the carbon fiber 42 so the carbon fiber 42 can be kept from penetrating through the insulating layer 30. Due to this, conduction between the carbon fiber 42 and the metal member 10 can be more reliably prevented.

Note that, the nonconductive fiber is not limited to glass fiber so long as a nonconductive fiber material. Further, instead of nonconductive fiber, nonconductive particles may also be included. However, inclusion of nonconductive fiber enables penetration of carbon fiber 42 to be suppressed more than the case of inclusion of nonconductive particles.

The first matrix resin 31 forming the insulating layer 30 may be a matrix resin exhibiting a thermosettability or may be a matrix resin exhibiting thermoplasticity. Note that, if the insulating layer 30 is comprised of glass, there is no flexibility and deformation of the composite cannot be followed, so this is not preferable.

Due to the above, even if hot press bonding, the carbon fiber 42 does not penetrate through the insulating layer 30 and never reaches the metal member 10. For this reason, it becomes possible to realize a state where there is no carbon fiber 42 present at the interface 30b between the metal member 10 and the insulating layer 30.

Figure 3:
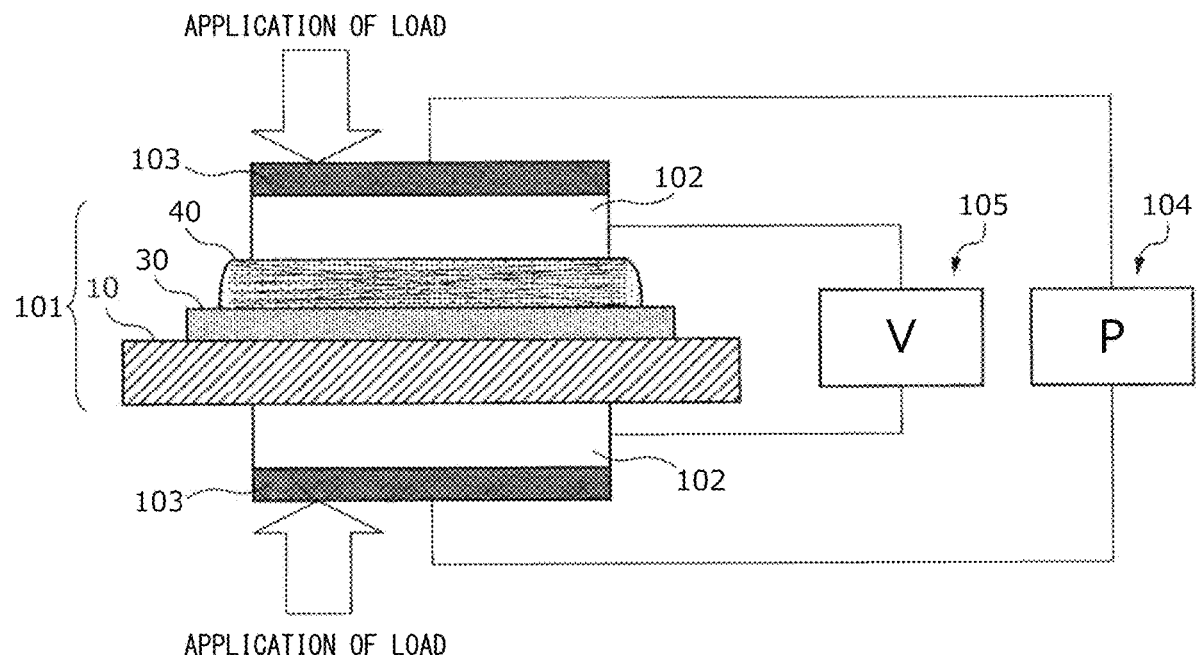
FIG. 3 is a conceptual view for explaining a method of measurement of penetration resistance by a four terminal method.

Here, "there is no carbon fiber 42 present at the interface 30b between the metal member 10 and the insulating layer 30" is the state where, in a sample of an x-axis direction size of 20 mm and y-axis direction size of 20 mm obtained from the metal-CFRP composite 1, a resistance value between the metal member 10 and the CFRP layer 40 of that sample measured for penetration resistance by the four-terminal method (FIG. 3) is 100 mΩ or more. The method of measuring the resistance value may be as follows:

The above sample 101 is sandwiched between carbon paper (not shown), then terminals 102 are placed at the outsides of the carbon paper. The surfaces of the terminals 102, as shown in FIG. 3, are given gold plating 103 then a 100 kgf (approximately 980N)/cm$^2$ load is applied. After that, a predetermined constant current power supply 104 is used to run 0.1 mA current between the gold plated terminals, the voltage across the terminals is measured by a voltmeter 105, and the resistance value is calculated. Due to this, it is possible to obtain a penetration resistance value of the measurement sample focused on Metal Member The material, shape, thickness, etc. of the metal member 10 are not particularly limited so long as shaping by a press etc. is possible, but from the viewpoint of the workability or ease of manufacture, a thin sheet shape is preferable. As the material of the metal member 10, for example, iron, aluminum, and their alloys etc. may be mentioned. In particular, a ferrous material or ferrous alloy material is a material on the surface of which a stable oxide film or passivation film is not formed and which can relatively easily be corroded, so dissimilar metal corrosion easily occurs. However, in the composite according to the present invention, due to the presence of the insulating layer 30, dissimilar metal corrosion can be suppressed, so even if using a ferrous material or a ferrous alloy material for the metal member 10, dissimilar metal corrosion does not become a problem.

The ferrous steel material which can be used is not particularly limited, but, for example, there are the ferrous materials prescribed in the Japan Industrial Standard (JIS) etc. Carbon steel, alloy steel, high strength steel, etc. used for general structures or machine structures may be mentioned. The components of the ferrous material are not particularly prescribed, but in addition to Fe and C, one or more of Mn, Si, P, Al, N, Cr, Mo, Ni, Cu, Ca, Mg, Ce, Hf, La, Zr, and Sb may be included. For example, the ferrous material can have a composition including C, Si, Mn, P, S, Al, and N and having a balance of iron and impurities.

Preferably, as the metal member in the present invention, a plated steel material which has been plated to improve the corrosion resistance may be used. The type of the plated steel material is not limited, but may be a Zn-based plated steel material, for example, Zn—Ni plated steel material, Zn—Al plated steel material, Zn—Al—Mg plated steel material, or Zn—Al—Mg—Si plated steel material. Note that, a Zn-based plated steel material has a greater potential difference with carbon fiber than a steel material, so dissimilar metal corrosion occurs extremely easily. However, in the composite according to the present invention, it is possible to sufficiently suppress dissimilar metal corrosion due to the insulating layer 30, so even if using a plated steel material for the metal member 10, dissimilar metal corrosion does not become a problem.

To improve the bondability of the insulating layer 30 and the CFRP layer 40, the surface of the metal member 10 is preferably treated by a primer. As the primer used for this treatment, for example, a silane coupling agent or triazine thiol derivative is preferable. As the silane coupling agent, an epoxy-based silane coupling agent or amino-based silane coupling agent, or imidazole silane compound may be mentioned. As the triazine thiol derivative, 6-diallylamino-2,4-dithiol-1,3,5-triazine, 6-methoxy-2,4-dithiol-1,3,5-triazine monosodium, 6-propyl-2,4-dithiolamino-1,3,5-triazine monosodium and 2,4,6-trithiol-1,3,5-triazine, etc. may be illustrated. Further, to improve the bondability between the insulating layer 30 and the CFRP layer 40 more, it is effective to wash the surfaces with acetone before the primer treatment or wash them with alkali or otherwise degrease them. Further, even if oil remains at the surfaces of the steel sheet etc., it is effective to coat a binder for oily surfaces able to secure bondability etc. on the surface of the metal member 10.

Note that, the thickness of the metal member 10 is not particularly limited. It may be suitably determined in accordance with the mechanical strength etc. sought from the metal-fiber reinforced plastic composite. For example, it may be made 0.1 to 4.0 mm or so.

First Matrix Resin

As the insulating layer 30, a first matrix resin having an insulating ability is used. The type of the first matrix resin 31 is not particularly limited so long as exhibiting an insulating ability. Either a thermoplastic resin or thermosettable resin can be used. A thermoplastic resin having an excellent bending strength and excellent in workability is preferable. For example, as the resin component of the first matrix resin 31, 50 parts by mass or more, 60 parts by mass or more, 70 parts by mass or more, 80 parts by mass or more, or 90 parts by mass or more of a thermoplastic resin may be contained with respect to 100 parts by mass of the resin component. The first matrix resin 31 may also include just a thermoplastic resin. The type of the thermoplastic resin which can be used for the first matrix resin 31 is not particularly limited. For example, a resin selected from a phenoxy resin, polyolefin and acid modified forms of the same, polypropylene, polystyrene, polymethyl methacrylate, AS resin, ABS resin, polyethylene terephthalate or polybutylene terephthalate or other thermoplastic aromatic polyesters, polycarbonate, polyimide, polyamide, polyamide-imide, polyetherimide, polyethersulfone, polyphenylene ether, and modified forms thereof, polyphenylene sulfide (PPS), polyoxymethylene, polyarylate, polyetherketone, polyetheretherketone (PEEK), polyetherketone ketone, thermoplastic epoxy resin, unsaturated polyester resin, phenol resin, urethane resin, and nylon etc. can be used.

Among these, as the first matrix resin 31, it is more preferable to use a phenoxy resin with a molecular structure very similar to an epoxy resin. A phenoxy resin has the same extent of heat resistance as an epoxy resin due to the similarity of the molecular structure with the epoxy resin, so by using a phenoxy resin for the first matrix resin 31, it becomes possible to obtain both heat resistance and workability of the metal-CFRP composite 1. Note that, it is also possible to obtain a cross-linkable resin composition (that is, a cured form of the resin composition) by mixing, for example, an acid anhydride, isocyanate, caprolactam, etc. as the cross-linking agent in a resin composition containing a phenoxy resin. A cross-linkable resin composition is improved in heat resistance of the resin composition due to causing a cross-linking reaction utilizing the secondary hydroxyl groups contained in the phenoxy resin, so is advantageous for application to members used in a higher temperature environment.

Note that, the composition of the first matrix resin may differ from the composition of the resin forming the second matrix resin 41 forming the CFRP layer 40. However, to further improve the bondability between the insulating layer 30 and the CFRP layer 40 and further improve the mechanical strength of the metal-CFRP composite 1 as a whole, the first matrix resin is preferably a resin of the same type as the second matrix resin 41.

Here, "resin of the same type" means the ratios of the compositions may differ so long as the main components are the same. Further, "main component" means a component contained in 50 parts by mass or more in 100 parts by mass of all of the resin components. Note that, "resin components" include thermoplastic resins and thermosettable resins, but cross-linking agents and other nonresin components are not contained.

Nonconductive Fiber

The insulating layer 30 may also contain nonconductive fiber 32. Due to the presence of the nonconductive fiber 32, the insulating layer 30 becomes a layer having an insulating ability, contact between the carbon fiber material 42 and the metal member 10 in the CFRP layer 40 is prevented, and dissimilar metal corrosion (electrolytic corrosion) can be suppressed more. Further, by the nonconductive fiber 32 being added, the strength is improved compared with an insulating layer of only the first matrix resin 31. The nonconductive fiber 32 in the present invention is not particularly limited so long as a fiber material not having conductivity, but preferably it may include at least one type of fiber selected from glass fiber and aramid fiber.

Even in the case of a GFRP layer containing glass fiber, the first matrix resin 31 forming the GFRP layer is preferably a resin of the same type as the second matrix resin 41. Further, the glass fiber is not particularly limited. This glass fiber reinforcing material may also be a UD material with fiber bundles aligned in one direction and may also be a cloth material with fiber bundles woven in a net shape. Furthermore, if using the GFRP layer as the insulating layer 30, this GFRP layer may be a single-layer member comprised of a single layer or may be a multilayer member comprised of a plurality of layers stacked together.

The content of the nonconductive fiber 32 of the insulating layer 30 (volume fraction of fiber Vf) is not particularly limited. If the content of the nonconductive fiber 32 is more than 60 vol %, the ratio of the first matrix resin 31 occupied in the insulating layer 30 is small and cracks might form in the insulating layer when worked, so this is not preferable. Furthermore, sometimes it becomes difficult to impregnate the nonconductive fiber 32 in the first matrix resin 31. Accordingly, from the viewpoint of imparting a good insulating ability to the insulating layer 30 and securing sufficient workability, the volume fraction of fiber Vf is preferably 60 vol % or less. On the other hand, from the viewpoint of imparting insulating ability to the insulating layer 30 and improving strength, the volume fraction of fiber Vf may be 10 vol % or more. Preferably, the volume fraction of fiber Vf is 15 vol % or more, 20 vol % or more, or 30 vol % or more and, further, is 55 vol % or less, 50 vol % or less, or 45 vol % or less.

The method of measurement of the content of the nonconductive fiber 32 of the insulating layer 30 (volume fraction of fiber Vf) may be as follows:

A knife or cutting machine etc. is used to peel off the CFRP layer 40 from the interface of the insulating layer 30 and the CFRP layer 40 of the metal-CFRP composite 1, then peel off the insulating layer 30 from the interface of the metal member 10 and the insulating layer 30 to obtain a test piece for measurement of the content of the nonconductive fiber 32. The absolute dry mass (W1) of that test piece (peeled off insulating layer 30) is measured. Next, the test piece is dipped in 20% hydrochloric acid to make the first matrix resin dissolve and the absolute dry weight (W2) of the nonconductive fiber obtained as a residue is measured. After measurement, the content of the nonconductive fiber based on mass Wf (mass %)=(W2/W1)×100 is found and the density $\rho 1$ (g/cm$^3$) of the test piece and the density $\rho 2$ (g/cm$^3$) of the nonconductive fiber are used to calculate the volume fraction of the nonconductive fiber in the insulating layer Vf (vol %)=Wf×($\rho 1/\rho 2$).

CFRP Layer

The CFRP layer 40 according to the present embodiment has a second matrix resin 41 and carbon fiber 42 contained in the second matrix resin 41 and combined with it. Further, the CFRP layer 40 may have a single-layer structure comprised of one CFRP or may have multilayer structure comprised of a plurality of CFRP.

Here, the thickness of the CFRP layer 40 (thickness $d_2$ in FIG. 2) may be suitably set in accordance with the objective of use. For example, the thickness of the CFRP layer 40 can, for example, be made 0.1 mm to 6.0 mm or so. The average thickness of the CFRP layer 40 can be found in the same way as the average thickness of the above-mentioned coating layer 20 or insulating layer 30. The average thickness of the CFRP layer 40 is preferably 0.2 mm or more, 0.3 mm or more, or 0.5 mm or more and, further, 5.5 mm or less or 5.0 mm or less, 4.0 mm or less, 3.0 mm or less, 2.5 mm or less, and 2.0 mm or less.

Further, the total number of layers "n" of the CFRP layer 40 when providing one or more CFRP layers 40 may be suitably determined in accordance with the objective of use. If providing a plurality of CFRP layers 40, the CFRP layers may be configured the same or may be different. That is, the types and contents etc. of the matrix resins and carbon fiber forming the respective CFRP layers may differ for each layer. However, from the viewpoints of securing bondability of the CFRP layers, the plurality of the CFRP layers preferably are selected from the same or similar resins or resins similar in ratios of polar groups contained in the polymers etc.

Carbon Fiber

The CFRP layer 40 in the present invention contains a carbon fiber material 42. Due to the presence of that carbon fiber material 42, the strength is improved compared with a resin layer of only the second matrix resin 41. The carbon fiber material 42 in the present invention is not particularly limited so long as being a carbon fiber material. A pitch-based carbon fiber material or PAN-based carbon fiber material can be used. The carbon fiber material 42 may contain just a single type of carbon fiber material or may contain two or more types of carbon fiber materials.

The carbon fiber material 42 of the CFRP layer 40 is not particularly limited. For example, either a PAN-based or pitch-based one may be used. It may be selected in accordance with the objective or application. Further, as the carbon fiber 42, the above-mentioned fiber may be used as a single type alone or may be used as a plurality of types jointly. In the metal-CFRP composite 1 according to the present embodiment, the carbon fiber 42 may be a UD material with fiber bundles aligned in one direction and may also be a cloth material with fiber bundles woven in a net shape. The UD materials may also be alternately stacked to obtain an alternately stacked material. Here, the size of the fiber bundles of the carbon fiber 42 is not particularly prescribed, but, for example, by using a fiber opening technique etc. to spread the fibers thinly, it is possible to increase the impregnation ability of the resin. The size is preferably made 100 to 200 μm or so.

The content of carbon fiber of the CFRP layer 40 (volume fraction of fiber Vf) is preferably 10 vol % or more and 70 vol % or less from the viewpoint of securing the strength and workability. If the content of the carbon fiber material 42 is less than 10 vol %, the CFRP layer 40 is liable to not be sufficiently reinforced. On the other hand, the content of the carbon fiber material 42 becoming more than 70 vol % is not preferable cost-wise. Furthermore, sometimes it becomes difficult to impregnate the carbon fiber material 42 in the CFRP layer 40. The content of the carbon fiber material 42 in the CFRP layer 40 is preferably 15 vol % or more, 20 vol % or more, or 30 vol % or more and, further, 65 vol % or less, 60 vol % or less, or 55 vol % or less.

The method of measuring the volume fraction of the carbon fiber material 42 of the CFRP layer 40 Vf (vol %) may be as follows: More specifically, a knife or cutting machine etc. is used to peel off the CFRP layer 40 from the interface of the insulating layer 30 and the CFRP layer 40 of the metal-CFRP composite 1 to obtain a test piece for measurement of the content of the carbon fiber material 42. The absolute dry weight (W3) of that test piece (peeled off CFRP layer 40) is measured. Next, the test piece is dipped in 20% hydrochloric acid to make the second matrix resin 41 dissolve and the absolute dry weight (W4) of the carbon fiber material 42 obtained as a residue is measured. After measurement, the content of the carbon fiber material 42 based on mass Wf (mass %)=(W4/W3)×100 is found and the density ρ3 (g/cm$^3$) of the test piece and the density ρ4 (g/cm$^3$) of the carbon fiber material 42 are used to calculate the volume fraction Vf (vol %)=Wf×(ρ3/ρ4) of the carbon fiber material 42 in the CFRP layer 40.

Second Matrix Resin

The second matrix resin 41 may, for example, be a solidified form or cured form of a resin composition exhibiting thermoplasticity (or a cross-linkable resin composition). Here, when simply referring to a "solidified form", it means a resin component itself which has solidified while when referring to a "cured form", it means a resin component to which various curing agents are included and which has been cured. Note that, the curing agent which can be contained in the cured form may include a later explained cross-linking agent as well. The above-mentioned "cured form" shall include a cross-linked cured form which is shaped while cross-linked.

The second matrix resin 41 is a resin forming the CFRP layer 40. The type of the second matrix resin 41 is not particularly limited. Either a thermoplastic resin or thermosettable resin can be used. Preferably, a thermoplastic resin having an excellent bending strength and excellent in workability is used. For example, as the resin component of the second matrix resin 41, 50 parts by mass or more, 60 parts by mass or more, 70 parts by mass or more, 80 parts by mass or more, or 90 parts by mass or more of a thermoplastic resin may be contained with respect to 100 parts by mass of the resin component. Alternatively, the second matrix resin 41 may also include just a thermoplastic resin.

The type of the thermoplastic resin which can be used for the second matrix resin 41 is not particularly limited. It may also be the same as the first matrix resin 31. For example, a resin selected from a phenoxy resin, polyolefin and acid modified forms of the same, polypropylene, polystyrene, polymethyl methacrylate, AS resin, ABS resin, polyethylene terephthalate or polybutylene terephthalate or other thermoplastic aromatic polyesters, polycarbonate, polyimide, polyamide, polyamide-imide, polyetherimide, polyethersulfone, polyphenylene ether, and modified forms thereof, polyphenylene sulfide, polyoxymethylene, polyarylate, polyetherketone, polyetheretherketone, polyetherketone ketone, thermoplastic epoxy resin, unsaturated polyester resin, phenol resin, urethane resin, and nylon etc. can be used. Note that, "thermoplastic resin" also includes a resin which can form a cross-linked cured form in a later explained second cured state.

The thermoplastic resin used as the resin component of the second matrix resin 41 preferably is one having a melt viscosity of 3,000 Pa·s or less in any temperature region of 160 to 250° C. in range, more preferably is one having a melt viscosity of 90 Pa·s or more and 2,900 Pa·s or less in range, still more preferably is one having a melt viscosity of 100 Pa·s or more and 2,800 Pa·s or less in range. By making the melt viscosity at 160 to 250° C. in range of temperature region 3,000 Pa·s or less, the fluidity at the time of melting becomes excellent and voids or other defects become hard to form in the CFRP layer 40. On the other hand, if the melt viscosity is 90 Pa·s or less, the molecular weight of the resin composition becomes too small. If the molecular weight is small, the resin becomes brittle and the mechanical strength of the metal-CFRP composite 1 ends up falling.

As the second matrix resin 41, it is more preferable to use a phenoxy resin with a molecular structure very similar to an epoxy resin. A phenoxy resin has the same extent of heat resistance as an epoxy resin due to the similarity of the molecular structure with the epoxy resin, so by using a phenoxy resin for the second matrix resin 41, it becomes possible to obtain both heat resistance and workability of the metal-CFRP composite 1. Furthermore, using a phenoxy resin for the first matrix resin 31 of the insulating layer 30 and using a phenoxy resin for the second matrix resin 41 of the CFRP layer 40 is more preferable since the bondability of these layers is improved. Note that, it is also possible to obtain a cross-linkable resin composition (that is, a cured form of the resin composition) by mixing, for example, an acid anhydride, isocyanate, caprolactam, etc. as the cross-linking agent in a resin composition containing a phenoxy resin. A cross-linkable resin composition is improved in heat resistance of the resin composition due to causing a cross-linking reaction utilizing the secondary hydroxyl groups contained in the phenoxy resin, so is advantageous for application to members used in a higher temperature environment.

Phenoxy Resin

When using a thermosettable resin for the first matrix resin 31 and second matrix resin 41 (below, also referred to together as simply the "matrix resin") in the present invention explained above, problems arise such as the insulating layer 30 and the CFRP layer 40 becoming brittle, the tact time becoming longer, and bending becoming impossible. Therefore, these problems can be eliminated by the matrix resin 41 containing a thermoplastic resin.

However, usually, a thermoplastic resin is high in viscosity when molten and cannot be made to impregnate a fiber material in a low viscosity state like an epoxy resin or other thermosettable resin before thermosetting, so is poor in ability to impregnate a fiber material. For this reason, it is not possible to raise the volume fraction of fiber (Vf) in the insulating layer 30 and the CFRP layer 40 like the case of using a thermosettable resin as the matrix resin.

Further, if using polypropylene or nylon or other thermoplastic resin, the insulating layer 30 and the CFRP layer 40 cannot be given a high heat resistance like when using an epoxy resin or other thermosettable resin.

To eliminate such problems when using a thermoplastic resin, it is preferable to use a phenoxy resin as the second matrix resin 41. A phenoxy resin is very similar to an epoxy resin in molecular structure, so has the same extent of heat resistance as an epoxy resin. Further, the bondability with the metal member 10 or fiber material becomes excellent. In particular, the wettability with carbon fiber coated with a sizing agent for epoxy resin use is good and the impregnation ability is excellent. Further, the bondability with the metal member 10 becomes excellent. Furthermore, by adding a curable component like an epoxy resin to the phenoxy resin and making them copolymerize, a so-called partially curable resin can be formed. By using such a partially curable resin as the second matrix resin 41, it is possible to obtain a matrix resin excellent in ability to impregnate the fiber material. Furthermore, by causing the curable component in the partially curable resin to thermally set, it is possible to keep the matrix resin in the insulating layer 30 and the CFRTP layer 40 from melting or softening when exposed to a high temperature like a usual thermoplastic resin. The amount of addition of the curable component in the phenoxy resin should be suitably determined considering the ability to impregnate the fiber material and the brittleness, tact time, and workability of the insulating layer 30 and CFRTP layer 40 etc. In this way, by using a phenoxy resin as the matrix resin, it is possible to add and control the curable component with a high degree of freedom.

Further, in thermoplastic resins, a phenoxy resin is provided with good formability and is excellent in bondability with the fiber material or metal member 10. In addition, by using an acid anhydride or isocyanate compound, caprolactam, etc. as the cross-linking agent, it is possible to give similar properties as a high heat resistant thermosetting resin after shaping. Accordingly, in the present embodiment, as the resin component of the matrix resin 41, it is preferable to use a solidified form or cured form of a resin composition containing 50 parts by mass or more of phenoxy resin with respect to 100 parts by mass of the resin component. By using such a resin composition, it becomes possible to strongly join the insulating layer 30, metal member 10, insulating layer 30, and CFRP layer 40 and, in the later explained second embodiment, the coating layer 20 and the insulating layer 30. The resin composition more preferably contains 55 parts by mass or more of the phenoxy resin in 100 parts by mass of the resin component, for example, 60 parts by mass or more, 70 parts by mass or more, 80 parts by mass or more, 90 parts by mass or more, and 100 parts by mass. The form of the binder resin composition may, for example, be made a powder, varnish or other liquid or film or other solid.

Note that, the content of the phenoxy resin, as explained below, can be measured using infrared spectroscopy (IR). If analyzing the ratio of content of phenoxy resin from the resin composition covered by the infrared spectroscopy, the transmission method or ATR reflection method or other general method of infrared spectroscopy can be used for measurement.

For example, a sharp knife etc. is used to cut out the CFRTP layer 40. As much as possible, the fibers and grain shaped bodies are removed by tweezers etc. to obtain a sample of the resin composition for analysis from the CFRTP layer 40. In the case of the transmission method, KBr powder and the powder of the resin composition for analysis are homogeneously mixed by a mortar etc. while crushing them to prepare a thin film for use as a sample. In the case of the ATR reflection method, in the same way as the transmission method, powders may be homogeneously mixed by a mortar while crushing them to prepare tablets to prepare samples or monocrystalline KBr tablets (for example diameter 2 mm×thickness 1.8 mm) may be scored at their surfaces by a file etc. and packed with powder of the resin composition for analysis for use as samples. Whichever the method, it is important to measure the background at the KBr by itself before mixing with the resin for analysis. The IR measurement apparatus used may be a general one on the commercial market, but as precision, an apparatus having a precision of analysis enabling differentiation of absorbance in 1% units and wavenumber in 1 $cm^{-1}$ units is preferable. For example, FT/IR-6300 made by JASCO Corporation etc. may be mentioned.

If investigating the content of the phenoxy resin, there are absorption peaks of the phenoxy resin at for example 1450 to 1480 $cm^{-1}$, near 1500 $cm^{-1}$, near 1600 $cm^{-1}$, etc. For this reason, the content of the phenoxy resin can be calculated based on the calibration line prepared in advance showing the relationship between the strength of the absorption peak and the content of the phenoxy resin and the measured strengths of the absorption peaks.

Here, a "phenoxy resin" is a linear polymer obtained by a condensation reaction of a dihydric phenol compound and epihalohydrin or a polyaddition reaction of a dihydric phenol compound and bifunctional epoxy resin and is a non-crystalline thermoplastic resin. A phenoxy resin can be obtained by a conventionally known method in a solution or without a solvent and can be used in the form of any of a powder, varnish, or film. The average molecular weight of the phenoxy resin is, in terms of the mass average molecular weight (Mw), for example, 10,000 or more and 200,000 or less in range, preferably 20,000 or more and 100,000 or less in range, more preferably 30,000 or more and 80,000 or less in range. By making the Mw of the phenoxy resin 10,000 or more in range, it is possible to increase the strength of a shaped part. This effect is further enhanced by making the Mw 20,000 or more, furthermore 30,000 or more. On the other hand, by making the Mw of the phenoxy resin 200,000 or less, it is possible to make the work efficiency and workability better. This effect is further enhanced by making the Mw 100,000 or less, furthermore 80,000 or less. Note that, in the Description, Mw is the value obtained by measurement by gel permeation chromatography (GPC) and conversion using a standard polystyrene calibration line.

The hydroxyl equivalent of the phenoxy resin (g/eq) used in the present embodiment is, for example, 50 or more and 1000 or less in range, but is preferably 50 or more and 750 or less in range, more preferably 50 or more and 500 or less in range. By making the hydroxyl equivalent of the phenoxy resin 50 or more, the hydroxyl groups decrease, whereby the water absorption falls, so the mechanical properties of the cured resin can be improved. On the other hand, by making the hydroxyl equivalent of the phenoxy resin 1,000 or less, the hydroxyl groups can be kept from being decreased, so the affinity with the adhered to member can be improved and the mechanical properties of the metal-CFRTP composite 1 can be improved. This effect is further enhanced if making the hydroxyl equivalent 750 or less and furthermore 500 or less.

Further, the glass transition temperature (Tg) of the phenoxy resin, for example, is suitably 65° C. or more and 150° C. or less in range, but is preferably 70° C. or more and 150° C. or less in range. If Tg is 65° C. or more, it is possible to secure shapeability while keeping the fluidity of the resin from becoming too large, so it is possible to sufficiently secure the thickness of the CFRP layer 40. On the other hand, if Tg is 150° C. or less, the melt viscosity becomes lower, so the fiber reinforced base material can be easily impregnated without any voids or other defects and the joining process can be made lower in temperature. Note that, in the Description, the Tg of the resin is a value obtained by using a differential scanning calorimeter under conditions of a temperature rise of 10° C./min at 20 to 280° C. in range of temperature and calculated by the peak value of a second scan.

The phenoxy resin is not particularly limited so long as satisfying the above physical properties, but as preferable ones, bisphenol A type phenoxy resin (for example, available as Phenotohto YP-50, Phenotohto YP-50S, and Phenotohto YP-55U made by Nippon Steel Chemical & Material Co., Ltd.), bisphenol F type phenoxy resin (for example, available as Phenotohto FX-316 made by Nippon Steel Chemical & Material Co., Ltd.), a copolymer type phenoxy resin of bisphenol A and bisphenol F (for example, available as YP-70 made by Nippon Steel Chemical & Material Co., Ltd.) or resins other than the above mentioned phenoxy resins such as a brominated phenoxy resin or phosphorus-containing phenoxy resin, sulfone group-containing phenoxy resin, or other special phenoxy resin (for example, Phenotohto YPB-43C, Phenotohto FX293, YPS-007, etc. made by Nippon Steel Chemical & Material Co., Ltd.), etc. may be mentioned. These resins may be used as single types alone or as two types or more mixed together.

Cross-Linkable Resin Composition

A resin composition containing a phenoxy resin (below, also referred to as a "phenoxy resin (A)") may, for example, have an acid anhydride, isocyanate, caprolactam, etc. blended into it as a cross-linking agent to thereby obtain a cross-linkable resin composition (that is, cured form of resin composition). The cross-linkable resin composition is made to cross-link by a reaction utilizing the secondary hydroxyl groups contained in the phenoxy resin (A) to thereby improve the heat resistance of the resin composition, so becomes advantageous for application to a member used in a higher temperature environment. For cross-linking utilizing the secondary hydroxyl groups of the phenoxy resin (A), it is preferable to use a cross-linkable resin composition containing a cross-linkable curable resin (B) and cross-linking agent (C). As the cross-linkable curable resin (B), for example, an epoxy resin etc. may be used, but the invention is not particularly limited to this. By using such a cross-linkable resin composition, a cured form (cross-linked cured form) of a second cured state with a Tg of the resin composition improved more greatly than in the case of the phenoxy resin (A) alone is obtained. The Tg of the cross-link cured form of the cross-linkable resin composition is, for example, 160° C. or more, preferably 170° C. or more and 220° C. or less in range.

The cross-linkable curable resin (B) is not particularly limited in sense, but a crystalline epoxy resin is preferable. A crystalline epoxy resin having a melting point of 70° C. or more and 145° C. or less in range and a melt viscosity at 150° C. of 2.0 Pa·s or less is more preferable. By using a crystalline epoxy resin exhibiting such melting characteristics, it is possible to lower the melt viscosity of the cross-linkable resin composition used as the resin composition and possible to improve the bondability of the insulating layer 30. If the melt viscosity is over 2.0 Pa·s, the shapeability of the cross-linkable resin composition may fall and the homogeneity of the metal-CFRP composite 1 may fall.

As the crystalline epoxy resin suitable as the cross-linking curable resin (B), bisphenol A type epoxy resin (for example, available as Epotohto YD-011, Epotohto YD-7011, and Epotohto YD-900 made by Nippon Steel Chemical & Material Co., Ltd.), bisphenol F type epoxy resin (for example, Epotohto YDF-2001 made by Nippon Steel Chemical & Material Co., Ltd.), diphenylether type epoxy resin (for example, YSLV-80DE made by Nippon Steel Chemical & Material Co., Ltd.), tetramethyl bisphenol F type epoxy resin (for example, YSLV-80XY made by Nippon Steel Chemical & Material Co., Ltd.), bisphenol sulfide type epoxy resin (for example, YSLV-120TE made by Nippon Steel Chemical & Material Co., Ltd.), hydroquinone type epoxy resin (for example, Epotohto YDC-1312 made by Nippon Steel Chemical & Material Co., Ltd.), phenolnovolac type epoxy resin, (for example, Epotohto YDPN-638 made by Nippon Steel Chemical & Material Co., Ltd.), o-cresolnovolac type epoxy resin (for example, Epotohto YDCN-701, Epotohto YDCN-702, Epotohto YDCN-703, and Epotohto YDCN-704 made by Nippon Steel Chemical & Material Co., Ltd.), aralkyl naphthalenediol novolac type epoxy resin (for example, ESN-355 made by Nippon Steel Chemical & Material Co., Ltd.), triphenylmethane type epoxy resin (for example, EPPN-502H made by Nippon Kayaku Co., Ltd.), etc. may be illustrated, but the invention is not limited to these. Further, these epoxy resins may be used as single types alone or used as two types or more mixed together.

The cross-linking agent (C) forms ester bonds with the secondary hydroxyl groups of the phenoxy resin (A) to thereby three-dimensionally cross-link the phenoxy resin (A). For this reason, unlike strong cross-linking such as curing of the thermosetting resin, it is possible to reverse the cross-linking by a hydrolysis reaction, so it becomes possible to easily peel apart the metal member 10 and insulating layer 30. Therefore, it becomes possible to recycle the metal member 10.

As the cross-linking agent (C), an acid anhydride is preferable. The acid anhydride is solid at ordinary temperature. It is not particularly limited so long as not having much of a sublimation ability, but from the viewpoint of imparting heat resistance to the metal-CFRP composite 1 and reactivity, an aromatic acid anhydride having two or more acid anhydrides reacting with the hydroxyl groups of the phenoxy resin (A) is preferable. In particular, an aromatic compound having two acid anhydride groups such as pyromellitic anhydrides is suitably used since it becomes higher in cross-linking density and is improved in heat resistance compared with a combination of trimellitic anhydride and hydroxyl groups. Among aromatic acid dianhydrides, for example, 4,4'-oxydiphthalic acid and ethylene glycol bisanhydrotrimellitate, 4,4'-(4,4'-isopropylidene diphenoxy) diphthalic anhydride and other such aromatic acid dianhydrides having compatibility with a phenoxy resin and epoxy resin have large effects of improvement of the Tg and are more preferable. In particular, aromatic acid dianhydrides having two acid anhydride groups such as pyromellitic anhydride, for example, are improved in cross-linking density and improved in heat resistance compared with anhydrous phthalic acid having only one acid anhydride group, so are preferably used. That is, an aromatic acid dianhydride is good in reactivity since it has two acid anhydride groups and gives a cross-linked and cured form of sufficient strength for mold release in a short molding time and produces four carboxyl groups by an esterification reaction with the secondary hydroxyl groups in the phenoxy resin (A), so the final cross-linking density can be made higher.

The reaction of the phenoxy resin (A), the epoxy resin used as the cross-linkable curable resin (B), and the cross-linking agent (C) is an esterification reaction of the secondary hydroxyl groups in the phenoxy resin (A) and the acid anhydride groups of the cross-linking agent (C). Furthermore, the composition is cross-linked and cured by the reaction of the carboxyl groups produced by this esterification reaction and the epoxy groups of the epoxy resin. Due to the reaction of the phenoxy resin (A) and cross-linking agent (C), it is possible to obtain a cross-linked form of the phenoxy resin, but due to the copresence of the epoxy resin, the melt viscosity of the resin composition is made to fall, so impregnation in the material to be bonded with can be improved, the cross-linking reaction is promoted, the cross-linking density is improved, the mechanical strength is improved, and other excellent characteristics are exhibited.

Note that, in the cross-linkable resin composition, the epoxy resin used as the cross-linkable curable resin (B) is copresent, but the phenoxy resin (A) of the thermoplastic resin is the main component. It is believed that an esterification reaction between its secondary hydroxyl groups and the acid anhydride groups of the cross-linking agent (C) takes precedence. That is, the reaction between the acid anhydride used as the cross-linking agent (C) and the epoxy resin used as the cross-linkable curable resin (B) takes time (reaction speed is slow), so the reaction between the cross-linking agent (C) and the secondary hydroxyl groups of the phenoxy resin (A) takes preference. Next, the cross-linking density rises due to the reaction between the cross-linking agent (C) remaining due to the previous reaction or the residual carboxyl groups derived from the cross-linking agent (C) and the epoxy resin. For this reason, unlike a resin composition having the epoxy resin of the thermosetting resin as a main component, the cross-linked cured form obtained by the cross-linkable resin composition is a thermoplastic resin and is excellent in storage stability.

In the cross-linkable resin composition utilizing cross-linking of the phenoxy resin (A), preferably the cross-linkable curable resin (B) is contained in 5 parts by mass or more and 85 parts by mass or less in range with respect to 100 parts by mass of the phenoxy resin (A). The content of the cross-linkable curable resin (B) with respect to 100 parts by mass of the phenoxy resin (A) is more preferably 9 parts by mass or more and 83 parts by mass or less in range, more preferably 10 parts by mass or more and 80 parts by mass or less in range. By making the content of the cross-linkable curable resin (B) 85 parts by mass or less, it is possible to shorten the curing time of the cross-linkable curable resin (B), so not only can the strength required for mold release be easily obtained in a short time, but also the recycling ability of the insulating layer 30 is improved. This effect is further enhanced by making the content of the cross-linkable curable resin (B) 83 parts by mass or less, furthermore, 80 parts by mass or less. On the other hand, by making the content of the cross-linkable curable resin (B) 5 parts by mass or more, the effect of improvement of the cross-linking density by addition of the cross-linkable curable resin (B) becomes easier to obtain, the cross-linked cured form of the cross-linkable resin composition can easily realize a Tg of 160° C. or more, and the fluidity becomes excellent. Note that, the content of the cross-linkable curable resin (B) can be measured in the same way for the peaks derived from the epoxy resin by the method using the above-mentioned infrared spectroscopy to measure the content of the cross-linkable curable resin (B).

The amount of the cross-linking agent (C) is usually an amount of 0.6 mole or more and 1.3 moles or less in range of acid anhydride groups with respect to 1 mole of secondary hydroxyl groups of the phenoxy resin (A), preferably an amount of 0.7 mole or more and 1.3 moles or less in range, more preferably 1.1 moles or more and 1.3 moles or less in range. If the amount of acid anhydride groups is 0.6 mole or more, the cross-linking density becomes higher, so the mechanical properties and heat resistance become excellent. This effect is further enhanced by making the amount of acid anhydride groups 0.7 mole or more, furthermore 1.1 moles or more. If the amount of acid anhydride groups is 1.3 moles or less, the unreacted acid anhydrides or carboxyl groups can be kept from having a detrimental effect on the curing characteristics or cross-linking density. For this reason, it is preferable to adjust the amount of the cross-linkable curable resin (B) in accordance with the amount of cross-linking agent (C). Specifically, for example, due to the epoxy resin used as the cross-linkable curable resin (B), for causing a reaction of the carboxyl groups formed by action of the secondary hydroxyl groups of the phenoxy resin (A) and the acid anhydride groups of the cross-linking agent (C), the amount of the epoxy resin is preferably made an equivalent ratio with the cross-linking agent (C) of 0.5 mole or more and 1.2 moles or less in range. Preferably, the equivalent ratio of the cross-linking agent (C) and the epoxy resin is 0.7 mole or more and 1.0 mole or less in range.

If mixing in a cross-linking agent (C) together with the phenoxy resin (A) and cross-linkable curable resin (B), it is possible to obtain a cross-linkable resin composition, but it is also possible to further include an accelerator (D) as a catalyst so that the cross-linking reaction is reliably performed. The accelerator (D) is solid at ordinary temperature. It is not particularly limited so long as not having a sublimation ability, but, for example, triethylene diamine or other tertiary amine, 2-methyl imidazole, 2-phenyl imidazole, 2-phenyl-4-methyl imidazole, or other imidazoles, triphenyl phosphine or other organic phosphines, tetraphenyl sulfonium tetraphenyl borate or other tetraphenylborates, etc. may be mentioned. These accelerators (D) may be used as single types alone or as two types or more jointly used. Note that, if making the cross-linkable resin composition a fine powder and using the powder coating method using an electrostatic field so as to deposit it on the reinforcing fiber base material to form the first matrix resin 31, as the accelerator (D), it is preferable to use an imidazole-based latent catalyst which is solid at an ordinary temperature of a catalyst activation temperature of 130° C. or more. If using an accelerator (D), the amount of the accelerator (D) is preferably 0.1 part by mass or more and 5 parts by mass or less in range with respect to 100 parts by mass of the total amount of the phenoxy resin (A), cross-linkable curable resin (B), and cross-linking agent (C).

The cross-linkable resin composition is solid at ordinary temperature. Its melt viscosity is preferably, in terms of a lowest melt viscosity, comprised of a lower limit value of melt viscosity in a temperature region of 160 to 250° C. in range, of 3,000 Pa·s or less, more preferably 2,900 Pa·s or less, still more preferably 2,800 Pa·s or less. By making the lowest melt viscosity in a temperature region of 160 to 250° C. in range 3,000 Pa·s or less, at the time of hot press bonding by a hot press etc., it is possible to make the cross-linkable resin composition sufficiently impregnate the material to be pressed and possible to suppress the formation of voids and other defects in the insulating layer 30, so the metal-CFRP composite 1 is improved in mechanical properties. This effect is further enhanced by making the lowest melt viscosity at the temperature region of 160 to 250° C. in range 2,900 Pa·s or less, furthermore 2,800 Pa·s or less.

The resin composition for forming the matrix resin (including cross-linkable resin composition) may contain, in a range not detracting from the bondability and physical properties, for example, a natural rubber, synthetic rubber, elastomer, etc. or various types of inorganic fillers, solvents, extender pigments, coloring agents, antioxidants, UV blockers, flame retardants, flame retardant aids, and other additives.

Method of Manufacture of Metal-CFRP Composite

Figure 7:
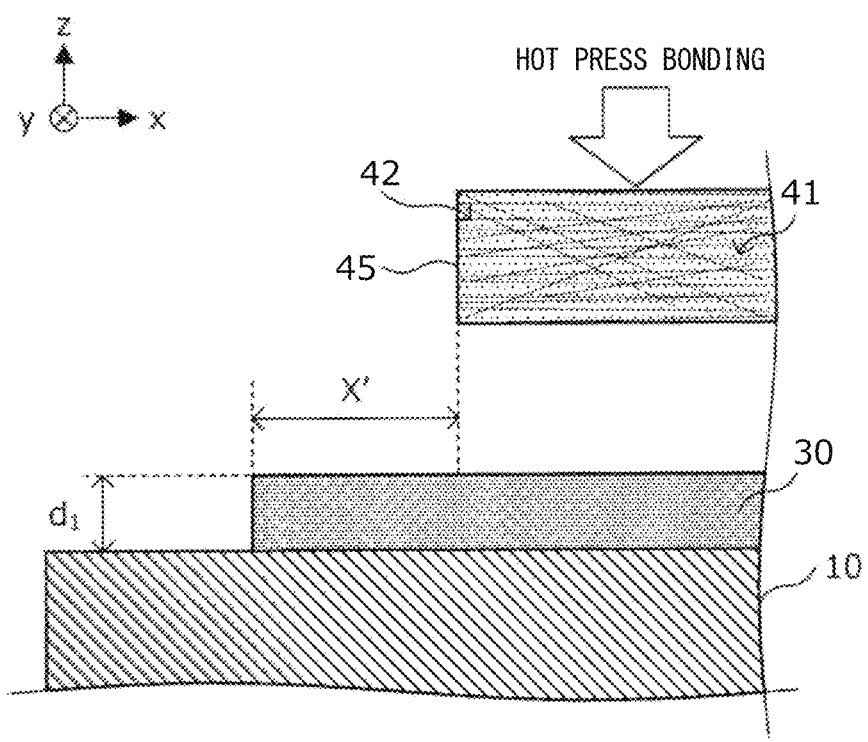
FIG. 7 is a conceptual view for explaining a method of manufacturing a metal-fiber reinforced plastic composite according to the same embodiment.

Next, while referring to FIG. 7, one example of the method of manufacture of the metal-CFRP composite 1 according to the present embodiment will be simply explained.

As shown in FIG. 7, a resin sheet forming the insulating layer 30 or a binder etc. is placed on the surface of the metal member 10 and CFRP comprised of a second matrix resin 41 having thermoplasticity and carbon fiber 42 (for example, CFRP prepreg 45) is arranged and hot press bonded. The treatment temperature at this time may have as its upper limit a temperature 170° C. higher than the glass transition temperature of the matrix resin or a temperature 50° C. higher than the melting point.

To make the separation distance between the end part (outer edge) 30a of the insulating layer 30 after press bonding and the end part (outer edge) 43 of the CFRP 0.2 mm or more, they may be arranged separated by exactly a thickness (mm) of the separation distance X' from the end part (outer edge) of the CFRP prepreg of X'≥0.2 (mm)+K× CFRP prepreg and K may be made 1.0 or more. From the viewpoint of securing the separation distance between the two outer edges after press bonding, K is preferably made 1.2 or more, further 1.5 or more. It is also possible to determine this in advance offline by a press bonding test. The upper limit of the separation distance X' between the end part (outer edge) of the CFRP prepreg and the outer edge of the insulating layer is not particularly limited, but from the viewpoint of warping or deflection of the metal-CFRP composite, 10 mm (10000 µm) may be made the upper limit.

Further, the insulating layer 30 and CFRP prepreg 45 may also be arranged so that the separation distance X' of the end part (outer edge) of the insulating layer 30 and the end part (outer edge) of the CFRP prepreg 45 satisfies the relationship as shown below. That is, the insulating layer 30 and CFRP prepreg 45 may be arranged so as to satisfy the relationship of 25·M≤X' when the value of the melt volume flow rate (MVR) at 240° C. of the second matrix resin 41 of the CFRP prepreg 45 is made M [cc/10 min]. Further, from the viewpoint of suppression of warping or deflection occurring in the metal member 10, it is preferable that the separation distance X' of the insulating layer 30 and the CFRP prepreg 45 become 10 mm (10000 µm) or less.

By positioning the insulating layer and the CFRP prepreg in the above way, the separation distance X2 between the end part (outer edge) 43 of the CFRP layer 40 and the end part (outer edge) 30a of the insulating layer 30 such as shown in FIG. 5A becomes 0.2 mm or more. Even if carbon fiber 42 flows out, carbon fiber is kept from contacting the metal member.

Due to this, the metal member 10 and the CFRP layer 40 are joined through the insulating layer 30 to obtain the metal-CFRP composite 1 according to the present embodiment.

Press Bonding Conditions

When the matrix resin is a noncrystalline thermoplastic resin or a polymer alloy of a noncrystalline thermoplastic resin, the hot press bonding temperature is preferably made the glass transition temperature Tg of the noncrystalline thermoplastic resin to Tg+170° C. in range. If the matrix resin is a crystalline thermoplastic resin or a polymer alloy of a crystalline thermoplastic resin, it is preferably made the melting point MP of the crystalline thermoplastic resin to MP+50° C. in range. If more than the upper limit temperature, the resin may break down. Further, if less than the lower limit temperature, the melt viscosity of the resin becomes higher and ability of it to deposit on the carbon fiber and the ability of it to impregnate the fiber reinforced base material may become poor.

Note that, a "crystalline resin" is a resin at which a melting point Tm is observed when measuring the melting point using differential scanning calorimetry (DSC) or differential thermal analysis (DTA). A "noncrystalline resin" is a resin at which no exothermic peak accompanying crystallization is observed and at which only a glass transition temperature Tg is observed when measuring the melting point using differential scanning calorimetry or differential thermal analysis.

The pressure at the time of hot press bonding may be made 3 MPa or more. More preferably, it may be made 3 MPa or more and 5 MPa or less in range. If the pressure is more than the upper limit, excessive pressure ends up being applied, so there is a possibility of deformation or damage occurring. Further, if it is less than the lower limit, the ability to impregnate the fiber reinforced base material becomes poorer.

If the hot press bonding time is at least 3 minutes or more, sufficient hot press bonding is possible. More preferably, it may be 5 minutes or more and 20 minutes or less in range.

The above-mentioned bulk shaping is preferably performed by a hot press, but it may also be performed by quickly setting a material heated in advance to a predetermined temperature in a low temperature press-forming machine.

Regarding Additional Heating Process

If using as the matrix resin a cross-linkable binder resin composition containing a phenoxy resin (A) plus a cross-linking curable resin (B) and cross-linking agent (C), it is possible to further include an additional heating process.

If using a cross-linkable binder resin composition, in the above hot press bonding process, the cured form (solidified form) in the first cured state where it is solidifying, but is not cross-linked and shaped (cured) may be used to form the CFRP layer 40 including a matrix resin comprised of the cured form (solidified form) in the first cured state.

After the above hot press bonding process, the metal member 10, insulating layer 30, and CFRP layer 40 formed by the cured form (solidified form) in the first cured state can be stacked and joined together to prepare an intermediate (preform) of the metal-CFRP composite 1. Further, by further performing an additional heating process on the intermediate after the hot press bonding process, the CFRP layer 40 formed by the cured form (solidified form) in the first cured state may be post-cured and the resin cross-linked and made to cure to make it change to a cured form in the second cured state (cross-linked cured form).

The additional heating process for post-curing preferably, for example, comprises holding at 200° C. or more and 250° C. or less in temperature for 30 minutes to 60 minutes or so. Note that, instead of post-curing, it is also possible to utilize the heat history in coating or post-processes.

As explained above, if using a cross-linkable binder resin composition, the Tg after the cross-linking and curing is greatly improved compared with a phenoxy resin (A) alone. For this reason, the Tg changes around when performing an additional heating process on the above-mentioned intermediate, that is, in the process of the resin changing from a cured form in a first cured state (solidified form) to a cured form in a second cured state (cross-linked cured form). Specifically, the Tg of the resin before cross-linking in the intermediate is, for example, 150° C. or less, while the Tg of the resin cross-linked and shaped after the additional heating process is, for example, 160° C. or more, preferably 170° C. or more and 220° C. or less in range, so the heat resistance can be greatly increased.

Pretreatment Process

As a pretreatment process, the metal member 10 is preferably degreased. Further, more preferably, the die is treated to facilitate release and deposits on the surface of the metal member 10 are removed (cleaned off). Except for steel such as TFS (tin free steel) where the bondability is extremely high, usually preferably the steel sheet or another metal member 10 on which anti-corrosion oil etc. is deposited is degreased to restore the bonding strength. The need for degreasing may be judged by joining together the metal member in question with the CFRP in question in advance without a degreasing process and confirming if a sufficient bondability can be obtained.

Post Process

As the post process, in addition to coating, drilling of holes for mechanically joining with other members by bolts or riveting etc., application of a binder for bonding, etc. may be suitably performed.

Method of Manufacture of CFRP Prepreg

Here, the method of manufacture of the CFRP or CFRP prepreg 45 (below, referred to together as the CFRP prepreg) used when forming the CFRP layer 40 will be explained.

In the CFRP prepreg 45 used when forming the CFRP layer 40, the fiber reinforced base material for forming the carbon fiber 42 may, for example, be a nonwoven base material using chopped fiber or a cloth material using continuous fiber, a unidirectional fiber reinforced base material (UD material), etc. can be used, but from the viewpoint of the reinforcing effect, use of a cloth material or UD material is preferable.

The CFRP prepreg 45 preferably uses a prepreg prepared using the powder coating method rather than a prepreg prepared by a conventional known method such as the wet melt or film stack method etc. A prepreg prepared by the powder coating method is excellent in drapeability since it is comprised of a resin impregnated in a fiber reinforced base material in the fine particle state. It can be made to fit with even complicated shapes of members to be joined, so is suitable for a bulk shaping hot press.

As the main methods of powder coating, for example, there are the electrostatic coating method, fluidized bed method, suspension method, etc. Either of the methods may be suitably selected depending on the type of the fiber reinforced base material or type of matrix resin. Among these, the electrostatic coating method and fluidized bed method are methods suitable for a thermoplastic resin. These are simple in process and good in productivity, so are preferable. In particular, the electrostatic coating method is excellent in uniformity of the deposition of the binder resin composition on the fiber reinforced base material, so is the most preferable method.

When forming the CFRP prepreg 45, if coating the binder resin composition for forming the matrix resin by powder coating, it is preferable to obtain the prepreg by making the binder resin composition containing the above-mentioned phenoxy resin (A) a fine powder and making this fine powder deposit on the fiber reinforced base material by powder coating.

To render the binder resin composition containing the phenoxy resin (A) a fine powder, for example, a low temperature dry crusher (centrifugal force dryer add mill) or other grinding mixer can be used, but the invention is not limited to this. Further, when crushing the binder resin composition for matrix resin use, the components of the binder resin composition may be crushed, then mixed or the components may be mixed in advance, then crushed. In this case, it is preferable to set the crushing conditions so that the fine powder becomes the later explained average particle size. The thus obtained fine powder has an average particle size of 10 µm or more and 100 µm or less in range, preferably 40 µm or more and 80 µm or less in range, more preferably 40 µm or more and 50 µm or less in range. By making the average particle size 100 µm or less, in powder coating in an electrostatic field, it is possible to reduce the energy when the binder resin composition strikes the fiber and possible to raise the rate of deposition of the fiber reinforced base material. Further, by making the average particle size 10 µm or more, it is possible to prevent the particles from being scattered by the accompanying air flow to lower the efficiency of deposition and possible to prevent the fine powder of resin floating in the air from triggering deterioration of the work environment.

As the binder resin composition for forming the CFRP prepreg 45, if coating powder of the cross-linkable binder resin composition obtained by mixing the phenoxy resin (A) with the cross-linking curable resin (B) and the cross-linking agent (C), the average particle sizes of the fine powder of the phenoxy resin (A) and the fine powder of the cross-linking curable resin (B) are preferably 1 to 1.5 times the average particle size of the fine powder of the cross-linking agent (C) in range. By making the particle size of the fine powder of the cross-linking agent (C) not more than the particle size of the fine powder of the phenoxy resin (A) and cross-linking curable resin (B), the cross-linking agent (C) penetrates to the inside of the fiber reinforced base material and deposits on the fiber reinforcing material. Further, the cross-linking agent (C) becomes present uniformly around the particles of the phenoxy resin (A) and the particles of the cross-linking curable resin (B), so the cross-linking reaction can be made to reliably proceed.

In the powder coating for forming the CFRP prepreg 45, the coating is preferably performed so that the amount of deposition of the binder resin composition forming the matrix resin on the fiber reinforced base material (resin content: RC) becomes, for example, 20% or more and 50% or less in range. The RC more preferably becomes 25% or more and 45% or less in range, more preferably becomes 25% or more and 40% or less in range. By making the RC 50% or less, it is possible to prevent a drop in the tensile strength and flexural modulus or other mechanical properties of the CFRP. Further, by making the RC 20% or more, the required amount of deposition of the resin can be secured, so the matrix resin becomes sufficiently impregnated inside of the fiber reinforced base material and the thermal properties and mechanical properties can be made higher.

The fine powder of the powder coated binder resin composition (forming matrix resin) is fixed to the fiber reinforced base material by hot melting. In this case, the powder may be coated on the fiber reinforced base material, then hot bonded or the fiber reinforced base material heated in advance may be powder coated and the fine powder of the binder resin composition may be coated on the fiber reinforced base material and simultaneously made to melt bond. By hot melting the fine powder of the binder resin composition on the surface of the fiber reinforced base material in this way, it is possible to improve the bondability to the fiber reinforced base material and prevent fine powder of the coated binder resin composition from shedding. However, at this stage, the binder resin composition forming the matrix resin may concentrate at the surface of the fiber reinforced base material and need not spread to the inside of the fiber reinforced base material such as a shaped article after hot press forming. Note that, the heating time for making the binder resin composition melt bond after powder coating is not particularly limited, but usually is 1 to 2 minutes. The melting temperature is 150 to 240° C. in range, preferably 160 to 220° C. in range, more preferably 180 to 200° C. in range. If the melting temperature exceeds the upper limit, a curing reaction may end up proceeding, while if it falls below the lower limit, the hot melt bonding becomes insufficient and, at the time of handling work, the fine powder of the binder resin composition is liable to drop off, shed, etc.

Second Embodiment

Overall Configuration of Metal-Fiber Reinforced Plastic Composite

Figure 9:
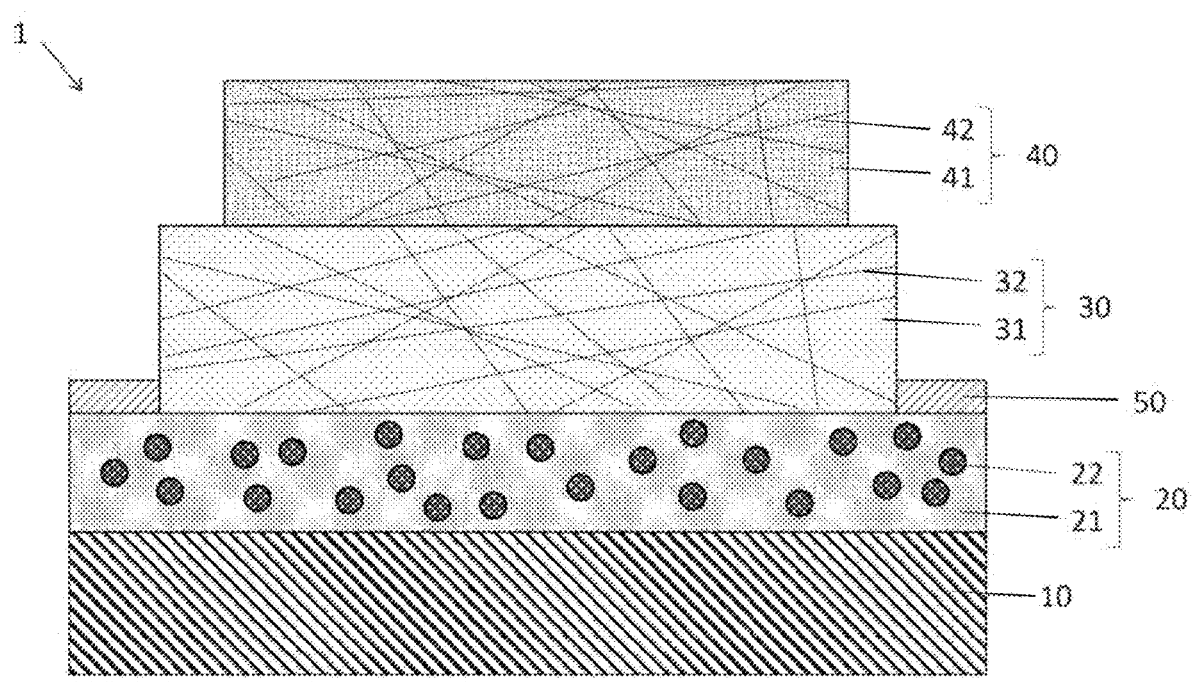
FIG. 9 is a conceptual view for explaining one example of the configuration of a metal-fiber reinforced plastic composite according to a second embodiment of the present invention.

The metal-fiber reinforced plastic composite according to a second embodiment of the present invention will be explained along with FIG. 9. The metal-CFRP composite 1 according to the second embodiment, as shown in FIG. 9, includes a metal member 10, coating layer 20, insulating layer 30 (below, sometimes referred to as a glass fiber reinforced plastic (GFRP) layer using GFRP as an example), and fiber reinforced plastic layer (below, sometimes referred to as a carbon fiber reinforced plastic layer using a CFRP layer as an example) 40.

The metal member 10, insulating layer 30, CFRP layer 40, and electrodeposition coating film 50 are similar to those in the first embodiment including their positional relationships. The electrodeposition coating film 50, like in the first embodiment, may be provided or may not be provided.

The present embodiment differs from the first embodiment in having a coating layer 20 on the surface of the metal member 10 (at least one of the surfaces) between the metal member 10 and the insulating layer 30. By making the coating layer 20 conductive, it becomes possible to coat the coating layer by electrodeposition and possible to form an electrodeposition coating film 50 at the part where the insulating layer 30 is not arranged. By providing the electrodeposition coating film 50, it is possible to improve the corrosion resistance of the metal-CFRP composite.

Further, as explained above, if forming an electrodeposition coating film, crevice corrosion due to the clearance formed at the boundary of the insulating layer and the electrodeposition coating film becomes an issue. Therefore, if forming the coating layer, moisture etc. penetrating the clearance does not directly contact the metal member, so it is possible to prevent crevice corrosion.

Further, it is possible to further provide a chemical conversion treated layer containing at least one element selected from Cr, P, Si, and Zr between the metal member 10 and the coating layer 20. By providing the chemical conversion treated layer, the bondability between the metal member 10 and the coating layer 20 is improved and a more improved workability (in particular, bending strength) can be achieved. The chemical conversion treated layer may be determined in components and thickness in accordance with the application. Alternatively, the metal-CFRP composite 1 according to the present invention may be comprised of only the metal member 10, coating layer 20, insulating layer 30, and CFRP layer 40 or may be comprised of only the metal member 10, coating layer 20, insulating layer 30, CFRP layer 40, and electrodeposition coating film 50.

In FIG. 9, a metal-CFRP composite 1 having a terrace structure is shown. If the metal-CFRP composite 1 has a terrace structure, compared with when not having a terrace structure, the physical distance between the outer edges of the CFRP layer 40 and the metal member 10 provided with the coating layer 20 can be made larger. For this reason, it becomes difficult for drops of water (film of water) to cover the outer edges of the CFRP layer 40 and the metal member 10. Therefore, electrical conduction between the carbon fiber material 42 and the metal member 10 through the conductive coating layer 20 can be suppressed and dissimilar metal corrosion can be sufficiently suppressed.

Further, if the metal-CFRP composite 1 has a terrace structure, in the same way as the first embodiment, the occurrence of the electrolytic corrosion action due to the outflow of the carbon fiber 42 is also suppressed. To more reliably obtain this effect, the outer edge of the CFRP layer 40 may be positioned at the inside from the outer edge of the insulating layer 30 by 0.2 mm or more.

As explained above, the metal member 10, insulating layer 30, CFRP layer 40, and electrodeposition coating film 50 are the same as the first embodiment, including the structural relationships, so the explanation here will be omitted. The coating layer unique to the present embodiment will be explained below.

Coating Layer 20

The coating layer 20 in the present embodiment, as shown in FIG. 9, includes a binder resin 21 and conductive particles 22. The conductive particles 22 are dispersed inside the coating layer 20. Therefore, that coating layer 20 is a layer having conductivity. Further, the coating layer 20 may be arranged on at least one surface of the metal member 10 and can be arranged on one side or both sides of the metal member 10. Further, as explained above, between the metal member 10 and the coating layer 20, a chemical conversion treated layer including at least one element selected from Cr, P, Si, and Zr may be further provided. Therefore, the coating layer 20 may be arranged contacting the metal member 10, and another layer such as a chemical conversion treated layer may be included between them.

In the metal-CFRP composite 1 according to the present embodiment, due to the presence of the coating layer 20 arranged at least at one surface of the metal member 10, corrosion of the metal member 10 due to crevice corrosion can be prevented. If not provided a coating layer 20 having conductivity, that is, if bonding the metal member 10 and the CFRP layer 40 through just the insulating layer 30 and forming an electrodeposition coating film 50 on the metal member 10 (for example, FIG. 2C), a clearance is formed at the boundary of the electrodeposition coating film 50 and the insulating layer and moisture etc. may penetrate into the clearance thereby causing the underlying metal member 10 to corrode. As opposed to this, in the present embodiment, the coating layer 20 is arranged on the metal member 10, so even if moisture etc. penetrates into that clearance, corrosion of the metal member 10 is suppressed and an improved corrosion resistance can be obtained. Furthermore, as explained later, in the present invention, the coating layer 20 includes conductive particles 22 having a rust preventing ability, so compared with an ordinary coating film, a higher corrosion resistance can be obtained. For this reason, it is possible to more effectively suppress corrosion of the metal member 10.

The coating layer may be arranged between at least the metal member and the insulating layer. Since the electrodeposition coating film is formed along the surfaces of the conductive coating layer and metal member, it becomes difficult for clearance to form with the electrodeposition coating film at the insulating layer end part. Preferably, when viewing the surface of the metal member from vertically above, the insulating layer is positioned at the inside of the region where the coating layer is present. Of course, the coating layer may also be formed over the entire surface of the metal member (at least one side). By doing this, not only does it become difficult for clearance to form at the boundary of the insulating coating film and electrodeposition coating film, but also, since the coating layer is sure to be formed at the boundary, crevice corrosion can be prevented.

The average thickness of the coating layer 20 is preferably 3 µm or more and 200 µm or less. By making it such a range, the conductive particles 22 can be made to uniformly disperse in the coating layer 20 and sufficient workability can be obtained. If the average thickness of the coating layer becomes less than 3 µm, depending on the average particle size of the conductive particles 22, sometimes the average thickness of the coating layer 20 becomes the average particle size of the conductive particles 22 or less and it becomes impossible to form a coating layer 20 having sufficient strength by the binder resin 21. On the other hand, if the average thickness of the coating layer 20 becomes more than 200 µm, a sufficient workability is liable to be unable to be necessarily secured. It is also not preferable cost-wise. Preferably, the average thickness of the coating layer 20 is 5 µm or more, 10 µm or more, or 15 µm or more, and also, 150 µm or less, 100 µm or less, or 50 µm or less.

In the present embodiment, the "average thickness" can be determined by a method known to persons skilled in the art. For example, if measuring the average thickness of the coating layer 20, it is possible to bury the metal-CFRP composite 1 according to the present embodiment in an epoxy resin or other thermosettable resin, use a cutting machine to cut the sample and expose the cross-section so as to become parallel to the thickness direction at the location to be observed, examine that cross-section by an optical microscope, measure the shortest distances from any positions of five locations of the interface between the metal member 10 and the coating layer 20 to the interface of the coating layer 20 and insulating layer 30 (that is, measure the distances in direction vertical to the interface), and find the average of these measured values. The average thicknesses of the insulating layer 30 and the CFRP layer 40 can be similarly found.

Binder Resin

The binder resin 21 in the coating layer 20 in the present embodiment is the resin forming the coating layer 20. The type of the binder resin 21 is not particularly limited, but may be selected from resins with a glass transition temperature Tg of 100° C. or less. If the glass transition temperature is 100° C. or less, the CFRP layer 40 may be made difficult to peel off even if bonding the CFRP layer 40 to the metal member 10, then shaping it. The binder resin 21 is not particularly limited. Either a thermosettable resin or a thermoplastic resin can be used. As the thermosettable resin, for example, a urethane resin, epoxy resin, polyester resin, melamine resin, vinyl ester resin, etc. may be mentioned. As the thermoplastic resin, a phenoxy resin, polyolefin (polypropylene etc.) and its acid-modified forms, polyethylene terephthalate or polybutylene terephthalate or other polyester resin, polycarbonate, polyimide, polyamide, polyamide-imide, polyetherimide, polyethersulfone, polyphenylene ether and modified forms thereof, polyarylate, polyetherketone, polyetheretherketone, polyetherketoneketone, nylon, etc., may be mentioned. Among the above-mentioned ones, the binder resin 21 preferably includes one or more resins selected from the group comprised of a urethane resin, epoxy resin, polyester resin, and melamine resin. These resins, while depending on the molecular weight and glass transition temperature, easily become fluid at ordinary temperature or can be easily coated by dissolving it in a solvent etc., so is suitable as the binder resin 21. The glass transition point of the binder resin 21 is preferably 10° C. or more and 60° C. or less, more preferably 10° C. or more and 35° C. or less. As the curing agent of the binder resin 21, a general curing agent, for example, an amine-based resin or melamine-based resin may be used.

Conductive Particles

The coating layer 20 in the present embodiment contains conductive particles 22. Due to the presence of the conductive particles 22, the coating layer 20 becomes a layer having conductivity. The coating layer 20 can be formed with an electrodeposition coating film 50. The conductive particles 22 in the present embodiment are selected from metal particles containing one or more elements selected from the group comprised of Zn, Si, Zr, V, Cr, Mo, Mn, and W, intermetallic compound particles, and conductive oxide particles or nonoxide ceramic particles. The conductive oxide particles or nonoxide ceramic particles preferably have $7.0 \times 10^7$ Ωcm or less powder resistivities at 25° C. so as to enable easy formation of the electrodeposition coating film 50. Note that, the metal particles and intermetallic compounds have $7.0 \times 10^7$ Ωcm or less powder resistivities at 25° C. The conductive particles 22 contained in the coating layer 20 may be just single types or may be two or more types mixed together. The conductive particles 22 preferably have $5.0 \times 10^7$ Ωcm or less, $3.0 \times 10^7$ Ωcm or less, or $1.0 \times 10^7$ Ωcm or less powder resistivities at 25° C. The elements forming the conductive particles 22 can be identified by analyzing the cross-section of the coating layer 20 in the metal-CFRP composite 1 by SEM-EDS (scanning electron microscope-energy dispersive X-ray spectrometer).

"Metal particles" means particles comprised of elements selected from the above group of elements. For example, Zn particles etc. may be mentioned. "Intermetallic compound particles" mean intermetallic compound particles including one or more elements selected from the above group of elements as component elements. For example, ferrosilicon, ferromanganese, etc. may be mentioned. "Conductive oxide particles" mean oxides having conductivity including elements selected from the above group of elements as component elements. For example, particles given conductivity by doping impurities at the crystal lattices of the oxides or particles given conductivity by modifying the surfaces of oxides by conductive substances may be mentioned. For example, there are zinc oxide or silica etc. modified by $SnO_2$.

The "conductive nonoxide ceramic particles" mean ceramic containing at least one element selected from the above group of elements and elements or compounds not containing oxygen. For example, boride ceramics, carbide ceramics, nitride ceramics, and silicide ceramics may be mentioned. Further, the "boride ceramics, carbide ceramics, nitride ceramics, and silicide ceramics" respectively mean nonoxide ceramics having boron B, carbon C, nitrogen N, and silicon Si as main nonmetal component elements. More specifically, as the conductive nonoxide ceramic particles $Mo_2B$, $MoB$, $MoB_2$, $Mo_2B_5$, $NbB_2$, $VB$, $VB_2$, $W_2B_5$, $Mo_2C$, $V_2C$, $VC$, $WC$, $W_2C$, $ZrC$, $Mo_2N$, $VN$, $ZrN$, $Mo_3Si$, $Mo_5Si_3$, $MoSi_2$, $NbSi_2$, $Ni_2Si$, $Ta_2Si$, $TaSi_2$, $TiSi$, $TiSi_2$, $V_5Si_3$, $VSi_2$, $W_3Si$, $WSi_2$, $ZrSi$, $ZrSi_2$, $CrB$, $CrB_2$, $Cr_3C_2$, $Cr_2N$, or $CrSi$ may be mentioned.

In the metal-CFRP composite 1 according to the present embodiment, as the metal particles including one or more elements selected from a group comprised of Zn, Si, Zr, V, Cr, Mo, Mn, and W, intermetallic compound particles, and conductive oxide particles or nonoxide ceramic particles which are suitably used, vanadium boride particles: $VB_2$, Al-doped zinc oxide particles: Al—ZnO, zinc particles: Zn, ferrosilicon particles: Fe—Si, ferromanganese particles: Fe—Mn, zirconium boride particles: $ZrB_2$, molybdenum silicide particles: $MoSi_2$, chromium boride particles: $CrB_2$, or tungsten silicide particles: $WSi_2$ may be mentioned.

The content of the conductive particles 22 in the coating layer 20 is not particularly limited, but the content is preferably, from the viewpoint of imparting good conductivity to the coating layer 20 and securing sufficient workability, 3 vol % or more and 60 vol % or less. If the content of the conductive particles 22 is less than 3 vol %, the number of contact points of the conductive particles 22 with each other becomes smaller, sufficient conductivity cannot necessarily be imparted, and formation of the electrodeposition coating film 50 is liable to become difficult. On the other hand, if the content of the conductive particles 22 is more than 60 vol %, the ratio of the binder resin 21 occupied in the coating layer 20 is small and cracks etc. may occur in the resin layer at the time of working. This is not preferable cost-wise as well. Preferably, the content of the conductive particles 22 in the coating layer 20 is 5 vol % or more, 10 vol % or more, 15 vol % or more, or 20 vol % or more and, further, is 55 vol % or less, 50 vol % or less, 45 vol % or less, or 40 vol % or less.

The content of the conductive particles 22 in the coating layer 20 in the metal-CFRP composite 1 can be obtained by finding the solid content mass ratio of the conductive particles 22 in the coating layer 20 added when preparing the coating layer 20 and calculating the content from the specific gravity of the binder resin 21 of the coating layer 20 and the specific gravity of the conductive particles 22. Further, the content of the conductive particles 22 in the coating layer 20 can be obtained by analyzing any cross-section of the coating layer 20 by an electron probe micro analyzer (EPMA), performing image analysis using a surface distribution photograph of the metal components contained in the conductive particles 22, and using the area ratio found as the content of the conductive particles 22 in the coating layer 20. The inventors studied this in depth and as a result discovered that the content in the coating layer 20 and the area fraction of the metal component contained in the conductive particles 22 measured using the EPMA in the cross-section strictly speaking differ, but are close values, so in the present embodiment, can be found as explained above.

The average particle size of the conductive particles 22 is not particularly limited, but, for example, is 50 μm or less, preferably 10 μm or less. By the average particle size of the conductive particles 22 being 50 μm or less, the conductive particles 22 of the oxides or inorganic salts are kept from projecting out at the surface of the coating layer 20 more and by becoming 10 μm or less, the surface area of all conductive particles in the coating film becomes greater and the particles easily dissolve out in a corrosive environment, so this is also effective for improvement of the corrosion resistance. If 10 μm or less, the effect of suppression of projection of the conductive particles 22 from the coating layer 20 is exhibited more, so this is preferred. Furthermore, by the average particle size of the conductive particles 22 being 1 μm or more, it is possible to make the contact with the metal member 10 more reliable and possible to make the conduction of these more reliable. Note that, if the conductive particles 22 aggregate to form secondary particles (aggregate), in the present embodiment, the average particle size of the secondary particles is made the average particle size of the conductive particles 22. Therefore, in the case of fine particles of a 1 μm or less nano order, the above effect is exhibited if the primary particles, even on the nano order, aggregate due to intermolecular force and the particle size as secondary particles becomes 1 μm or more.

Note that, the average particle size of the conductive particles 22 in the coating layer 20 can be determined using a generally known particle distribution measurement apparatus, for example, a laser diffraction-scattering type particle size measurement apparatus (Microtrac MT3300EX, made by Nikkiso Co., Ltd.) etc., and measuring the particle size (D50) when the cumulative volume by the volume standard becomes 50%. That is, the measured D50 may also be made the average particle size of the conductive particles 22. Further, when desiring to confirm the average particle size of the particles added in the state mixed in the coating layer 20, it is possible to analyze any cross-section of the coating layer 20 by a field-emission electron probe micro analyzer (EPMA) and find the average value of the particle sizes measured by a surface distribution photograph of the metal components included in the conductive particles 22.

The conductive particles 22 in the present embodiment, as explained above, include at least one element selected from the group comprised of Zn, Si, Zr, V, Cr, Mo, Mn, and W. Such particles typically have a rust preventing ability in addition to conductivity. Therefore, the conductive particles 22 are also provided with the action as a rust preventative pigment. As a result, the coating layer 20 acts as a film having a rust preventing ability and can more effectively suppress corrosion of the underlying metal member 10.

The coating layer 20 may contain, in a range not detracting from the bondability and physical properties, for example, a natural rubber, synthetic rubber, elastomer, etc. or various types of inorganic fillers, solvents, extender pigments, coloring agents, antioxidants, UV blockers, flame retardants, flame retardant aids, and other additives.

Electrodeposition Coating Film

The metal-CFRP composite 1 according to the present embodiment, as shown in FIG. 9, may further be provided with an electrodeposition coating film 50 at the surface of the coating layer 20 where the insulating layer 30 is not placed (part where surface of coating layer 20 is exposed). Due to the presence of the coating layer 20 containing the conductive particles 22, it is possible to form an electrodeposition coating film 50 at the surface of the coating layer 20 where the insulating layer 30 is not placed. The electrodeposition coating film 50 is sometimes formed for the purpose of improving the corrosion resistance etc. The electrodeposition coating film 50 may, for example, be 5 µm or more and 30 µm or less.

The electrodeposition coating may be either of anionic electrodeposition coating and cationic electrodeposition coating, but from the viewpoint of the corrosion resistance, a cationic electrodeposition coating material is preferable.

In particular, an electrodeposition coating film formed by cationic electrodeposition coating treatment using a water-based coating material including a resin (for example, a water-based resin having a carboxyl group, hydroxyl group, methylol group, amino group, sulfonic group, polyoxyethylene bond, or other hydrophilic group, hydroxyl group reacting with a curing agent, or other functional group (acrylic resin, polyester resin, alkyd resin, epoxy resin, polyurethane resin, or other known water-based resin etc.)), a curing agent (for example, melamine resin, block polyisocyanate, etc.), and other additives (for example, coloring pigment, photocoherent pigment, extender pigment, dispersant, antisettling agent, reaction accelerator, defoamer, thickener, antirust agent, UV absorber, surface conditioner, or other known additives) is preferable in that the bondability with the resin coating film can be easily improved.

The metal-CFRP composite 1 according to the present embodiment, as one example of its most preferable aspect, comprises a metal member 10 formed by a ferrous material, a coating layer 20 including an epoxy resin and vanadium boride, an insulating layer 30 containing a phenoxy resin and glass fiber, and a CFRP layer 40 containing a phenoxy resin and carbon fiber material. By using such a configuration, the bondability of the layers can be made more excellent, so the workability becomes better and the conductivity and rust preventing ability of the coating layer 20 are improved. Therefore, the electrodeposition coating ability and the corrosion resistance also become excellent.

The metal-CFRP composite 1 according to the present embodiment is not only light in weight and excellent in tensile strength, but also has excellent corrosion resistance and workability, so can be used for various applications, but is particularly preferable for use for members for automobile use.

Method of Manufacture of Metal-Fiber Reinforced Plastic Composite

Below, an example of the method of manufacture of the composite according to the present embodiment will be shown. The method of manufacture of the composite according to the present invention is not particularly limited so long as the composite according to the present invention can be obtained. The following method of manufacture is just a simple illustration.

As explained above, the metal member 10, insulating layer 30, CFRP layer 40, and electrodeposition coating film 50 are the same as in the first embodiment, including the structural relationship. This embodiment differs from the first embodiment in the formation of a coating layer on the metal member, so the explanation will center on the formation of the coating layer.

Preparation of Coating Layer-Forming Coating Solution

To the resin for use as the binder resin of the coating layer (for example, epoxy resin), a curing agent (for example, an amine-based curing agent) and a predetermined amount of conductive particles of a predetermined average particle size (for example, vanadium boride) were added. The conductive particles may be made to uniformly disperse in the solution by stirring etc. so as to prepare the coating layer-forming coating solution. The order of addition of the curing agent and the conductive particles is not an issue. The amount of the curing agent may be determined by the type of resin of the binder resin, but for example may be 20 to 40 parts by mass with respect to 100 parts by mass of the resin.

Formation of Coating Layer-Forming Resin Film

Next, the steel sheet or plated steel sheet or other metal member can be coated with the prepared coating layer-forming coating solution and heat treated to form the coating layer-forming resin film. Note that, before coating the steel sheet etc. with the coating solution, as pretreatment for improving the bondability of the steel sheet etc. and that resin film, the surface of the steel sheet etc. is preferably degreased by an alkali degreasing agent etc. Further, as additional pretreatment, the metal member may be coated with an aqueous solution containing water-dispersed silica etc. by a bar coater etc. and made to dry in a hot air oven at a maximum peak sheet temperature of 120 to 180° C. or so. The method of coating the coating layer-forming coating solution may be any known method. For example, it may be coated using a blade coater etc. It may be made to cure by drying by heat treatment. The amount of coating of the coating layer-forming coating solution may be determined considering the desired average thickness of the coating layer after formation of the composite. Further, the coating layer-forming resin film may be formed only at the parts where the insulating layer or the CFRP layer is bonded.

Formation of Composite

By successively stacking the insulating layer-forming material and the CFRP layer-forming material on the metal member having a coating layer-forming resin film and heating while pressing them to make the resin hot melt bond, it is possible to form the coating layer, the insulating layer, and the CFRP layer and obtain the composite according to the present invention. The heating and pressing conditions of the present process may also be suitably set. For example, it is sufficient to heat and press the materials at a 200 to 300° C. temperature and 1 to 5 MPa pressure for 1 to 30 minutes.

The thus obtained metal-CFRP composite 1 may be formed with an electrodeposition coating film 50 in any combination. The electrodeposition coating film 50 can, for example, be obtained by degreasing, surface conditioning, then known treatment by zinc phosphate and drying by heating, then electrodeposition coating so as to obtain the desired thickness of the electrodeposition coating film 50 and baking in a 150 to 200° C. oven for 15 to 30 minutes.

EXAMPLES

Below, examples according to the first embodiment are shown in Examples 1 while examples according to the second embodiment are shown in Example 2. The examples explained below are in the end single illustrations of the present invention and do not limit the present invention.

Examples 1

Preparation of Metal-CFRP Composites Having Insulating Layer Using Polypropylene Resin as Matrix Resin of CFRP Layer for Evaluating Insulating Ability For evaluation of the insulating ability, metal-CFRP composites having an insulating layer using polypropylene resin as the matrix resin of the CFRP layer were prepared.

For the CFRP prepreg using polypropylene resin as the matrix resin, the above CETEX-TC960 made by Tencate was used. For the insulating layer, a GFRP prepreg UD material made by Nippon Electric Glass Co., Ltd. was used. The thickness of the CFRP layer was made 800 µm, the thickness of the GFRP layer was changed to 40 to 1000 µm, and the design value of the separation distance X from the end part of the GFRP layer (insulating layer) was changed to 900 µm to 20000 µm to bond the layer to a length 100 mm×width 100 mm×thickness 0.2 mm tin free steel sheet made by Nippon Steel Corporation. At this time, the area of the prepreg was adjusted by cutting. The CFRP had a length 20 mm×width 20 mm and was bonded so as to be positioned centered at the tin free steel. The conditions of bondability were made a pressure of 3 MPa and hot press bonding by 240° C.×30 min.

Preparation of Metal-CFRP Composites Having Insulating Layer Using Phenoxy Resin as Matrix Resin of CFRP Layer for Evaluating Insulating Ability To evaluate the insulating ability, metal-CFRP composites having an insulating layer using a phenoxy resin as the matrix resin of the CFRP layer were prepared.

For the prepreg formed by the precursor of CFRP, a phenoxy resin (Phenotohto YP-50S made by Nippon Steel Chemical & Material Co., Ltd.) coated on a PAN-based carbon fiber cloth material by the powder coating method was used (Vf=about 55%). In the same way as above, the GFRP prepreg UD material or cloth material made by Nippon Electric Glass Co., Ltd. was stacked on the insulating layer. The thickness of the CFRP layer was made 800 µm, the thickness of the GFRP layer was changed to 40 to 1000 µm, and the design value of the separation distance X from the end part of the GFRP layer (insulating layer) was changed to −5000 µm to 20000 µm. The layer was bonded to a length 100 mm×width 100 mm×thickness 0.2 mm steel sheet (tin free steel sheet made by Nippon Steel Corporation). Here, the "separation distance X=−5000 µm" expresses the case where, when viewing the stacked state from above, the CFRP layer becomes a state protruding from the end part of the insulating layer by exactly 5000 µm. At this time, the area of the prepreg was adjusted by cutting. The CFRP had a length 20 mm×width 20 mm and was bonded so as to be positioned at the center of the tin free steel. The bonding conditions were a pressure of 3 MPa and hot press bonding at 240° C.×30 min.

Further, a sample in the stacked state with no insulating layer inserted was prepared under hot press bonding conditions similar to the above (Sample No. 1 in the following Tables 1 (Table 1-1 and Table 1-2 together referred to as the Tables 1)).

Further, samples were prepared in the same way as the above for a thickness 0.1 mm Al sheet (made by Nilaco Corporation) (Sample Nos. 34 to 45 of following Tables 1). Furthermore, several layers of phenoxy resin film were stacked so that the insulating layer did not contain nonconductive fiber to thereby prepare a composite having a stacked structure of tin free steel sheet/phenoxy resin/CFRP (Sample No. 21 in following Tables 1).

Confirmation of Presence of End Part Region and Measurement of Separation Distances X and X2 and Thickness $d_1$ of Insulating Layer Next, it was confirmed if the separation distance X was obtained as designed with respect to the design values of the separation distances X and X2. Each obtained metal-CFRP composite was cut by a diamond cutting machine and a cross-section was cut out to enable the bonded surfaces of the metal member, insulating layer, and CFRP layer to be examined. The obtained cross-section was buried in resin by ordinary temperature curing polyester resin (Technovit 4000 made by Kulzer) and polished at the surfaces while changing the grade of the emery paper to #1000, #1200, and #2000. Finally, it was polished to a mirror finish using an average particle size 0.06 µm $Al_2O_3$ suspension. The cross-section revealed was examined by an optical microscope (BX51 made by Olympus Corporation). The obtained image analyzing data was digitalized by the image processing software IMG Processer (made by Optlynx) to differentiate between the carbon fiber and matrix resin and the region in the field of the CFRP layer where the area ratio of the carbon fiber became 30% or less was judged to be the location where fluidity occurred (that is, the end part region). Note that, if the thickness of the CFRP layer is the same, the ratio of the carbon fiber and matrix resin flowing out becomes constant, so the area ratio also become the same. Further, in the case where the matrix resin is a polypropylene with low fluidity, the area ratio fell somewhat compared with a phenoxy resin. Further, if using a phenoxy resin for the insulating layer, since the resin is the same as the resin seeping out from the CFRP, the area ratio greatly fell (No. 21). Note that, the measured value of the area ratio of the center part 33 was 68 to 70%. Further, regarding the end part of the CFRP layer, in the part contiguous with the insulating layer, the part closest to the end part of the insulating layer was judged to be the end part of the CFRP layer. Using a similar sample, the cross-section was examined at five locations, the separation distances from the end part of the insulating layer were measured, and the separation distances X and X2 were found as average values of the obtained measured values. Further, regarding the thickness $d_1$ of the insulating layer as well, similarly the cross-section was examined by an optical micrograph. The thicknesses of both the parts of only the insulating layer (parts where the CFRP layer was not superposed) and the parts where the CFRP layer was superposed were measured to include five points each. The average value was set as $d_1$.

Evaluation of Insulating State by Insulating Layer

The resistance measuring device such as shown in FIG. 3 was used to measure the penetration resistance value (resistance value) of each obtained sample. First, the sample was sandwiched between 1 $cm^2$ pieces of carbon paper made by Toray Industries Inc. (TGP-H-120). Further, at the outsides of the carbon paper, 20 mmφ terminals plated by gold were placed. On top of those, a load of 100 kgf (about 980N) per square cm was applied. Further, a constant current power supply (PAN16-10A made by Kikusui Electronics Corporation) was used to run 0.1 mA DC current between the gold plated terminals and the resistance value was read from the voltage across the terminals to evaluate the penetration resistance value. Note that, for the voltmeter, a Multimeter 34401a made by Hewlett Packard was used. Regarding the obtained penetration resistance value, a sample exhibiting a 100 mΩ or more resistance value was judged to be sufficiently cut in conduction and greatly suppressed in electrolytic corrosion and was given a score of A in the following Tables 1. Further, if the obtained penetration resistance value was 50 mΩ or more to less than 100 mΩ, it was judged that the conduction was cut and electrolytic corrosion was suppressed and a score of B was given in the following Tables 1. On the other hand, if the penetration resistance value was an extremely low 50 mΩ or less, it was judged that the conduction was not cut and a score of C was given.

Evaluation of Corrosion Resistance by Cyclic Corrosion Test

The corrosion resistance was evaluated by a cyclic corrosion test under conditions similar to the second embodiment explained later. Each composite sample obtained by pressing GFRP having a width and length for forming protruding parts and width 50 mm×length 100 mm CFRP at the center of a width 70 mm×length 150 mm metal member on which a coating layer has been superposed was used. This was degreased, surface conditioned, treated by zinc phosphate, then coated by electrodeposition. The degreasing was performed by dipping the sample in a degreasing agent made by Nihon Parkerizing Co., Ltd. (Fine Cleaner E6408) under 60° C. conditions for 5 minutes. The surface conditioning of the degreased composite sample was performed by immersing the sample in an agent made by Nihon Parkerizing Co., Ltd. (Prepalene X) under 40° C. conditions for 5 minutes. After that, the sample was dipped in a zinc phosphate chemical conversion agent made by Nihon Parkerizing Co., Ltd. (Palbond L3065) under 35° C. conditions for 3 minutes to thereby perform zinc phosphate treatment. After the zinc phosphate treatment, the sample was rinsed with water and made to dry in a 150° C. atmosphere oven. After that, an electrodeposition coating material made by Nippon Paint Co., Ltd. (Powerfloat 1200) was coated to 15 μm by electrodeposition and baked on in a 170° C. atmosphere oven for 20 minutes. The result was used as the sample.

Using each prepared sample, a cyclic corrosion test (CCT) was performed. The mode of the CCT was based on the neutral salt spray cycle test of JIS H8520:1999. The sample was set in the tester with the CFRP side as the evaluation surface and so that the evaluation surface was sprayed with salt water for the test. The corrosion resistance was evaluated by visually examining the appearance of the sample every 15 cycles and finding the cycle in which red rust formed. The larger the number of cycles before red rust formed, the better the corrosion resistance and the more dissimilar metal corrosion and crevice corrosion could be suppressed. Further, red rust is formed from near the end of the CFRP bonded to the metal, so this was focused on in the visual examination. A sample in which no red rust could be confirmed at 90 cycles or more was able to be sufficiently suppressed in dissimilar metal corrosion and crevice corrosion and was deemed passing in corrosion resistance, while a sample in which red rust was confirmed at less than 90 cycles was not able to be sufficiently suppressed in dissimilar metal corrosion and/or crevice corrosion and was deemed failing in corrosion resistance. Note that, in No. 34 where the metal member was aluminum, no red rust appeared due to the properties of the metal, so the number of cycles at which the coating film blistered at the end part of the joined part was evaluated as the corrosion resistance.

Preparation of Metal-CFRP Composites Having Insulating Layer Using Polypropylene Resin as Matrix Resin of CFRP Layer for Measuring Warpage To evaluate the warpage, metal-CFRP composites having an insulating layer using a polypropylene resin as the matrix resin of the CFRP layer were prepared.

Each sample was not shaped as a square such as described above for evaluation of the insulating ability, but was made a short strip-shaped test piece. For the CFRP prepreg having polypropylene as the matrix resin, the above CETEX-TC960 made by Tencate was used while for the insulating layer, a stacked GFRP prepreg UD material made by Nippon Electric Glass Co., Ltd. was used. The thickness of the CFRP layer was made 800 μm, the thickness of the GFRP layer was changed to 40 to 1000 μm, and the design value of the separation distance X from the end part of the GFRP layer (insulating layer) was changed to 1000 μm to 20000 μm. The layer was bonded to a length 100 mm×width 10 mm×thickness 0.2 mm tin free steel sheet made by Nippon Steel Corporation. At this time, the area of the prepreg was adjusted by cutting. The CFRP had a length 25 mm× width 10 mm and was bonded so as to be positioned at the center of the tin free steel. The bonding conditions were a pressure of 3 MPa and hot press bonding at 240° C.×30 min.

Preparation of Metal-CFRP Composites Having Insulating Layer Using Phenoxy Resin as Matrix Resin of CFRP Layer for Measuring Warpage For evaluation of the warpage, metal-CFRP composites having an insulating layer using a phenoxy resin as the matrix resin of the CFRP layer were prepared.

For the prepreg formed by the precursor of CFRP, a phenoxy resin (Phenotohto YP-50S made by Nippon Steel Chemical & Material Co., Ltd.) coated on a PAN-based carbon fiber cloth material by the powder coating method was used (Vf=about 55%). In the same way as above, the GFRP prepreg UD material made by Nippon Electric Glass Co., Ltd. was stacked on the insulating layer. The thickness of the CFRP layer was made 800 μm, the thickness of the GFRP layer was changed to 40 to 1000 μm, and the design value of the separation distance X from the end part of the GFRP layer (insulating layer) was changed to 1500 μm to 20000 μm. The layer was bonded to a length 100 mm×width 10 mm×thickness 0.2 mm tin free steel sheet made by Nippon Steel Corporation. At this time, the area of the prepreg was adjusted by cutting. The CFRP had a length 25 mm×width 10 mm and was bonded so as to be positioned at the center of the tin free steel. The bonding conditions were a pressure of 3 MPa and hot press bonding at 240° C.×30 min.

Further, to confirm the change when changing the GFRP from a UD material to a cloth material, a stack of GF cloth material made by Nippon Electric Glass Co., Ltd. was prepared. On top of this, Phenotohto YP-50S made by Nippon Steel Chemical & Material Co., Ltd. prepared in a sheet shape was stacked to prepare each metal-CFRP composite.

Further, a sample was prepared in the same way as the above for a thickness 0.1 mm Al sheet (made by Nilaco Corporation).

Evaluation of Warpage

Figure 8:
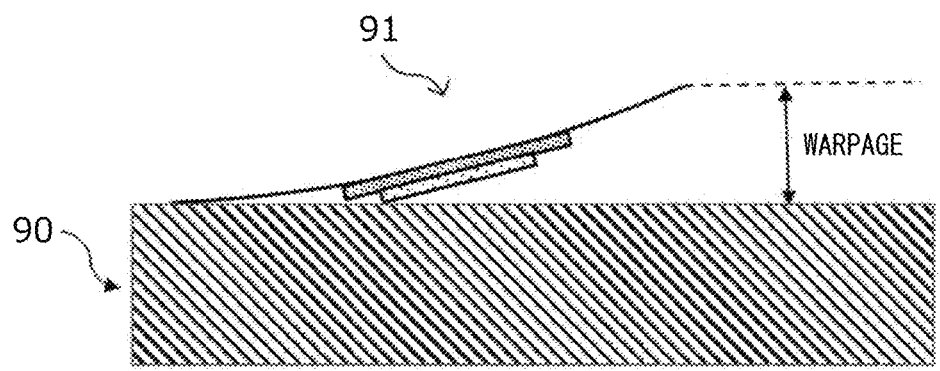
FIG. 8 is a conceptual view for explaining a method of measuring warpage of a metal-fiber reinforced plastic composite.

After preparing the metal-CFRP composites in the above way, the warpage was evaluated. To evaluate to what extent a length 100 mm tin free steel sheet warps due to bondability of CFRP and GFRP, a verification test such as shown in FIG. 8 was performed. That is, when placing a warpage measurement sample 91 of each metal-CFRP composite on a horizontal stand 90 and placing the sample 91 so that one of the end parts became parallel to the horizontal stand 90, the distance between the other end part 100 mm away and the top surface of the horizontal stand 90 was made the warpage. If the warpage was less than 1 mm, the result was judged good and evaluated as "A" in the following Tables 1. A warpage of 1 mm to 5 mm was evaluated as "B" as an allowable range. If the warpage was more than 5 mm, the result was judged as poor and was evaluated as "C".

State of Interface of Insulating Layer and Metal Member

After preparing the metal-CFRP composites in the above way, the interface of the insulating layer and the metal member was examined by a scanning electron microscope to thereby check whether there was carbon fiber present at the interface of the insulating layer and metal member. First, each obtained metal-CFRP composite was cut by a diamond cutting machine to cut out a cross-section to enable the bonded surfaces of the metal member, insulating layer, and CFRP layer to be observed. The obtained cross-section was buried in ordinary temperature curing polyester resin (made by Kulzer, Technovit 4000) and polished at its surface while changing the grade of the emery paper #1000, #1200, and #2000. Finally, an $Al_2O_3$ suspension of an average particle size of 0.06 μm was used for the mirror finish polishing. After that, to coat Pt for imparting conductivity, a vapor deposition apparatus (made by JEOL, Auto Fine Coater JFL-1000) was used for coating the surface under conditions of 20 mA and 120 sec and a scanning type electron microscope (JEOL JSM-6500F) was used for observation. To confirm the presence of carbon fiber at the interface of the insulating layer and metal member, 10 fields in the same test piece were examined at a power of 500×. Since there may be variation in the presence of carbon fiber depending on the cross-section, five test pieces were cut out at the same composite and checked for the presence of carbon fiber. As a result of examination, the case where there was no carbon fiber present at the interface of the insulating layer and the metal member was evaluated as "A" while the case where there was carbon fiber present was evaluated as "B". These were shown together in the following Tables 1. Note that, if using GFRP as the insulating layer 30, along with carbon fiber, glass reinforcing fiber is observed, but the carbon fiber has a thickness of 10 μm or less while the glass reinforcing fiber has a thickness of 40 μm or so, so it is possible to easily discriminate carbon fiber from the difference in thicknesses of the two.

Measurement of MVR

The MVR of the polypropylene resin and phenoxy resin was measured by a test method based on JIS K7210-1B. As the polypropylene resin, a resin sampled from the prepreg CETEX-TC960 made by Tencate was used, while as the phenoxy resin, YR-50S made by Nippon Steel Chemical & Material Co., Ltd. vacuum dried overnight at 60° C. was used. Using these resins, a fluidity evaluation test was conducted in the air atmosphere by a melt indexer F-F01 type machine made by Toyo Seiki Seisaku-sho Ltd. More particularly, using a piston cross-sectional area of 0.711 $cm^2$, the resin was discharged by 10 kgf (about 98N) and the MVR at 240° C. was measured. As a result, the MVR of the polypropylene resin at 240° C. was 47 cc/10 min while the MVR of the phenoxy resin at 240° C. was 80 cc/min.

The obtained results are shown together in the following Tables 1.

As shown in the following Tables 1, at an end part of the CFRP where the thermoplastic resin is included in the matrix, a hot press is used to make the resin fluid. At such a portion, there is a part where 30% or less of carbon fiber is contained. For this reason, if making the metal and CFRP directly bond with each other, conduction occurs, but it was learned that by inserting an insulating layer, the insulating ability greatly increases and the possibility of electrolytic corrosion is greatly reduced. Further, it became clear that if using GFRP for the insulating layer, by setting the separation distance to a predetermined length, it is possible to reduce the warping and deflection of a thin metal sheet and secure insulating ability and possible to provide a metal-CFRP composite with little electrolytic corrosion.

TABLE 1

| | Metal member | | Insulating layer | | CFRP layer | | | | |
|---|---|---|---|---|---|---|---|---|---|
| Sample no. | Material | Thickness (mm) | Material | Thickness d1 (μm) | Resin | MVR (cc/10 min) | 20 × MVR | Separation distance X (μm) | Separation distance X2 (μm) | End region |
| 1 | Tin free steel | 0.2 | — | 0 | Phenoxy | 80 | 1600 | — | — | Yes |
| 2 | | | GFRP UD | 200 | Phenoxy | 80 | 1600 | −5000 | −5300 | Yes |
| 3 | | | | | | | | 0 | −300 | Yes |
| 4 | | | GFRP UD | 15 | Phenoxy | 80 | 1600 | 5000 | 4700 | Yes |
| 5 | | | | 20 | | | | | | Yes |
| 6 | | | | 100 | | | | | | Yes |
| 7 | | | | 200 | | | | | | Yes |
| 8 | | | | 500 | | | | | | Yes |
| 9 | | | | 700 | | | | | | Yes |
| 10 | | | GFRP cloth | 15 | Phenoxy | 80 | 1600 | 5000 | 4700 | Yes |
| 11 | | | | 500 | | | | | | Yes |
| 12 | | | | 700 | | | | | | Yes |
| 13 | | | GFRP UD | 200 | Phenoxy | 80 | 1600 | 400 | 100 | Yes |
| 14 | | | | | | | | 500 | 200 | Yes |
| 15 | | | | | | | | 800 | 500 | Yes |
| 16 | | | | | | | | 1500 | 1200 | Yes |
| 17 | | | | | | | | 2000 | 1700 | Yes |
| 18 | | | | | | | | 5000 | 4700 | Yes |
| 19 | | | | | | | | 10000 | 9700 | Yes |
| 20 | | | | | | | | 20000 | 19700 | Yes |
| 21 | | | Phenoxy film | 500 | Phenoxy | 80 | 1600 | 5000 | 4700 | Yes |
| 22 | Tin free | 0.2 | GFRP UD | 15 | Polypropylene | 47 | 940 | 5000 | 4800 | Yes |
| 23 | | | | 20 | | | | | | Yes |

TABLE 1-continued

| Sample no. | Material | | Type | | Resin | | | | | |
|---|---|---|---|---|---|---|---|---|---|---|
| 24 | Steel | | | 200 | | | | | | Yes |
| 25 | | | | 500 | | | | | | Yes |
| 26 | | | | 700 | | | | | | Yes |
| 27 | | | GFRP UD | 200 | Polypropylene | 47 | 940 | 300 | 100 | Yes |
| 28 | | | | | | | | 400 | 200 | Yes |
| 29 | | | | | | | | 900 | 700 | Yes |
| 30 | | | | | | | | 1500 | 1300 | Yes |
| 31 | | | | | | | | 5000 | 4800 | Yes |
| 32 | | | | | | | | 10000 | 9800 | Yes |
| 33 | | | | | | | | 20000 | 19800 | Yes |
| 34 | Aluminum | 0.1 | GFRP UD | 200 | Phenoxy | 80 | 1600 | 0 | −300 | Yes |
| 35 | Aluminum | 0.1 | GFRP UD | 15 | Phenoxy | 80 | 1600 | 5000 | 4700 | Yes |
| 36 | | | | 20 | | | | | | Yes |
| 37 | | | | 200 | | | | | | Yes |
| 38 | | | | 700 | | | | | | Yes |
| 39 | | | GFRP UD | 200 | Phenoxy | 80 | 1600 | 400 | 100 | Yes |
| 40 | | | | | | | | 500 | 200 | Yes |
| 41 | | | | | | | | 800 | 500 | Yes |
| 42 | | | | | | | | 1500 | 1200 | Yes |
| 43 | | | | | | | | 2000 | 1700 | Yes |
| 44 | | | | | | | | 10000 | 9700 | Yes |
| 45 | | | | | | | | 20000 | 19700 | Yes |

| Sample no. | CF area ratio in end region (%) | Insulating layer/metal member interface | Insulation state | Warpage | Corrosion resistance | Class |
|---|---|---|---|---|---|---|
| 1 | 28 | B | C | B | 30 | Comp. ex. |
| 2 | 28 | B | C | C | 30 | Comp. ex. |
| 3 | 28 | B | C | C | 30 | Comp. ex. |
| 4 | 28 | A | B | A | 105 | Ex. |
| 5 | 28 | A | A | A | 105 | Ex. |
| 6 | 28 | A | A | A | 105 | Ex. |
| 7 | 28 | A | A | A | 120 | Ex. |
| 8 | 28 | A | A | A | 120 | Ex. |
| 9 | 28 | A | A | B | 120 | Ex. |
| 10 | 28 | A | B | A | 105 | Ex. |
| 11 | 28 | A | A | A | 120 | Ex. |
| 12 | 28 | A | A | B | 120 | Ex. |
| 13 | 28 | A | B | A | 60 | Comp. ex. |
| 14 | 28 | A | B | A | 90 | Ex. |
| 15 | 28 | A | B | A | 90 | Ex. |
| 16 | 28 | A | B | A | 105 | Ex. |
| 17 | 28 | A | A | A | 120 | Ex. |
| 18 | 28 | A | A | A | 120 | Ex. |
| 19 | 28 | A | A | A | 135 | Ex. |
| 20 | 28 | A | A | B | 135 | Ex. |
| 21 | 17 | A | A | A | 120 | Ex. |
| 22 | 25 | A | B | A | 105 | Ex. |
| 23 | 25 | A | A | A | 105 | Ex. |
| 24 | 25 | A | A | A | 120 | Ex. |
| 25 | 1.2 | A | A | A | 120 | Ex. |
| 26 | 25 | A | A | B | 120 | Ex. |
| 27 | 25 | A | B | A | 45 | Comp. ex. |
| 28 | 25 | A | B | A | 90 | Ex. |
| 29 | 25 | A | B | A | 90 | Ex. |
| 30 | 25 | A | A | A | 105 | Ex. |
| 31 | 25 | A | A | A | 120 | Ex. |
| 32 | 25 | A | A | A | 135 | Ex. |
| 33 | 25 | A | A | B | 135 | Ex. |
| 34 | 28 | B | C | B | 45 | Comp. ex. |
| 35 | 28 | A | B | A | 120 | Ex. |
| 36 | 28 | A | A | A | 120 | Ex. |
| 37 | 28 | A | A | A | 135 | Ex. |
| 38 | 28 | A | A | B | 135 | Ex. |
| 39 | 28 | A | B | A | 60 | Comp. ex. |
| 40 | 28 | A | B | A | 90 | Ex. |
| 41 | 28 | A | B | A | 90 | Ex. |
| 42 | 28 | A | B | A | 120 | Ex. |
| 43 | 28 | A | A | A | 135 | Ex. |
| 44 | 28 | A | A | A | 150 | Ex. |
| 45 | 28 | A | A | B | 150 | Ex. |

According to the first embodiment, even when hot press bonding causes the carbon fiber 42 of the CFRP layer 40 to flow, the carbon fiber 42 flowing out at an end part region 34 of the CFRP layer 40 is kept from contacting the metal member 10. Further, even when hot press bonding causes the carbon fiber 42 of the CFRP layer 40 to flow, the carbon fiber 42 is kept from penetrating through the insulating layer 30. Therefore, it becomes possible to obtain a metal-fiber reinforced plastic composite 1 having improved corrosion resistance.

Examples 2

Below, examples of the second embodiment are shown in Examples 2.

Process of Preparation of Metal Member

A slab of a composition comprised of C: 0.131 mass %, Si: 1.19 mass %, Mn: 1.92 mass %, P: 0.009 mass %, S: 0.0025 mass %, Al: 0.027 mass %, N: 0.0032 mass %, and a balance of Fe and impurities was hot rolled, pickled, then cold rolled to obtain a thickness 1.0 mm cold rolled steel sheet. Next, the prepared cold rolled steel sheet was annealed by a continuous annealing apparatus under conditions of a maximum peak sheet temperature of 820° C. The gas atmosphere in the annealing furnace in the annealing process was made an $N_2$ atmosphere containing 1.0 vol % of $H_2$. The prepared cold rolled steel sheet is referred to as "CR".

Further, the prepared cold rolled steel sheet was annealed in the annealing process of a continuous hot dip coating apparatus having an annealing process under conditions giving a maximum peak sheet temperature of 820° C., then hot dip galvanized in the coating process to prepare another sample. The gas atmosphere in the annealing furnace of the annealing process was made an $N_2$ atmosphere containing 1.0 vol % of $H_2$. As the coated steel sheet, three types of steel sheets obtained by the constituents of the coating bath in the coating process of Zn-0.2% Al (referred to as "GI"), Zn-0.09% Al (referred to as "GA"), and Zn-1.5% Al-1.5% Mg (referred to as "Zn—Al—Mg") were used. Note that, the steel sheet obtained using a hot dip coating bath of Zn-0.09% Al coating (GA) was obtained by dipping the steel sheet in the hot dip coating bath, pulling out the steel sheet from the coating bath while blowing $N_2$ gas from a slit nozzle for gas wiping to adjust the amount of deposition, then heating by an induction heater at a sheet temperature of 480° C. to thereby cause alloying and make the Fe in the steel sheet disperse to the inside of the coating layer.

Note that, when the tensile strength of the prepared metal member was measured, it was about 980 MPa in each case. Further, the amount of deposition of plating of plated steel sheet was 45 g/m² in the case of GA and 60 g/m² in the case of plating other than GA.

Pretreatment Process of Metal Member

The prepared metal member was degreased by an alkali degreasing agent "Fine Cleaner E6404" made by Nihon Parkerizing Co., Ltd., then the metal member was coated with an aqueous solution containing 2.5 g/liter of γ-aminopropyl triethoxysilane, 1 g/liter of water-dispersed silica ("Snowtex N" made by Nissan Chemical Corporation), and 3 g/liter of a water soluble acrylic resin (reagent grade polyacrylic acid) by a bar coater and was made to dry in a hot air oven under conditions giving a maximum peak sheet temperature of 150° C. Further, a 3 g/liter aqueous solution of an ammonium zirconium carbonate aqueous solution and a chromate treatment solution "ZM-1300AN" made by Nihon Parkerizing Co., Ltd. were similarly coated by a bar coater and made to dry in a hot air oven under conditions giving a maximum peak sheet temperature of 150° C. After that, coating by an aqueous solution containing water-dispersed silica will be referred to as "Si-based treatment" (or simply "Si-based"), coating by an ammonium zirconium carbonate aqueous solution will be referred as "Zr-based treatment" (or simply "Zr-based"), and coating by a chromate treatment solution will be referred to as "Cr-based treatment" (or simply "Cr-based").

Further, the amount of deposition of the treatment solution in the pretreatment process was made 30 mg/m². The amount of wet coating before drying of the solution coated on the entire surface of the metal member was calculated by [mass of metal member after coating]-[mass of metal member before coating]. The masses of the Cr, Si, and Zr contained in the amount of wet coating were calculated and divided by the area of the metal member.

Process for Preparation of Coating Layer-Forming Coating Solution

As the binder resins, the epoxy resin "jER® 828" made by Mitsubishi Chemical Corporation, the urethane-modified epoxy resin "Epoxy® 802-30CX" made by Mitsui Chemicals, Inc., and the polyester resin "Vylon® 300" made by Toyobo Co., Ltd. were prepared. Further, as the curing agents, the amine "MXDA (m-xylenediamine)" made by Mitsubishi Gas Chemical Company Inc., "1,12-dodecamethylenediamine" made by Ube Industries Ltd., and melamine "U-van® 20SB" made by Mitsui Chemicals, Inc. were prepared. Next, these resins and curing agents were mixed as follows:

Epoxy resin A: Mixture of 100 parts by mass of "jER® 828" made by Mitsubishi Chemical Corporation to which 30 parts by mass of "1,12-dodecamethylene diamine" made by Ube Industries Ltd. was added.

Epoxy resin B: Mixture of 100 parts by mass of "jER® 828" made by Mitsubishi Chemical Corporation to which 30 parts by mass of "MXDA (m-xylene diamine) made by Mitsubishi Gas Chemical Company Inc. was added.

Epoxy resin C: Mixture of 100 parts by mass of solid content of "Epoxy® 802-30CX" made by Mitsui Chemicals Inc. to which 20 parts by mass of solid content of "U-Van® 20SB" made by Mitsui Chemicals Inc. was added.

Polyester resin: Mixture of 100 parts by mass of solid content of "Vylon® 300" made by Toyobo Co., Ltd. dissolved in solvent of cyclohexane to 30 mass % to which 20 parts by mass of solid content of "U-Van® 20SB" made by Mitsui Chemicals Inc. was added.

Furthermore, the prepared resin was mixed with the conductive particles shown next so as to prepare the coating layer-forming coating solution. Note that, for the content of the particles, the ratio of the mass of the solids content of the particles added to the coating layer-forming coating solution in the coating film was found, the content (vol %) was calculated from the specific gravity of the solids content of the coating film resin and the specific gravity of the particles, and the content was adjusted to give the content (vol %) described in Tables 1. For the specific gravity, the catalog values or literature values of the substances were used.

Vanadium boride: "$VB_2$—O" made by Japan New Metals Co., Ltd. was classified by a sieve. The part of an average particle size of 3.1 μm was used. Below, this will be referred to as "$VB_2$".

Al-doped zinc oxide: Conductive zinc oxide (Al-Doped ZnO) "23-K" made by Hakusui Tech, primary particle size of 120 to 250 nm (catalog value) was used. Below, this will be referred to as "Al—ZnO".

Metal zinc: Reagent grade zinc particles were classified using a sieve. The part of an average particle size of 10 μm was used. Below, this will be referred to as "Zn".

Ferrosilicon: Ferrosilicon made by Marubeni Tetsugen Co., Ltd. was crushed by a crusher to fine particle state and was classified using a sieve. The parts of average particle sizes of 3 μm, 9 μm, 47 μm, and 98 μm were used. Below, this will be referred to as "Fe—Si".

Ferromanganese: Ferromanganese made by Marubeni Tetsugen Co., Ltd. was crushed by a crusher to fine particle state and was classified using a sieve. The part of an average particle sizes of 3.5 μm was used. Below, this will be referred to as "Fe—Mn".

Zirconium boride: "$ZrB_2$—O" made by Japan New Metals Co., Ltd. was classified by a sieve. The part of an average particle size of 2 μm was used. Below, this will be referred to as "$ZrB_2$".

Molybdenum silicide: "$MoSi_2$—F" made by Japan New Metals Co., Ltd. was classified by a sieve. The part of an average particle size of 3.5 μm was used. Below, this will be referred to as "$MoSi_2$".

Chrome boride: "$CrB_2$—O" made by Japan New Metals Co., Ltd. was classified by a sieve. The part of an average particle size of 5 μm was used. Below, this will be referred to as "$CrB_2$".

Tungsten silicide: "$B_2$—O" made by Japan New Metals Co., Ltd. was classified by a sieve. The part of an average particle size of 2 μm was used. Below, this will be referred to as "$WSi_2$".

Nickel: Reagent grade nickel powder was classified using a sieve. The part of an average particle size of 5 μm was used. Below, this will be referred to as "Ni".

Alumina: Granular alumina "A-42-2" made by Showa Denko K.K., average particle size (center size of particle size distribution) of 4.7 μm (catalog value) was used. Below, this will be referred to as "alumina".

Titanium oxide: "Taipec® CR-95" made by Ishihara Sangyo Kaisha Ltd., average particle size of 0.28 μm (catalog value) was used. Below, this will be referred to as "$TiO_2$".

Aluminum nitride: Aluminum nitride powder for filler use made by Tokuyama Corporation, particle size 2 μm (catalog value) was used. Below, this will be referred to as "AlN".

Conductive titanium oxide: Sn-doped titanium oxide "ET-500 W" made by Ishihara Sangyo Kaisha Ltd., average particle size of 2 to 3 μm (catalog value) was used. Below, this will be referred to as "conductive Ti".

The prepared coating layer-forming coating solutions are shown in Table 2 labeled as the coating film 1 to coating film 24. Note that, the powder resistivity of the conductive particles in Table 2 is the resistance value when using a powder resistivity measurement system MCP-PD51 type made by Mitsubishi Chemical Analytech and pressing the powder at 25° C. by 10 MPa. Further, the glass transition point was obtained by heating these coating layer-forming coating solutions in a 200° C. atmosphere oven to cure by drying for 20 minutes and measuring the transition point by an automatic differential scanning calorimeter "DSC-60A" made by Shimadzu Corporation.

TABLE 2

| Coating film type | Binder resin | | Conductive particles | | | |
|---|---|---|---|---|---|---|
| | Type | Glass transition point ° C. | Type | Particle size μm | Powder resistivity Ωcm | Content vol % |
| Coating film 1 | Epoxy resin A | Over 100 | $VB_2$ | 3.1 | ≤$7.0 \times 10^7$ | 30 |
| Coating film 2 | Epoxy resin B | >60 and ≤100 | $VB_2$ | 3.1 | ≤$7.0 \times 10^7$ | 5 |
| Coating film 3 | Epoxy resin B | >60 and ≤100 | $VB_2$ | 3.1 | ≤$7.0 \times 10^7$ | 10 |
| Coating film 4 | Epoxy resin B | >60 and ≤100 | $VB_2$ | 3.1 | ≤$7.0 \times 10^7$ | 30 |
| Coating film 5 | Epoxy resin B | >60 and ≤100 | $VB_2$ | 3.1 | ≤$7.0 \times 10^7$ | 50 |
| Coating film 6 | Epoxy resin B | >60 and ≤100 | Al—ZnO | Primary particle size > 0.01 Secondary particle size < 0.1 | ≤$7.0 \times 10^7$ | 30 |
| Coating film 7 | Epoxy resin B | >60 and ≤100 | Zn | 10 | ≤$7.0 \times 10^7$ | 30 |
| Coating film 8 | Epoxy resin B | >60 and ≤100 | Fe—Si | 3 | ≤$7.0 \times 10^7$ | 30 |
| Coating film 9 | Epoxy resin B | >60 and ≤100 | Fe—Si | 9 | ≤$7.0 \times 10^7$ | 30 |
| Coating film 10 | Epoxy resin B | >60 and ≤100 | Fe—Si | 47 | ≤$7.0 \times 10^7$ | 30 |
| Coating film 11 | Epoxy resin B | >60 and ≤100 | Fe—Si | 98 | ≤$7.0 \times 10^7$ | 30 |
| Coating film 12 | Epoxy resin B | >60 and ≤100 | $ZrB_2$ | 2 | ≤$7.0 \times 10^7$ | 30 |
| Coating film 13 | Epoxy resin B | >60 and ≤100 | $MoSi_2$ | 3.5 | ≤$7.0 \times 10^7$ | 30 |
| Coating film 14 | Epoxy resin B | >60 and ≤100 | $CrB_2$ | 5 | ≤$7.0 \times 10^7$ | 30 |
| Coating film 15 | Epoxy resin B | >60 and ≤100 | $WSi_2$ | 2 | ≤$7.0 \times 10^7$ | 30 |
| Coating film 16 | Epoxy resin B | >60 and ≤100 | Ni | 5 | ≤$7.0 \times 10^7$ | 30 |
| Coating film 17 | Epoxy resin B | >60 and ≤100 | Conductive Ti | 2 | <$7.0 \times 10^7$ | 30 |
| Coating film 18 | Epoxy resin B | >60 and ≤100 | $TiO_2$ | 0.28 | >$7.0 \times 10^7$ | 30 |
| Coating film 19 | Epoxy resin B | >60 and ≤100 | AlN | 2 | >$7.0 \times 10^7$ | 30 |
| Coating film 20 | Epoxy resin B | >60 and ≤100 | | Not yet added | | |
| Coating film 21 | Epoxy resin C | >35 and ≤60 | $VB_2$ | 3.1 | ≤$7.0 \times 10^7$ | 30 |
| Coating film 22 | Polyester resin | ≥10 and ≤35 | $VB_2$ | 3.1 | ≤$7.0 \times 10^7$ | 30 |
| Coating film 23 | Polyester resin | ≥10 and ≤35 | Fe—Mn | 3.5 | ≤$7.0 \times 10^7$ | 30 |
| Coating film 24 | Polyester resin | ≥10 and ≤35 | Alumina | 4.7 | ≤$7.0 \times 10^7$ | 30 |

Process for Forming Coating Layer-Forming Resin Film

The prepared coating layer-forming coating solution was partially coated by a blade coater on only one side of a metal member cut to the size required for evaluation at only the part where the GFRP was bonded. This was made to cure by drying under conditions giving a maximum peak sheet temperature of 230° C. in 60 seconds to thereby obtain a coating layer-forming resin film on the metal member. The partial coating was performed by masking the part other than that at which the CFRP was bonded by masking tape (using "Nitoflon® Tape" made by Nitto Denko Corporation), then coating the coating layer-forming coating solution, baking it to dry, then peeling off the masking tape. Note that, the resin films were suitably changed in amounts of coating of the coating solutions so as to give the film thicknesses of the coating layers described in Table 2.

The average thickness of the coating layer was found using a sample buried in a resin and polished in advance so that a vertical cross-section could be observed, examining the vertical cross-section by a microscope, and measuring the average thickness of the coating layer.

Process for Preparing Insulating Layer-Forming Material

Bisphenol A type phenoxy resin "Phenotohto YP-50S" made by Nippon Steel Chemical & Material Co., Ltd. was heated to melt in an oven at 170° C. for 1 minute to form a thickness 20 μm resin sheet. This phenoxy resin sheet and a glass fiber reinforced base material (made by Nitto Boseki Co., Ltd., glass cloth, thickness 15 μm to 180 μm) or aramid fiber base material (made by Maeda Kosen Co., Ltd, aramid fiber sheet, thickness 30 μm) were alternately stacked to obtain a stack. This stack was pressed by a press machine heated to 220° C. by 3 MPa for 3 minutes to make the resin hot melt bond and prepare a phenoxy resin glass fiber reinforced plastic-forming material and a phenoxy resin-aramid fiber reinforced plastic-forming material of a thickness described in Table 2. Note that, the fiber content of the glass fiber was changed by adjusting the thickness of the glass fiber reinforced base material.

To 100 mass % of polypropylene EA9 made by Japan Polypropylene Corporation, 5 mass % of maleic anhydride-grafted polypropylene MG-400P made by Riken Vitamin Co., Ltd. was added. This was pressed by a press machine heated to 180° C. by 3 MPa for 3 minutes to prepare a thickness 100 μm polypropylene resin sheet. This polypropylene resin sheet and a glass fiber reinforced base material (made by Nitto Boseki Co., Ltd., glass cloth, thickness 15 μm) were alternately stacked to obtain a stack. This stack was pressed by a press machine heated to 220° C. by 3 MPa for 3 minutes to make the resin hot melt bond and prepare a thickness 50 μm polypropylene resin glass fiber reinforced plastic-forming material.

The epoxy resin EPICLON 850 made by DIC and a curing agent WN-235 were mixed to give an equivalent ratio of 1:1, then a glass fiber reinforced base material (made by Nitto Boseki Co., Ltd., glass cloth, thickness 15 μm) was dipped in the epoxy resin. The glass fiber reinforced base material impregnated with the epoxy resin was superposed to obtain a stack, then this was pressed by a press machine heated to 220° C. by 3 MPa for 30 minutes to prepare a thickness 50 μm epoxy resin glass fiber reinforced resin.

Process of Fabrication of CFRP Layer-Forming Material

Bisphenol A type phenoxy resin "Phenotohto YP-50S" made by Nippon Steel Chemical & Material Co., Ltd. was crushed and classified to obtain powder of an average particle size D50 of 80 μm. The powder was coated on a fiber reinforced base material comprised of carbon fiber (cloth material: made by Toho Tenax Co., Ltd., IMS60) in an electrostatic field under conditions of a charge of 70 kV and blowing air pressure of 0.32 MPa. After that, the powder coated fiber reinforced base material was stacked. The stack was pressed by a press machine heated to 220° C. by 3 MPa for 3 minutes to hot melt bond the resin and prepare a thickness 0.5 mm, Vf (volume fraction of fiber) 60% phenoxy resin CFRP layer-forming material. Note that, the average particle size of the crushed and classified phenoxy resin was measured by a laser diffraction-scattering type particle size measurement apparatus (Microtrac MT3300EX, made by Nikkiso Co., Ltd.) when the cumulative volume by the volume standard became 50%.

To 100 mass % of polypropylene EA9 made by Japan Polypropylene Corporation, 5 mass % of maleic anhydride-grafted polypropylene MG-400P made by Riken Vitamin Co., Ltd. was added. This was pressed by a press machine heated to 180° C. by 3 MPa for 3 minutes to prepare a thickness 100 μm polypropylene resin sheet. This polypropylene resin sheet and a flat weave fiber reinforced base material comprised of carbon fiber (cloth material: made by Saki Ovex Co., Ltd., SA-3203) were alternately stacked to obtain a stack. This stack was pressed by a press machine heated to 220° C. by 3 MPa for 3 minutes to prepare a thickness 0.5 mm, Vf (volume fraction of fiber) 60% polypropylene resin CFRP layer-forming material.

The polyamide 6/66 copolymer Base Grade 5034 made by Ube Industries Ltd. was pressed by a press machine heated to 180° C. by 3 MPa for 3 minutes to prepare a thickness 100 μm nylon resin sheet. This nylon resin sheet and a flat weave fiber reinforced base material comprised of carbon fiber (cloth material: made by Saki Ovex Co., Ltd., SA-3203) were alternately stacked to obtain a stack. This stack was pressed by a press machine heated to 220° C. by 3 MPa for 3 minutes to prepare a thickness 0.5 mm, Vf (volume fraction of fiber) 60% nylon CFRP layer-forming material.

The epoxy resin EPICLON 850 made by DIC and a curing agent WN-235 were mixed to give an equivalent ratio of 1:1, then a flat weave fiber reinforced base material comprised of carbon fiber (cloth material: made by Sakai Ovex Co., Ltd., SA-3203) was dipped in the epoxy resin. The carbon fiber reinforced base material impregnated with the epoxy resin was stacked to obtain a stack, then this was pressed by a press machine heated to 220° C. by 3 MPa for 30 minutes to prepare a thickness 0.5 mm, Vf (volume fraction of fiber) 60% epoxy resin CFRP layer-forming material.

Process for Forming Composite

Next, the metal member with the superposed coating layer had successively stacked on it the prepared insulating layer-forming material and the prepared CFRP layer-forming material in that order and was pressed by a press machine having flat dies heated to 250° C. by 3 MPa for 3 minutes to prepare a metal-CFRP composite as a composite sample such as shown in Table 2. Note that, before the pressing, the sizes of the insulating layer and the CFRP layer were suitably adjusted to give a length of the protruding part of the insulating layer with respect to the CFRP layer (also called the "amount of protrusion", corresponding to X2 in the first embodiment) of the value described in Table 2.

Evaluation of Composites

Evaluation of Corrosion Resistance

At the center of a width 70 mm×length 150 mm metal member with a superposed coating layer, GFRP having a width and length forming an amount of protrusion described in Tables 3 (Table 3-1, Table 3-2, and Table 3-3 will together be referred to as "Tables 3") and width 50 mm× length 100 mm CFRP was pressed to obtain each composite sample. This was degreased, surface conditioned, and treated by zinc phosphate, then coated by electrodeposition. The degreasing was performed by dipping the sample in a degreasing agent made by Nihon Parkerizing Co., Ltd. (Fine Cleaner E6408) under 60° C. conditions for 5 minutes. The surface conditioning of the degreased composite sample was performed by dipping the sample in an agent made by Nihon Parkerizing Co., Ltd. (Prepalene X) under 40° C. conditions for 5 minutes. After that, the sample was dipped in a zinc phosphate chemical conversion agent made by Nihon Parkerizing Co., Ltd. (Palbond L3065) under 35° C. conditions for 3 minutes to thereby perform zinc phosphate treatment. After the zinc phosphate treatment, the sample was rinsed with water and made to dry in a 150° C. atmosphere oven. After that, an electrodeposition coating material made by Nippon Paint Co., Ltd. (Powerfloat 1200) was coated to 15 μm by electrodeposition and baked on in a 170° C. atmosphere oven for 20 minutes. The result was used as the sample.

Using each prepared sample, a cyclic corrosion test (CCT) was performed. The mode of the CCT was based on the neutral salt spray cycle test of JIS H8520:1999. The sample was set in the tester with the CFRP side as the evaluation surface and so that the evaluation surface was sprayed with salt water for the test. The corrosion resistance was evaluated by visually examining the appearance of the sample every 15 cycles and finding the cycle in which red rust formed. The larger the number of cycles before red rust formed, the better the corrosion resistance and the more dissimilar metal corrosion and crevice corrosion could be suppressed. Further, red rust is formed from near the end of the CFRP bonded to the metal, so this was focused on in the visual examination. A sample in which no red rust could be confirmed at 90 cycles or more was able to be sufficiently suppressed in dissimilar metal corrosion and crevice corrosion and was deemed passing in corrosion resistance, while a sample in which red rust was confirmed at less than 90 cycles was not able to be sufficiently suppressed in dissimilar metal corrosion and/or crevice corrosion and was deemed failing in corrosion resistance.

Note that, the corrosion resistance in the second embodiment was improved over the samples of the first embodiment explained in Tables 1 due to the provision of the coating layer 20.

Evaluation of Press Formability

V-type concavo-convex dies were used to evaluate the V-shape press formability by hot working in a state heating the dies to 200° C. A composite sample comprised of a width 50 mm× length 50 mm metal member with a coating layer superposed on the entire surface of which a nonconductive fiber reinforced plastic and CFRP were bonded was used for the test. The pressing was performed with the dies set so that the concavo die side became the CFRP and the convex die side became the metal material. Note that V-type dies with an angle of the V-part of the dies of 90° were used. Dies of different R (radius of curvature) of the bending parts were used for press forming to find the limit R at which the CFRP would not peel off. This means that the smaller the radius of curvature at which no peeling occurs in the composite, the better the press formability. If 100 mmR or less, there is substantially no problem. Preferably, the radius of curve is 70 mmR or less, 50 mmR or less, or 40 mmR or less. The cross-section after press forming was examined. A case where at the bonded parts of the metal member with the nonconductive fiber reinforced plastic or CFRP, there was 30% or more peeling of the metal member and the CFRP with respect to the bonded parts as a whole was deemed "peeling".

The above results of evaluation are shown in Table 3 together with the configurations of the composite samples.

TABLE 3

| | | | Coating film layer | | Insulating layer | | | | Separation distance X2 |
|---|---|---|---|---|---|---|---|---|---|
| No. | Metal sheet | Pretreatment | Coating film type | Film thickness μm | Resin type | Fiber type | Thickness μm | Fiber content vol % | (amount of protrusion) mm |
| 1 | GA | Si-based | Coating film 1 | 20 | Phenoxy | Glass fiber | 50 | 40 | 4.9 |
| 2 | GA | Si-based | Coating film 2 | 20 | Phenoxy | Glass fiber | 50 | 40 | 5 |
| 3 | GA | Si-based | Coating film 3 | 20 | Phenoxy | Glass fiber | 50 | 40 | 4.8 |
| 4 | GA | Si-based | Coating film 4 | 20 | Phenoxy | Glass fiber | 50 | 40 | 5.1 |
| 5 | GA | Si-based | Coating film 4 | 5 | Phenoxy | Glass fiber | 50 | 40 | 5 |
| 6 | GA | Si-based | Coating film 4 | 50 | Phenoxy | Glass fiber | 50 | 40 | 4.7 |
| 7 | GA | Si-based | Coating film 4 | 200 | Phenoxy | Glass fiber | 50 | 40 | 5.3 |
| 8 | GA | Si-based | Coating film 4 | 20 | Phenoxy | Glass fiber | 20 | 40 | 5.1 |
| 9 | GA | Si-based | Coating film 4 | 20 | Phenoxy | Glass fiber | 100 | 40 | 5 |
| 10 | GA | Si-based | Coating film 4 | 20 | Phenoxy | Glass fiber | 200 | 40 | 5.2 |
| 11 | GA | Si-based | Coating film 4 | 20 | Phenoxy | Glass fiber | 500 | 40 | 5.2 |
| 12 | GA | Si-based | Coating film 4 | 20 | Phenoxy | Glass fiber | 50 | 5 | 5.1 |
| 13 | GA | Si-based | Coating film 4 | 20 | Phenoxy | Glass fiber | 50 | 10 | 4.9 |
| 14 | GA | Si-based | Coating film 4 | 20 | Phenoxy | Glass fiber | 50 | 60 | 4.8 |
| 15 | GA | Si-based | Coating film 4 | 20 | Phenoxy | Aramid fiber | 50 | 40 | 4.9 |
| 16 | GA | Si-based | Coating film 4 | 20 | Epoxy | Glass fiber | 50 | 40 | 5 |
| 17 | GA | Si-based | Coating film 4 | 20 | Polypropylene | Glass fiber | 50 | 40 | 5.2 |
| 18 | CR | Si-based | Coating film 4 | 20 | Phenoxy | Glass fiber | 50 | 40 | 5.1 |
| 19 | GI | Si-based | Coating film 4 | 20 | Phenoxy | Glass fiber | 50 | 40 | 5 |
| 20 | Zn—Al—Mg | Si-based | Coating film 4 | 20 | Phenoxy | Glass fiber | 50 | 40 | 4.9 |
| 21 | GA | Si-based | Coating film 4 | 20 | Phenoxy | Glass fiber | 50 | 40 | 5 |
| 22 | GA | Si-based | Coating film 4 | 20 | Phenoxy | Glass fiber | 50 | 40 | 5.4 |
| 23 | GA | Si-based | Coating film 4 | 20 | Phenoxy | Glass fiber | 50 | 40 | 5.1 |
| 24 | GA | Si-based | Coating film 4 | 20 | Phenoxy | Glass fiber | 50 | 40 | 0.1 |
| 25 | GA | Si-based | Coating film 4 | 20 | Phenoxy | Glass fiber | 50 | 40 | 0.2 |
| 26 | GA | Si-based | Coating film 4 | 20 | Phenoxy | Glass fiber | 50 | 40 | 0.5 |
| 27 | GA | Si-based | Coating film 4 | 20 | Phenoxy | Glass fiber | 50 | 40 | 1.2 |
| 28 | GA | Si-based | Coating film 4 | 20 | Phenoxy | Glass fiber | 50 | 40 | 2.1 |

TABLE 3-continued

| No. | Plating | Treatment | Coating film | Thickness | Resin | Fiber | | | | CFRP Resin type | Corrosion resistance | Workability | Remarks |
|---|---|---|---|---|---|---|---|---|---|---|---|---|---|
| 29 | GA | Si-based | Coating film 4 | 20 | Phenoxy | Glass fiber | 50 | 40 | 9.8 | | | | |
| 30 | GA | Si-based | Coating film 4 | 20 | Phenoxy | Glass fiber | 50 | 40 | 19.8 | | | | |
| 31 | GA | Si-based | Coating film 4 | 20 | Phenoxy | Glass fiber | 50 | 40 | 22.3 | | | | |
| 32 | GA | Si-based | Coating film 4 | 20 | Phenoxy | Glass fiber | 50 | 40 | 26.4 | | | | |
| 33 | GA | Si-based | Coating film 4 | 20 | Phenoxy | Glass fiber | 50 | 40 | 30.3 | | | | |
| 34 | GA | None | Coating film 4 | 20 | Phenoxy | Glass fiber | 50 | 40 | 4.9 | | | | |
| 35 | GA | Zr-based | Coating film 4 | 20 | Phenoxy | Glass fiber | 50 | 40 | 4.9 | | | | |
| 36 | GA | Cr-based | Coating film 4 | 20 | Phenoxy | Glass fiber | 50 | 40 | 5.2 | | | | |
| 37 | GA | Si-based | Coating film 5 | 20 | Phenoxy | Glass fiber | 50 | 40 | 5.3 | | | | |
| 38 | GA | Si-based | Coating film 6 | 20 | Phenoxy | Glass fiber | 50 | 40 | 5.3 | | | | |
| 39 | GA | Si-based | Coating film 7 | 20 | Phenoxy | Glass fiber | 50 | 40 | 5.1 | | | | |
| 40 | GA | Si-based | Coating film 8 | 20 | Phenoxy | Glass fiber | 50 | 40 | 5 | | | | |
| 41 | GA | Si-based | Coating film 9 | 20 | Phenoxy | Glass fiber | 50 | 40 | 4.7 | | | | |
| 42 | GA | Si-based | Coating film 10 | 20 | Phenoxy | Glass fiber | 50 | 40 | 4.9 | | | | |
| 43 | GA | Si-based | Coating film 11 | 20 | Phenoxy | Glass fiber | 50 | 40 | 4.6 | | | | |
| 44 | GA | Si-based | Coating film 12 | 20 | Phenoxy | Glass fiber | 50 | 40 | 5 | | | | |
| 45 | GA | Si-based | Coating film 12 | 500 | Phenoxy | Glass fiber | 50 | 40 | 5.1 | | | | |
| 46 | GA | Si-based | Coating film 13 | 20 | Phenoxy | Glass fiber | 50 | 40 | 5.2 | | | | |
| 47 | GA | Si-based | Coating film 14 | 20 | Phenoxy | Glass fiber | 50 | 40 | 4.8 | | | | |
| 48 | GA | Si-based | Coating film 15 | 20 | Phenoxy | Glass fiber | 50 | 40 | 5.1 | | | | |
| 49 | GA | Si-based | Coating film 21 | 20 | Phenoxy | Glass fiber | 50 | 40 | 4.9 | | | | |
| 50 | GA | Si-based | Coating film 22 | 20 | Phenoxy | Glass fiber | 50 | 40 | 5.2 | | | | |
| 51 | GA | Si-based | Coating film 23 | 20 | Phenoxy | Glass fiber | 50 | 40 | 5.1 | | | | |
| 52 | CR | None | None | | | None | | | | | | | |
| 53 | GA | None | None | | | None | | | | | | | |
| 54 | GI | None | None | | | None | | | | | | | |
| 55 | Zn—Al—Mg | None | None | | | None | | | | | | | |
| 56 | CR | None | None | | Phenoxy | Glass fiber | 50 | 40 | 5.2 | | | | |
| 57 | GA | None | None | | Phenoxy | Glass fiber | 50 | 40 | 0 | | | | |
| 58 | GA | None | None | | Phenoxy | Glass fiber | 50 | 40 | 0.2 | | | | |
| 59 | GA | None | None | | Phenoxy | Glass fiber | 50 | 40 | 0.6 | | | | |
| 60 | GA | None | None | | Phenoxy | Glass fiber | 50 | 40 | 3.2 | | | | |
| 61 | GA | None | None | | Phenoxy | Glass fiber | 50 | 40 | 5.4 | | | | |
| 62 | GA | None | None | | Phenoxy | Glass fiber | 50 | 40 | 19.8 | | | | |
| 63 | GA | None | None | | Phenoxy | Glass fiber | 50 | 40 | 22.3 | | | | |
| 64 | GA | None | None | | Phenoxy | Glass fiber | 50 | 40 | 26.4 | | | | |
| 65 | GA | None | None | | Phenoxy | Glass fiber | 50 | 40 | 30.3 | | | | |
| 66 | GI | None | None | | Phenoxy | Glass fiber | 50 | 40 | 5.1 | | | | |
| 67 | Zn—Al—Mg | None | None | | Phenoxy | Glass fiber | 50 | 40 | 5.3 | | | | |
| 68 | GA | Si-based | Coating film 16 | 20 | Phenoxy | Glass fiber | 50 | 40 | 4.7 | | | | |
| 69 | GA | Si-based | Coating film 17 | 20 | Phenoxy | Glass fiber | 50 | 40 | 4.8 | | | | |
| 70 | GA | Si-based | Coating film 18 | 20 | Phenoxy | Glass fiber | 50 | 40 | 5 | | | | |
| 71 | GA | Si-based | Coating film 19 | 20 | Phenoxy | Glass fiber | 50 | 40 | 5.2 | | | | |
| 72 | GA | Si-based | Coating film 20 | 20 | Phenoxy | Glass fiber | 50 | 40 | 5.1 | | | | |
| 73 | CR | Si-based | Coating film 20 | 20 | Phenoxy | Glass fiber | 50 | 40 | 4.9 | | | | |
| 74 | GI | Si-based | Coating film 20 | 20 | Phenoxy | Glass fiber | 50 | 40 | 5.1 | | | | |
| 75 | Zn—Al—Mg | Si-based | Coating film 20 | 20 | Phenoxy | Glass fiber | 50 | 40 | 5 | | | | |
| 76 | GA | Si-based | Coating film 24 | 20 | Phenoxy | Glass fiber | 50 | 40 | 5 | | | | |
| 1 | | | | | | | | | | Phenoxy | 270 | 30 mmR | Ex. |
| 2 | | | | | | | | | | Phenoxy | 180 | 30 mmR | Ex. |
| 3 | | | | | | | | | | Phenoxy | 210 | 30 mmR | Ex. |
| 4 | | | | | | | | | | Phenoxy | 270 | 30 mmR | Ex. |
| 5 | | | | | | | | | | Phenoxy | 180 | 25 mmR | Ex. |
| 6 | | | | | | | | | | Phenoxy | 240 | 35 mmR | Ex. |
| 7 | | | | | | | | | | Phenoxy | 240 | 40 mmR | Ex. |
| 8 | | | | | | | | | | Phenoxy | 240 | 25 mmR | Ex. |
| 9 | | | | | | | | | | Phenoxy | 240 | 35 mmR | Ex. |
| 10 | | | | | | | | | | Phenoxy | >300 | 40 mmR | Ex. |
| 11 | | | | | | | | | | Phenoxy | >300 | 50 mmR | Ex. |
| 12 | | | | | | | | | | Phenoxy | 210 | 25 mmR | Ex. |
| 13 | | | | | | | | | | Phenoxy | 240 | 25 mmR | Ex. |
| 14 | | | | | | | | | | Phenoxy | 300 | 40 mmR | Ex. |
| 15 | | | | | | | | | | Phenoxy | 240 | 30 mmR | Ex. |
| 16 | | | | | | | | | | Phenoxy | 240 | 30 mmR | Ex. |
| 17 | | | | | | | | | | Phenoxy | 210 | 30 mmR | Ex. |
| 18 | | | | | | | | | | Phenoxy | 210 | 30 mmR | Ex. |
| 19 | | | | | | | | | | Phenoxy | 240 | 30 mmR | Ex. |
| 20 | | | | | | | | | | Phenoxy | 270 | 30 mmR | Ex. |
| 21 | | | | | | | | | | Polypropylene | 240 | 30 mmR | Ex. |
| 22 | | | | | | | | | | Nylon | 240 | 30 mmR | Ex. |
| 23 | | | | | | | | | | Epoxy | 240 | 30 mmR | Ex. |

TABLE 3-continued

| | | | | |
|---|---|---|---|---|
| 24 | Phenoxy | 75 | 30 mmR | Comp. ex. |
| 25 | Phenoxy | 180 | 30 mmR | Ex. |
| 26 | Phenoxy | 210 | 30 mmR | Ex. |
| 27 | Phenoxy | 210 | 30 mmR | Ex. |
| 28 | Phenoxy | 240 | 30 mmR | Ex. |
| 29 | Phenoxy | 270 | 30 mmR | Ex. |
| 30 | Phenoxy | 270 | 35 mmR | Ex. |
| 31 | Phenoxy | 270 | 40 mmR | Ex. |
| 32 | Phenoxy | 270 | 45 mmR | Ex. |
| 33 | Phenoxy | 270 | 45 mmR | Ex. |
| 34 | Phenoxy | 240 | 30 mmR | Ex. |
| 35 | Phenoxy | 270 | 30 mmR | Ex. |
| 36 | Phenoxy | 270 | 30 mmR | Ex. |
| 37 | Phenoxy | 210 | 30 mmR | Ex. |
| 38 | Phenoxy | 180 | 30 mmR | Ex. |
| 39 | Phenoxy | 180 | 30 mmR | Ex. |
| 40 | Phenoxy | 270 | 30 mmR | Ex. |
| 41 | Phenoxy | 270 | 30 mmR | Ex. |
| 42 | Phenoxy | 195 | 30 mmR | Ex. |
| 43 | Phenoxy | 180 | 30 mmR | Ex. |
| 44 | Phenoxy | 240 | 30 mmR | Ex. |
| 45 | Phenoxy | 270 | >50 mmR | Ex. |
| 46 | Phenoxy | 270 | 30 mmR | Ex. |
| 47 | Phenoxy | 270 | 30 mmR | Ex. |
| 48 | Phenoxy | 270 | 30 mmR | Ex. |
| 49 | Phenoxy | 270 | 30 mmR | Ex. |
| 50 | Phenoxy | 270 | 30 mmR | Ex. |
| 51 | Phenoxy | 210 | 30 mmR | Ex. |
| 52 | Phenoxy | 15 | 5 mmR | Comp. ex. |
| 53 | Phenoxy | 30 | 5 mmR | Comp. ex. |
| 54 | Phenoxy | 30 | 5 mmR | Comp. ex. |
| 55 | Phenoxy | 45 | 5 mmR | Comp. ex. |
| 56 | Phenoxy | 90 | 25 mmR | Ex. |
| 57 | Phenoxy | 60 | 25 mmR | Comp. ex. |
| 58 | Phenoxy | 90 | 25 mmR | Ex. |
| 59 | Phenoxy | 90 | 25 mmR | Ex. |
| 60 | Phenoxy | 105 | 25 mmR | Ex. |
| 61 | Phenoxy | 105 | 25 mmR | Ex. |
| 62 | Phenoxy | 120 | 30 mmR | Ex. |
| 63 | Phenoxy | 120 | 35 mmR | Ex. |
| 64 | Phenoxy | 120 | 40 mmR | Ex. |
| 65 | Phenoxy | 120 | 45 mmR | Ex. |
| 66 | Phenoxy | 105 | 25 mmR | Ex. |
| 67 | Phenoxy | 120 | 25 mmR | Ex. |
| 68 | Phenoxy | 120 | 30 mmR | Ex. |
| 69 | Phenoxy | 120 | 30 mmR | Ex. |
| 70 | Phenoxy | 120 | 30 mmR | Ex. |
| 71 | Phenoxy | 120 | 30 mmR | Ex. |
| 72 | Phenoxy | 120 | 30 mmR | Ex. |
| 73 | Phenoxy | 90 | 30 mmR | Ex. |
| 74 | Phenoxy | 120 | 30 mmR | Ex. |
| 75 | Phenoxy | 120 | 30 mmR | Ex. |
| 76 | Phenoxy | 120 | 30 mmR | Ex. |

In Nos. 1 to 23, 25 to 51, 56, and 58 to 76 of Table 2 of the invention examples, in each case, the corrosion resistance was evaluated as passing in corresponding value. It will be understood that in the invention examples, the corrosion resistance was improved. Further, if the amount of protrusion was less than 0.2 mm, the corrosion resistance became failing (No. 57) while if the amount of protrusion was over 20 mm, the workability fell (Nos. 31 to 33 and 63 to 65). Therefore, the amount of protrusion is preferably made 0.2 mm or more and 20 mm or less. Further, if the amount of protrusion is 0.1 mm (No. 24), the result of the cyclic corrosion test was 75 cy.

Note that, in the second embodiment, by provision of the coating layer, the corrosion resistance is improved over the first embodiment. While the extra margin is increased due to the coating layer, in the second embodiment as well, it is sufficient that the amount of protrusion (corresponding to X2 in the first embodiment) be at least 0.2 mm or more.

On the other hand, No. 52 to No. 55 not having the coating layer and the insulating layer are evaluated as failing in corrosion resistance.

According to the second embodiment, it becomes possible to obtain a metal-fiber reinforced plastic composite 1 preventing the metal member 10 formed by a ferrous material or ferrous alloy and the CFRP layer 40 from contacting or approaching each other to suppress the dissimilar metal corrosion and, furthermore, suppress the crevice corrosion at the time of electrodeposition coating to obtain improved corrosion resistance. Furthermore, by suitably controlling the average thickness of the conductive coating layer 20 and insulating layer 30 or suitably selecting the types of resins of the layers, it becomes possible to obtain a metal-fiber reinforced plastic composite 1 having improved workability in addition to corrosion resistance.

Above, preferred embodiments of the present invention were explained in detail while referring to the attached drawings, but the present invention is not limited to these examples. A person having ordinary knowledge in the field of art to which the present invention belongs clearly could conceive of various modifications or corrections in the scope of the technical idea described in the claims. These are understood as naturally falling in the technical scope of the present invention.

REFERENCE SIGNS LIST 1 metal-fiber reinforced plastic (CFRP) composite
10 metal member
20 coating layer
21 binder resin
22 conductive particles
30 insulating layer
30a insulating layer outer edge (end part)
31 first matrix resin
32 nonconductive fiber
33 center part
34 end part region
40 CFRP layer
41 second matrix resin
42 carbon fiber
43 fiber reinforced plastic layer (CFRP layer) outer edge (end part)
45 CFRP prepreg
X2 distance separating two outer edges (length of protruding parts)
50 electrodeposition coating
90 horizontal stand
91 warpage measurement sample
101 penetration resistance measurement sample
102 terminal
103 gold plating
104 constant current power supply
105 voltmeter
110 metal member film
111 (prior art) metal-fiber reinforced plastic (CFRP) composite
130 insulating layer
140 CFRP layer
141 matrix resin
142 carbon fiber

The invention claimed is:

1. A metal-fiber reinforced plastic composite comprising
a metal member,
an insulating layer arranged on at least part of a surface of the metal member and comprising a first matrix resin containing nonconductive fiber, and
a fiber reinforced plastic layer arranged on at least part of a surface of the insulating layer and comprising a second matrix resin containing carbon fiber, where,
when viewing the surface of the metal member from vertically above, the fiber reinforced plastic layer is positioned at the inside of a region where the insulating layer is present and an outer edge of the fiber reinforced plastic layer and an outer edge of the insulating layer are 0.2 mm or more apart,
further comprising a coating layer arranged at least at one side of the metal member between the metal member and the insulating layer and comprising a binder resin containing conductive particles,
the conductive particles selected from metal particles including one or more elements selected from a group comprised of Zn, Si, Zr, V, Cr, Mo, Mn, and W, intermetallic compound particles, and conductive oxide particles or nonoxide ceramic particles,
wherein the content of the conductive particles in the coating layer is 15 vol % to 60 vol %.

2. The metal-fiber reinforced plastic composite according to claim 1, wherein a glass transition temperature of the binder resin is 100° C. or less.

3. The metal-fiber reinforced plastic composite according to claim 1, wherein the binder resin includes at least one resin selected from an epoxy resin, polyester resin, and urethane resin.

4. The metal-fiber reinforced plastic composite according to claim 1, wherein the conductive particles have a powder resistivity at 25° C. of $7.0 \times 10^7$ Ωcm or less.

5. The metal-fiber reinforced plastic composite according to claim 1, further comprising, between the coating layer and the metal member, a chemical conversion treated layer including at least one element selected from Cr, P, Si, and Zr.

6. The metal-fiber reinforced plastic composite according to claim 1, further comprising an electrodeposition coating film on a surface of the coating layer where the insulating layer is not arranged.

7. The metal-fiber reinforced plastic composite according to claim 1, further comprising an electrodeposition coating film on a surface of the metal member where the insulating layer is not arranged.

8. The metal-fiber reinforced plastic composite according to claim 1, wherein a thickness of the insulating layer is 20 μm or more and 200 μm or less.

9. The metal-fiber reinforced plastic composite according to claim 1, wherein the nonconductive fiber is included in the insulating layer in 10 vol % or more and 60 vol % or less.

10. The metal-fiber reinforced plastic composite according to claim 1, wherein the nonconductive fiber includes at least one type of fiber selected from glass fiber and aramid fiber.

11. The metal-fiber reinforced plastic composite according to claim 1, wherein the first matrix resin includes a thermoplastic resin.

12. The metal-fiber reinforced plastic composite according to claim 11, wherein the first matrix resin includes a phenoxy resin or polypropylene resin.

13. The metal-fiber reinforced plastic composite according to claim 1, wherein the second matrix resin includes a thermoplastic resin.

14. The metal-fiber reinforced plastic composite according to claim 13, wherein the second matrix resin includes a phenoxy resin.

15. The metal-fiber reinforced plastic composite according to claim 1, wherein in a cross-section obtained by cutting the metal-fiber reinforced plastic composite in a thickness direction, there is an end region in the fiber reinforced plastic layer where the carbon fiber is present in an area ratio of 30% or less.

16. The metal-fiber reinforced plastic composite according to claim 1, wherein the carbon fiber is not present at an interface of the insulating layer at the metal member side.

17. The metal-fiber reinforced plastic composite according to claim 1, wherein the metal member is a steel material, plated steel material, ferrous alloy, aluminum, or aluminum alloy.

18. The metal-fiber reinforced plastic composite according to claim 7, wherein a thickness of the insulating layer is 20 μm or more and 200 μm or less.

19. The metal-fiber reinforced plastic composite according to claim 7, wherein the nonconductive fiber is included in the insulating layer in 10 vol % or more and 60 vol % or less.

* * * * *